US012587787B2

(12) United States Patent
Blais

(10) Patent No.: US 12,587,787 B2
(45) Date of Patent: Mar. 24, 2026

(54) SYSTEM FOR DYNAMICALLY ADJUSTING THE GAIN STRUCTURE OF SOUND SOURCES CONTAINED WITHIN ONE OR MORE INCLUSION AND EXCLUSION ZONES

(71) Applicant: NUREVA, INC., Calgary (CA)

(72) Inventor: Kael Blais, Broomfield, CO (US)

(73) Assignee: NUREVA, INC., Calgary (CA)

( * ) Notice: Subject to any disclaimer, the term of this patent is extended or adjusted under 35 U.S.C. 154(b) by 146 days.

(21) Appl. No.: 18/644,745

(22) Filed: Apr. 24, 2024

(65) Prior Publication Data

US 2024/0381026 A1 Nov. 14, 2024

Related U.S. Application Data

(60) Provisional application No. 63/465,087, filed on May 9, 2023.

(51) Int. Cl.
*H04R 5/00* (2006.01)
*H04R 3/00* (2006.01)
*H04R 3/04* (2006.01)

(52) U.S. Cl.
CPC ............... *H04R 3/04* (2013.01); *H04R 3/005* (2013.01)

(58) Field of Classification Search
CPC .................................. H04R 3/04; H04R 3/005
USPC .................................................... 381/122, 26
See application file for complete search history.

(56) References Cited

U.S. PATENT DOCUMENTS 4,499,578 A 2/1985 Marouf et al.
4,536,887 A 8/1985 Kaneda et al.
5,477,270 A 12/1995 Park
5,699,437 A 12/1997 Finn
(Continued)

FOREIGN PATENT DOCUMENTS

EP 0903055 B1 10/2007
EP 2975609 A1 1/2016
(Continued)

OTHER PUBLICATIONS

International Search Report and Written Opinion mailed Aug. 9, 2024, for International Patent Application No. PCT/CA2024/050615, 9 sheets.

(Continued)

*Primary Examiner* — Ammar T Hamid
(74) *Attorney, Agent, or Firm* — KATTEN MUCHIN ROSENMAN LLP

(57) ABSTRACT

A system is provided for intelligent and optimized zone gain management of sound sources within priority (inclusion) zones and adjacent to the priority (inclusion) zone boundaries of the 3D space by using sound source location and signal level information of sound sources from both inside the inclusion zone and outside the inclusion zone in the exclusion zone for the purpose of optimizing the audio gain structure of desired sound sources located in priority (inclusion) zones and minimizing the gain structure of undesired sound sources in low priority (exclusion) zones. The system utilizes all virtual microphones in the 3D space by preferably assigning all available virtual microphones to either an inclusion zone or exclusion zone configuration for the purpose of tracking and monitoring all sound sources in the space regardless of their position in the 3D space.

27 Claims, 41 Drawing Sheets

Virtual Microphone zone shape examples

(56) References Cited

U.S. PATENT DOCUMENTS

| | | | | |
|---|---|---|---|---|
| 6,469,732 | B1 | 10/2002 | Chang et al. | |
| 6,593,956 | B1 | 7/2003 | Potts et al. | |
| 6,912,178 | B2 | 6/2005 | Chu et al. | |
| 6,912,718 | B1 | 6/2005 | Chang et al. | |
| 7,130,705 | B2 | 10/2006 | Amir et al. | |
| 7,254,241 | B2 | 8/2007 | Rui et al. | |
| 7,489,788 | B2 | 2/2009 | Leung et al. | |
| 7,720,232 | B2 | 5/2010 | Oxford et al. | |
| 7,848,531 | B1 | 12/2010 | Vickers et al. | |
| 7,995,768 | B2 | 8/2011 | Miki et al. | |
| 8,185,387 | B1 | 5/2012 | Lachapelle | |
| 8,861,537 | B1 | 10/2014 | Braithwaite et al. | |
| 8,953,819 | B2 | 2/2015 | Ko et al. | |
| 9,706,292 | B2 | 7/2017 | Duraiswami et al. | |
| 9,800,964 | B2 | 10/2017 | McIntosh et al. | |
| 10,003,900 | B2 | 6/2018 | Cartwright et al. | |
| 10,042,038 | B1 | 8/2018 | Lord et al. | |
| 10,063,987 | B2 | 8/2018 | McGibney | |
| 10,229,697 | B2 | 3/2019 | Bastyr et al. | |
| 10,237,639 | B2 | 3/2019 | McIntosh et al. | |
| 10,387,108 | B2 | 8/2019 | McGibney | |
| 10,397,726 | B2 | 8/2019 | McGibney | |
| 10,848,896 | B2 | 11/2020 | McGibney | |
| 10,972,835 | B2 | 4/2021 | Rollow, IV | |
| 11,127,415 | B2 | 9/2021 | Magnusson et al. | |
| 11,190,871 | B2 | 11/2021 | Yorga et al. | |
| 2005/0280701 | A1 | 12/2005 | Wardell | |
| 2006/0034469 | A1 | 2/2006 | Tamiya et al. | |
| 2006/0165242 | A1 | 7/2006 | Miki et al. | |
| 2008/0085014 | A1 | 4/2008 | Chen et al. | |
| 2008/0107277 | A1 | 5/2008 | Somasundaram et al. | |
| 2008/0285771 | A1 | 11/2008 | Tanaka et al. | |
| 2009/0129609 | A1 | 5/2009 | Oh et al. | |
| 2010/0034397 | A1 | 2/2010 | Nakadai et al. | |
| 2010/0135118 | A1 | 6/2010 | Van Leest et al. | |
| 2011/0135125 | A1 | 6/2011 | Zhan et al. | |
| 2012/0093344 | A1 | 4/2012 | Sun et al. | |
| 2012/0245933 | A1 | 9/2012 | Flaks et al. | |
| 2013/0083934 | A1 | 4/2013 | Ahgren | |
| 2013/0101134 | A1 | 4/2013 | Betts-Lacroix | |
| 2013/0142342 | A1 | 6/2013 | Del Galdo et al. | |
| 2013/0258813 | A1 | 10/2013 | Herre et al. | |
| 2014/0050328 | A1 | 2/2014 | Fischer | |
| 2014/0098964 | A1* | 4/2014 | Rosca | H04R 1/406 381/56 |
| 2014/0119552 | A1 | 5/2014 | Beaucoup | |
| 2014/0133666 | A1 | 5/2014 | Tanaka et al. | |
| 2014/0185824 | A1 | 7/2014 | Burnett | |
| 2014/0314251 | A1 | 10/2014 | Rosca et al. | |
| 2014/0348342 | A1 | 11/2014 | Laaksonen et al. | |
| 2015/0185312 | A1 | 7/2015 | Gaubitch et al. | |
| 2015/0222996 | A1 | 8/2015 | Chu et al. | |
| 2015/0230026 | A1 | 8/2015 | Eichfeld et al. | |
| 2016/0071526 | A1 | 3/2016 | Wingate et al. | |
| 2016/0112469 | A1 | 4/2016 | Liu | |
| 2016/0173976 | A1 | 6/2016 | Podhradsky | |
| 2017/0178628 | A1 | 6/2017 | Macours et al. | |
| 2017/0347217 | A1 | 11/2017 | McGibney | |
| 2017/0366896 | A1 | 12/2017 | Adsumilli et al. | |
| 2017/0374454 | A1 | 12/2017 | Bernardini et al. | |
| 2018/0074782 | A1 | 3/2018 | McGibney | |
| 2018/0098174 | A1 | 4/2018 | Goodwin et al. | |
| 2018/0249267 | A1 | 8/2018 | Klingler et al. | |
| 2019/0349471 | A1 | 11/2019 | Ferguson et al. | |
| 2021/0035563 | A1 | 2/2021 | Cartwright et al. | |
| 2022/0004355 | A1* | 1/2022 | Mcgibney | H04R 29/005 |

FOREIGN PATENT DOCUMENTS

| | | | |
|---|---|---|---|
| JP | 3154468 | B2 | 4/2001 |
| JP | 2018026701 | A | 2/2018 |
| WO | 03010995 | A2 | 2/2003 |
| WO | 2022/118072 | A1 | 6/2022 |
| WO | 2023/164773 | A1 | 9/2023 |

OTHER PUBLICATIONS

Final Office Action dated Dec. 5, 2024, from U.S. Appl. No. 17/739,926, 29 sheets.

International Search Report and Written Opinion mailed Sep. 15, 2017, from International Application No. PCT/CA2017/050642, 12 sheets.

Joseph Hector Dibiase, Thesis entitled, "A High-Accuracy, Low-Latency Technique for Talker Localization in Reverberant Environments Using Microphone Arrays", Brown University, May 2000.

Notice of Allowance dated Apr. 30, 2018, from U.S. Appl. No. 15/597,646, 18 sheets.

International Search Report and Written Opinion mailed Jun. 7, 2023, from International Application No. PCT/CA2023/50412, 11 sheets.

Extended European Search Report mailed May 7, 2019, from European Patent Application No. 17805437.5, 23 sheets.

Notice of Allowance dated May 24, 2019, from U.S. Appl. No. 16/110,393, 6 sheets.

Non-Final Rejection dated Sep. 17, 2018, from U.S. Appl. No. 16/110,393, 14 sheets.

International Search Report and Written Opinion mailed Oct. 12, 2017, from International Application No. PCT/CA2017/050676, 8 sheets.

Notice of Allowance dated Apr. 2, 2019, from U.S. Appl. No. 15/603,986, 42 sheets.

Final Rejection dated May 25, 2018, from U.S. Appl. No. 15/603,986, 13 sheets.

Non-Final Rejection dated Jan. 24, 2018, from U.S. Appl. No. 15/603,986, 26 sheets.

Communication pursuant to Article 94(3) EPC dated Feb. 17, 2020, from European Patent Application No. 17805437.5, 6 sheets.

Notice of Allowance dated Jul. 16, 2020, from U.S. Appl. No. 16/518,013, 19 sheets.

Non-Final Rejection dated Feb. 28, 2020, from U.S. Appl. No. 16/518,013, 21 sheets.

Notice of Allowance dated Apr. 11, 2019, from U.S. Appl. No. 16/110,393, 18 sheets.

Notice of Allowance dated Jan. 19, 2018, from U.S. Appl. No. 15/597,646, 22 sheets.

Notice of Allowance dated Aug. 16, 2021, from U.S. Appl. No. 17/097,560, 33 sheets.

Extended European search report from European Application No. 20194651.4 with a mailing date of Jan. 21, 2021, 11 sheets.

Extended European search report from European Application No. 17847841.8 with a mailing date of Jun. 28, 2019, 12 sheets.

Communication pursuant to Rules 70(2) and 70a(2) EPC from European Application No. 17847841.8 with a mailing date of Jul. 16, 2019, 1 sheet.

U.S. Appl. No. 62/343,512, filed May 31, 2016, 41 sheets.

U.S. Appl. No. 62/162,091, filed May 15, 2015, 52 sheets.

U.S. Appl. No. 62/345,208, filed Jun. 3, 2016, 44 sheets.

Non-Final Rejection dated Feb. 9, 2021, from U.S. Appl. No. 16/434,725, 72 sheets.

Notice of Allowance dated Jan. 25, 2023, from U.S. Appl. No. 17/374,585, 11 sheets.

Notice of Allowance dated Jan. 19, 2023, from U.S. Appl. No. 17/374,585, 41 sheets.

Non-Final Rejection dated Aug. 8, 2022, from U.S. Appl. No. 17/374,585, 57 sheets.

The extended European search report completed Feb. 2, 2022 (dated Feb. 10, 2022), from European Application No. 19808293.5, 8 sheets.

Emanuel A. P. Habets and Jacob Benesty, "A Two-Stage Beamforming Approach for Noise Reduction and Dereverberation", IEEE Transactions on Audio, Speeach, and Language Processing, vol. 21, No. 5, May 2013, pp. 945-958.

Gerhard Doblinger, "An Adaptive Microphone Array for Optimum Beamforming and Noise Reduction", 14th European Signal Processing Conference (EUSIPCO 2006), Florence, Italy, Sep. 4-8, 2006, 5 sheets.

Taylor B. Spalt, Christopher R. Fuller, Thomas F. Brooks, William M. Humphreys, Jr., "A Background Noise Reduction Technique

(56) References Cited

OTHER PUBLICATIONS using Adaptive Noise Cancellation for Microphone Arrays", p. 1-16, available at: https://ntrs.nasa.gov/search.jsp?R=20110012472 May 16, 2018T17:29:07+00:00Z.
International Search Report and Written Opinion dated Oct. 3, 2019, from PCT/CA2019/050708, 9 sheets.
Notice of Allowance dated Feb. 10, 2023, from U.S. Appl. No. 16/421,908, 24 sheets.
Final Rejection dated Oct. 11, 2022, from U.S. Appl. No. 16/421,908, 26 sheets.
Non-Final Rejection dated Apr. 20, 2022, from U.S. Appl. No. 16/421,908, 38 sheets.
International Search Report and Written Opinion dated Jun. 15, 2023, from International Application No. PCT/CA2023/050371, 7 sheets.
International Search Report and Written Opinion dated May 30, 2023, from International Application No. PCT/CA2023/050277, 7 sheets.
The extended European search report dated Sep. 27, 2022, from European Patent Application No. 20749339.6, 15 sheets.
International Search Report and Written Opinion mailed May 22, 2020, from International Application No. PCT/CA2020/050100, 11 sheets.
Non-Final Rejection dated Dec. 10, 2020, from U.S. Appl. No. 16/774,258, 28 sheets.
Notice of Allowance dated Jul. 26, 2021, from U.S. Appl. No. 16/774,258, 21 sheets.
Lightspeed Technologies, "Audio Solutions for Classroom Reopening Challenges", Duplicom Presentation Systems, https://www.duplicom.com/products/lightspeed-audio-solutions/, Aug. 27, 2020, 7 sheets.
Luis Guerra, Troy Jensen, "How to Use The Shure MXA910 Ceiling Array Microphone for Voice Lift", Shure Incorporated, USA, Created Sep. 2016, upated Jul. 2018, Shure Incorporated, 11 sheets.
Alberta Infrastructure, "Sound-Field Systems Guide for Classrooms", published in May 2004, 19 sheets.
The extended European Search Report dated Feb. 11, 2022, from European Patent Application No. 21204322.8, 7 sheets.
International Search and Written Opinion dated Jul. 18, 2022, from PCT/CA2022/050731, 8 sheets.
Non-Final Office Action dated Apr. 25, 2024, from U.S. Appl. No. 17/739,926, 57 sheets.
Non-Final Office Action dated Oct. 11, 2023, from U.S. Appl. No. 17/516,480, 40 sheets.
Communication pursuant to Article 94(3) EPC dated Oct. 14, 2024, from European Patent Application No. 20749339.6-1207, 10 sheets.
Notice of Allowance dated Feb. 7, 2024, from U.S. Appl. No. 17/516,480, 10 sheets.
Communication pursuant to Article 94(3) EPC dated Feb. 29, 2024, from European Patent Application No. 21204322.8, 9 sheets.
Communication pursuant to Article 94(3) EPC dated Mar. 12, 2024, from European Patent Application No. 19808293.5, 6 sheets.
Theodoropoulos D et al.: "A reconfigurable beamformer for audio applications", 7th Symposium on Application Specific Processors, 2009. SASP '09. IEEE,, Jul. 27, 2009, pp. 80-87, XP031522047, ISBN: 978-1-4244-4939-2.
The extended European search report dated Dec. 17, 2025, from European Patent Application No. 23762644.5, 9 sheets.
Kozintsev I et al.: "Position Calibration of Microphones and Loudspeakers in Distributed Computing Platforms", IEEE Transactions On Speech and Audio Processing, IEEE Service Center, New York, NY, US, vol. 13, No. 1, Jan. 1, 2005 (Jan. 1, 2005), pp. 70-83, XP011123587, ISSN: 1063-6676, DOI: 10.1109/TSA.2004.838540.
Pasi Pertila et al.: "Closed-form self-localization of asynchronous microphone arrays", Hands-Free Speech Communication and Microphone Arrays (HSCMA), 2011 Joint Workshop On, IEEE, May 30, 2011 (May 30, 2011), pp. 139-144, XP031957280, DOI: 10.1109/HSCMA.2011.5942380 ISBN: 978-1-4577-0997-5.
Kovalyov Anton et al.: "Joint Calibration and Synchronization of Two Arrays of Microphones and Loudspeakers Using Particle Swarm Optimization", IEEE Open Journal of Signal Processing, IEEE, vol. 2, Oct. 11, 2021 (Oct. 11, 2021), pp. 535-544, XP011885550, DOI: 10.1109/OJSP.2021.3118574 [retrieved on Oct. 27, 2021].
The extended European search report dated Feb. 10, 2026, from European Patent Application No. 23773395.1, 10 sheets.

* cited by examiner

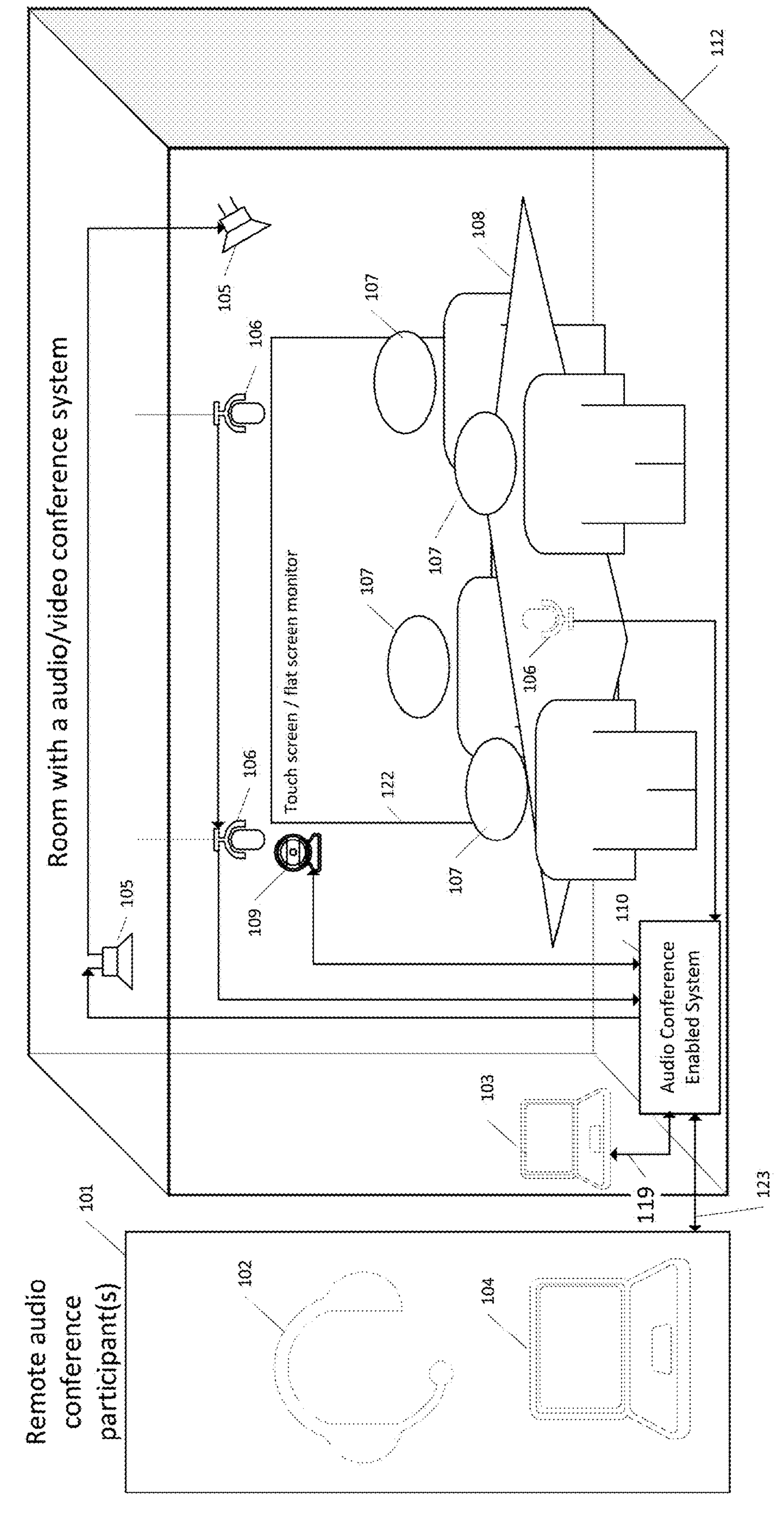
FIG. 1a Prior Art – Typical audio conference system variations

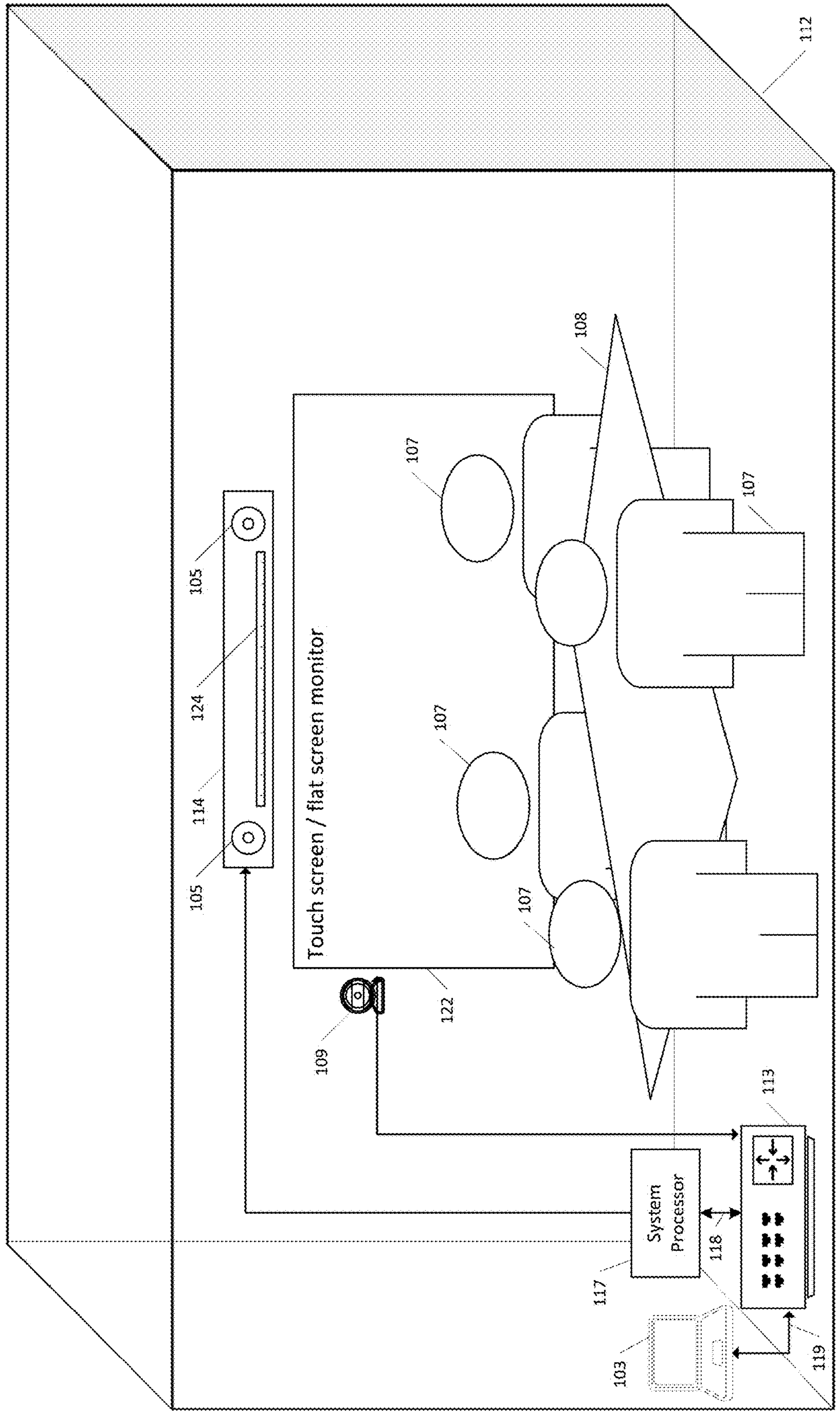
FIG. 1b Prior Art - Microphone Array and Speaker System

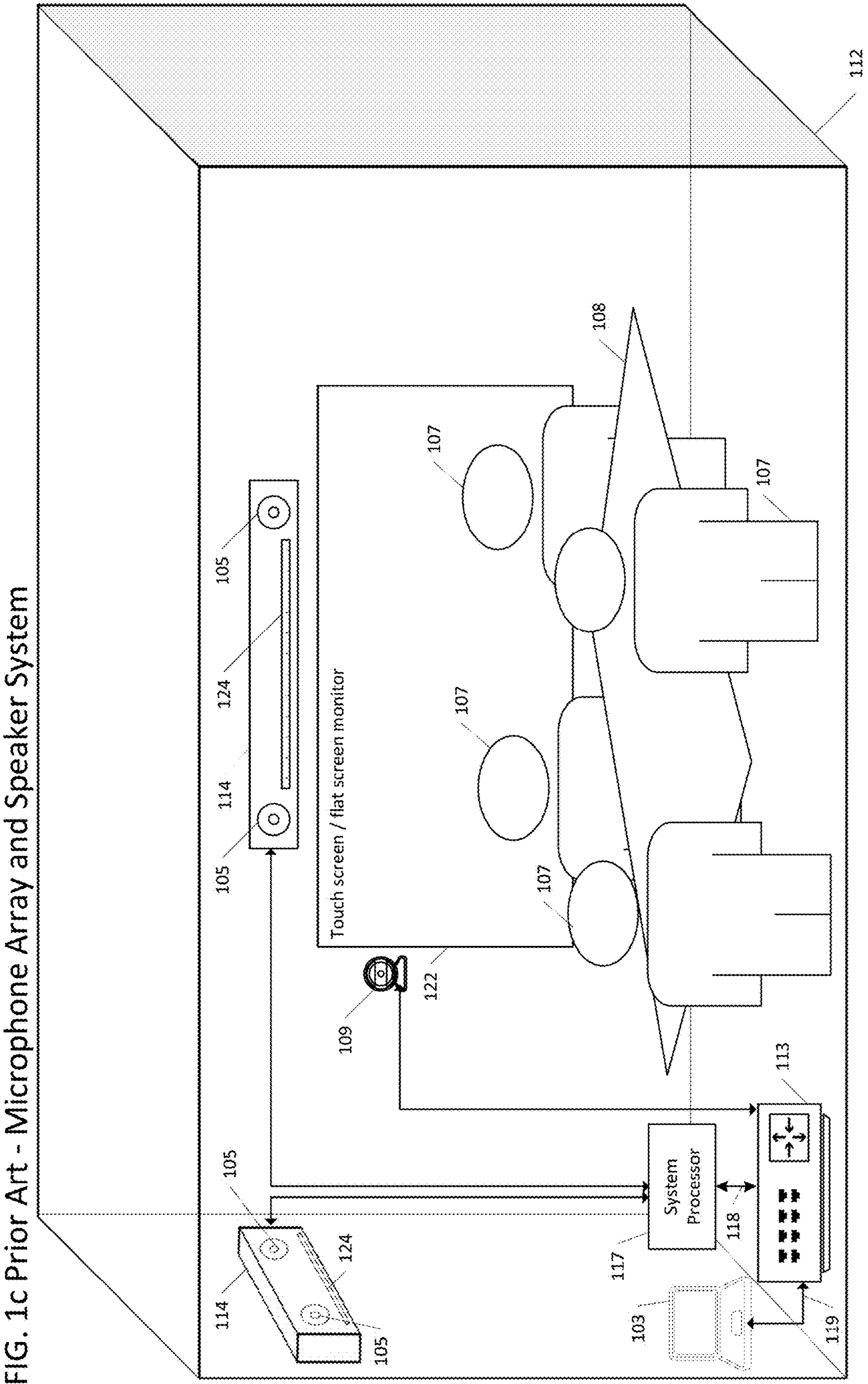
FIG. 1c Prior Art - Microphone Array and Speaker System

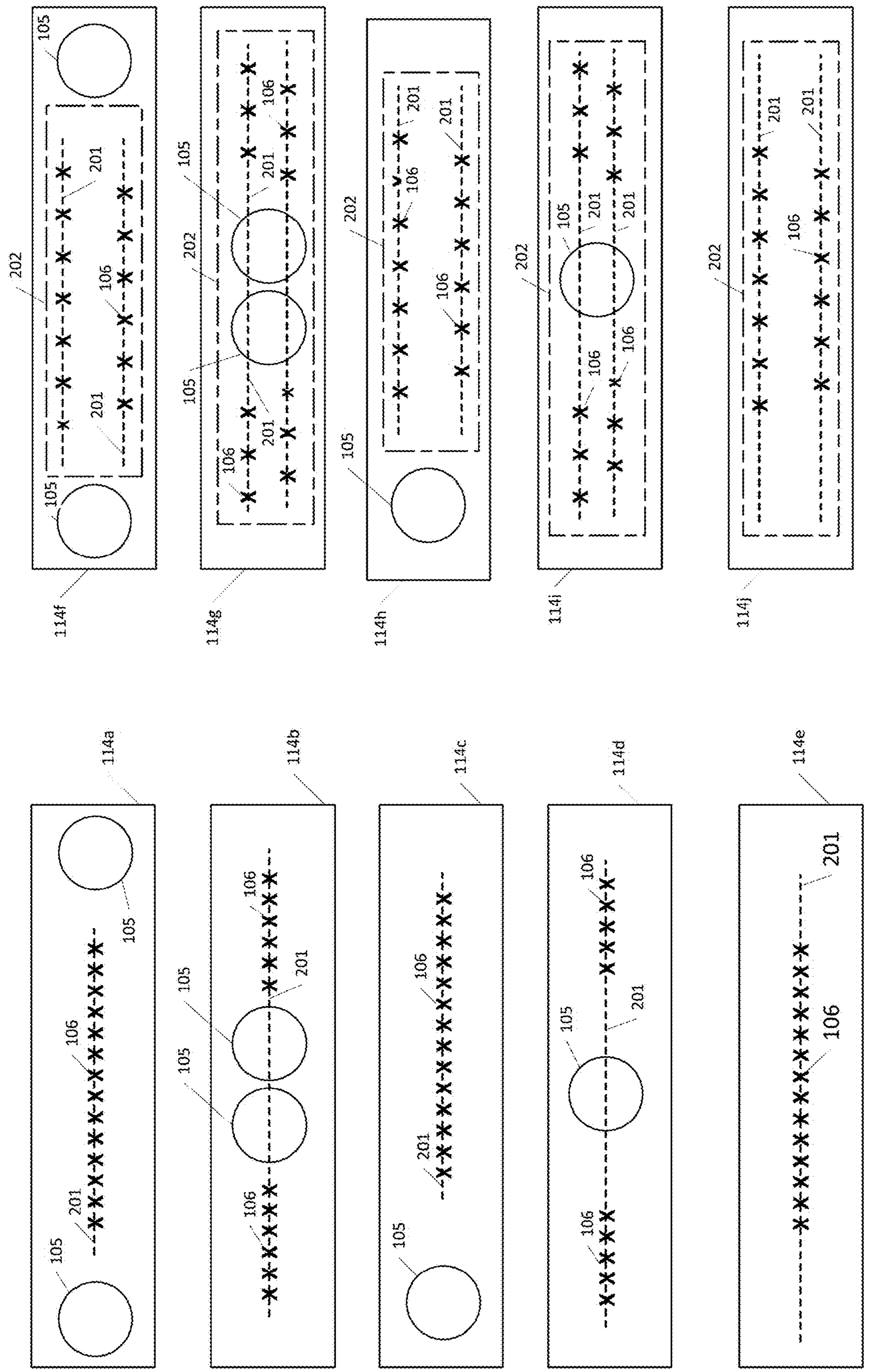
FIG. 2a Examples of Possible Microphone Arrangements

FIG. 3a Current Art – BF Configured Mic Array
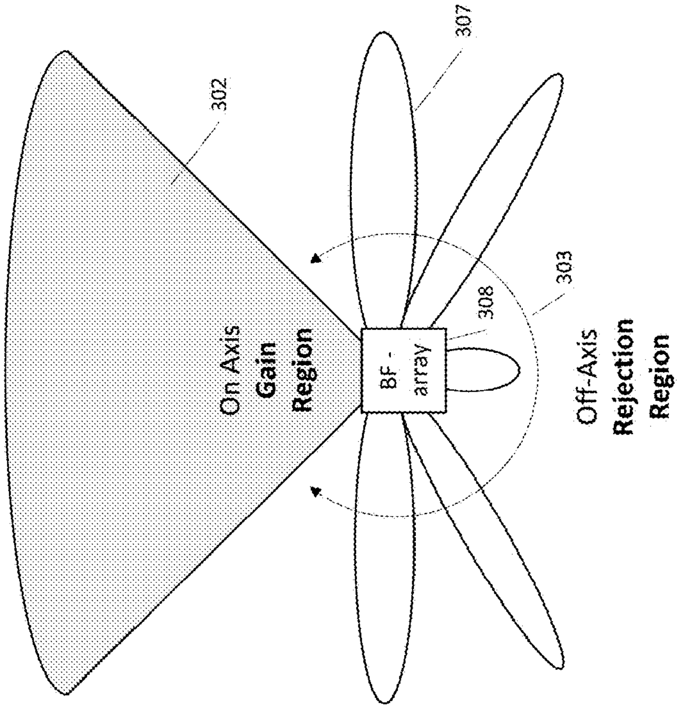
FIG. 3b – VM – Configured Mic Array
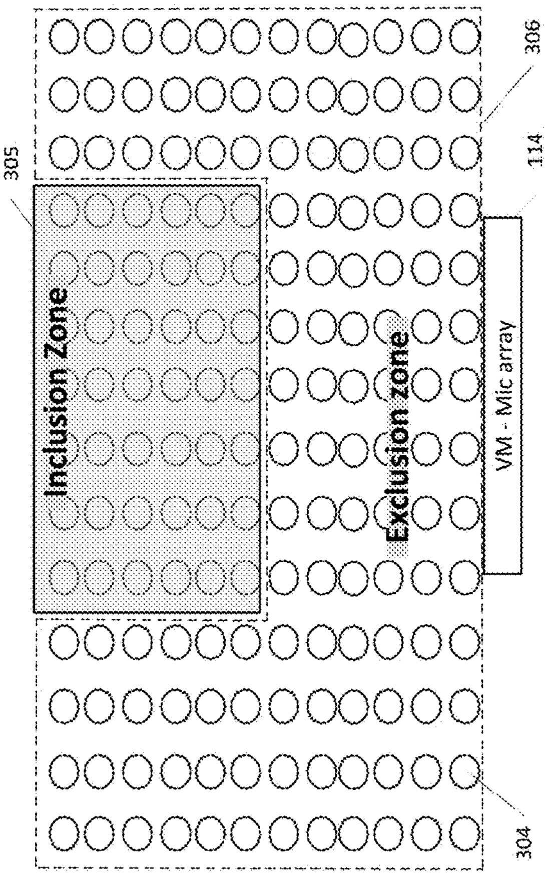

FIG. 4a Current Art – Array coverage patterns
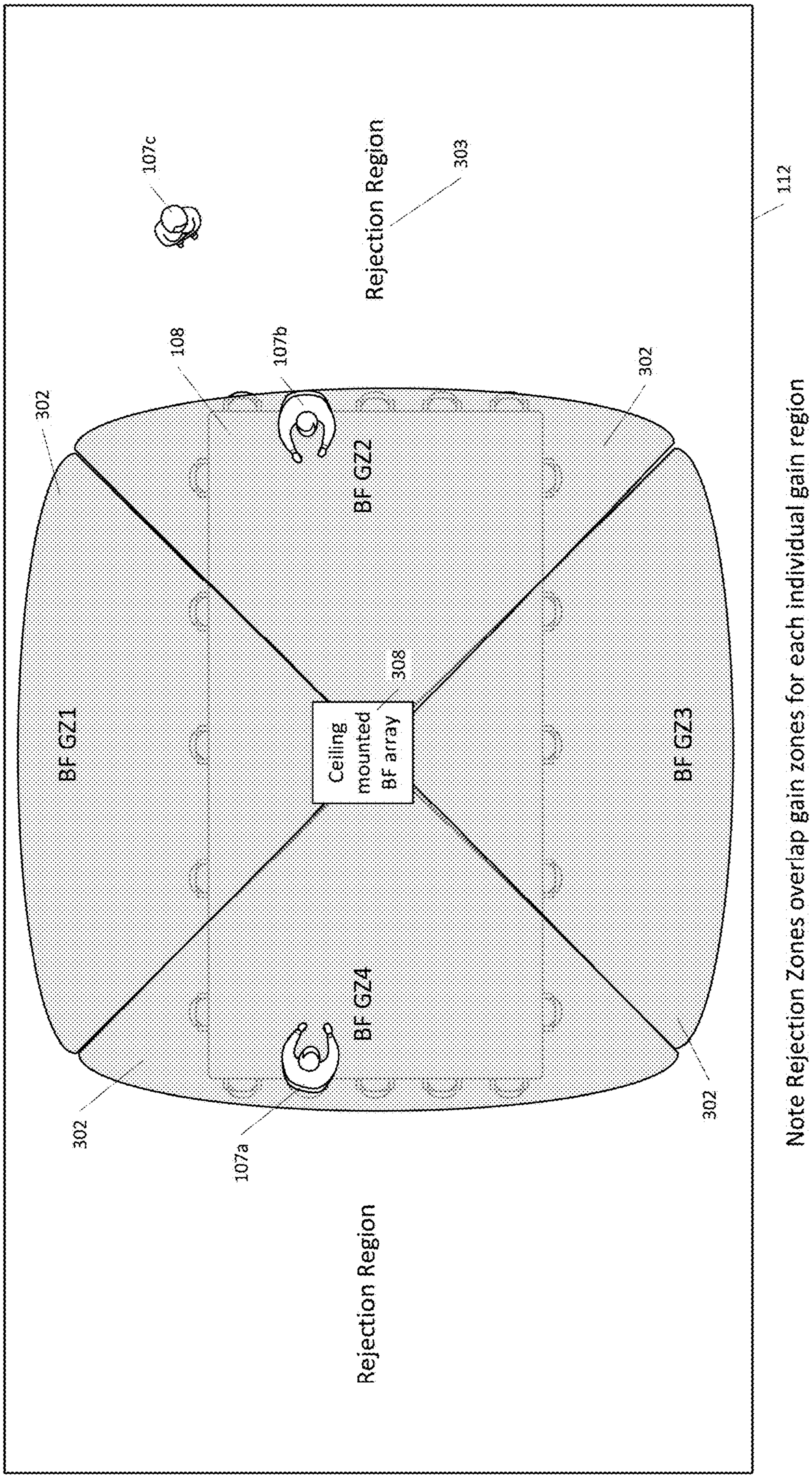
Note Rejection Zones overlap gain zones for each individual gain region

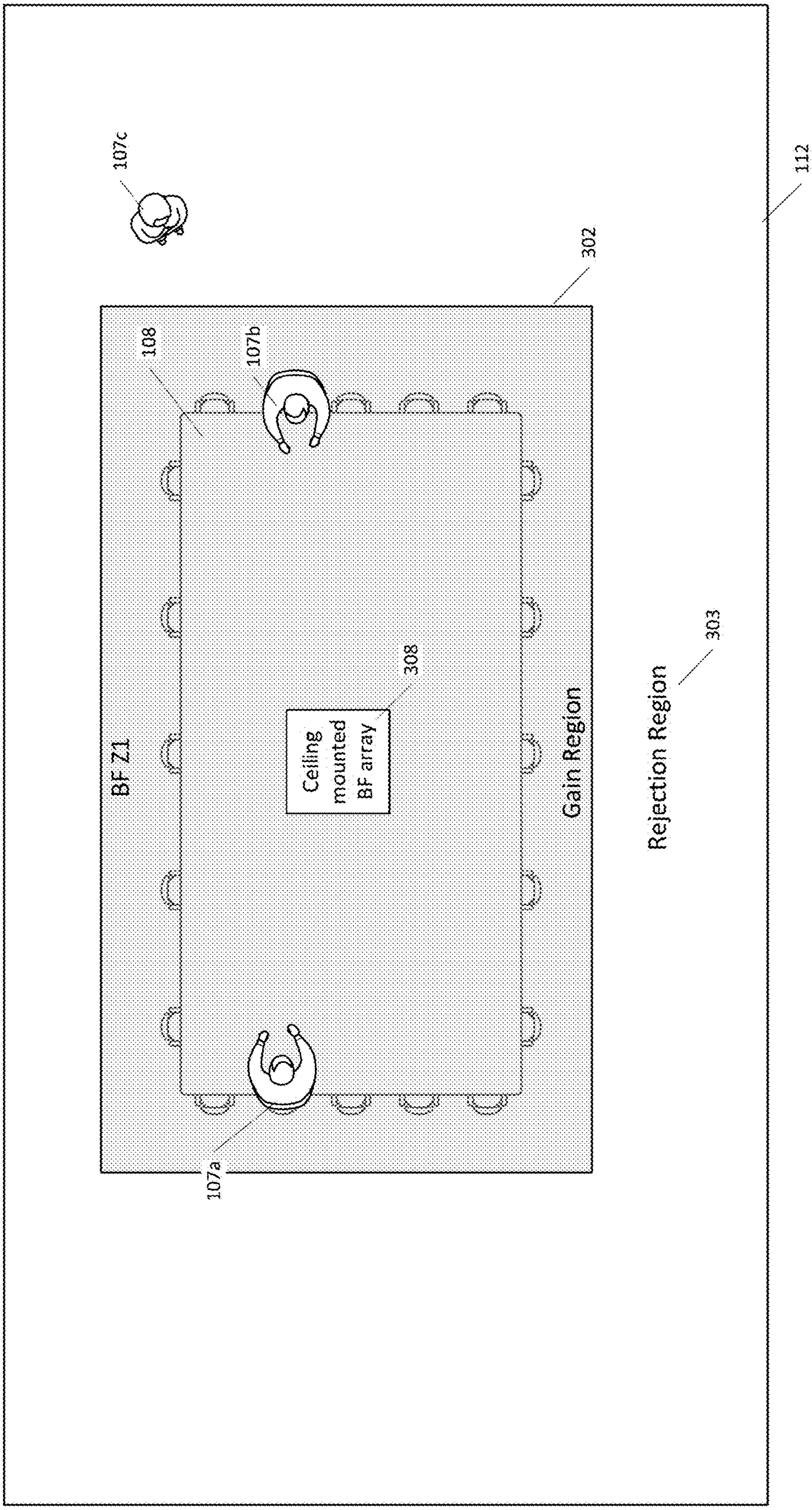
FIG. 4b Current Art – Array coverage patterns

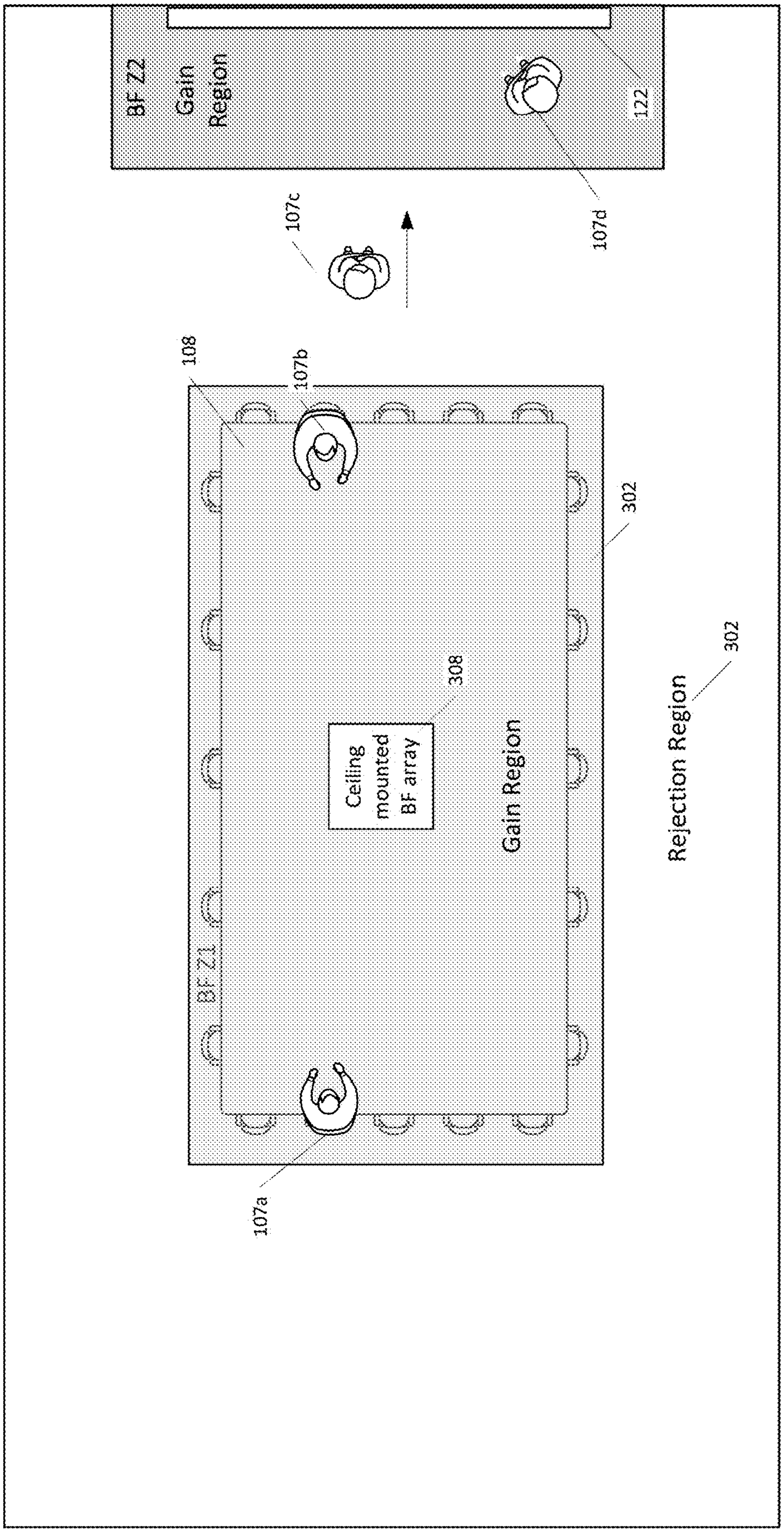
FIG. 4c Prior art – BF Array coverage patterns

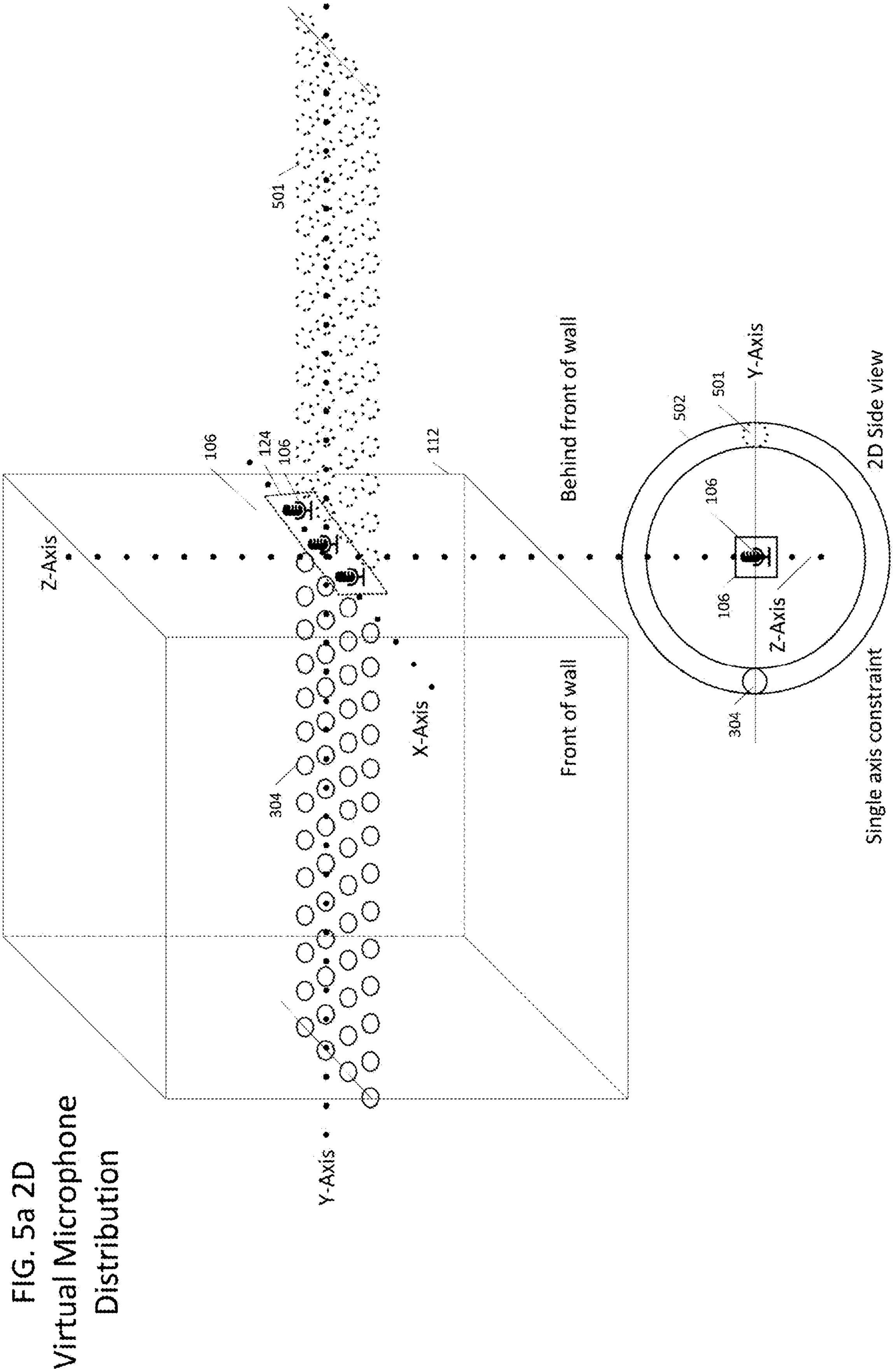
FIG. 5a 2D Virtual Microphone Distribution

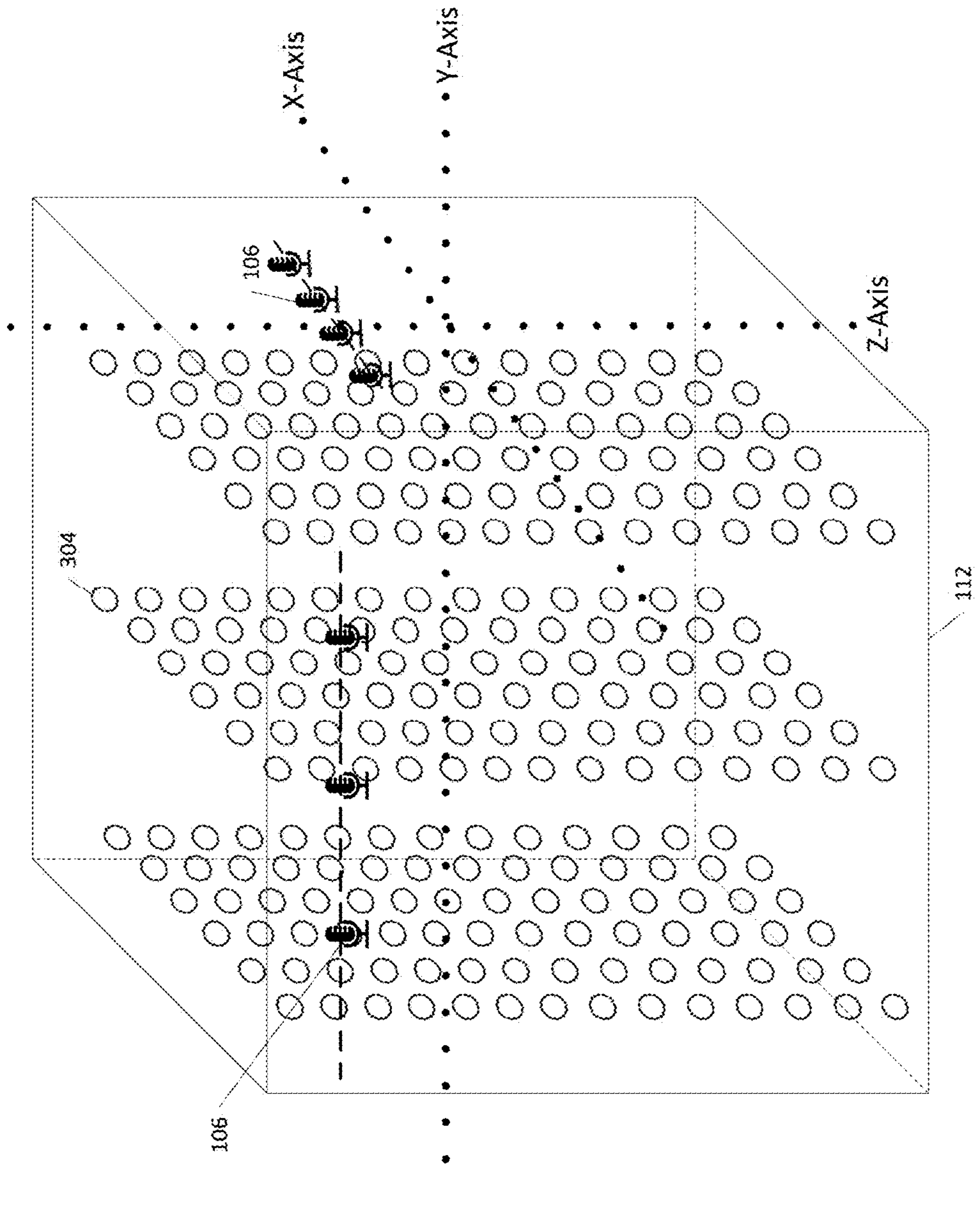
FIG. 5b - 3D Virtual Microphone Distribution

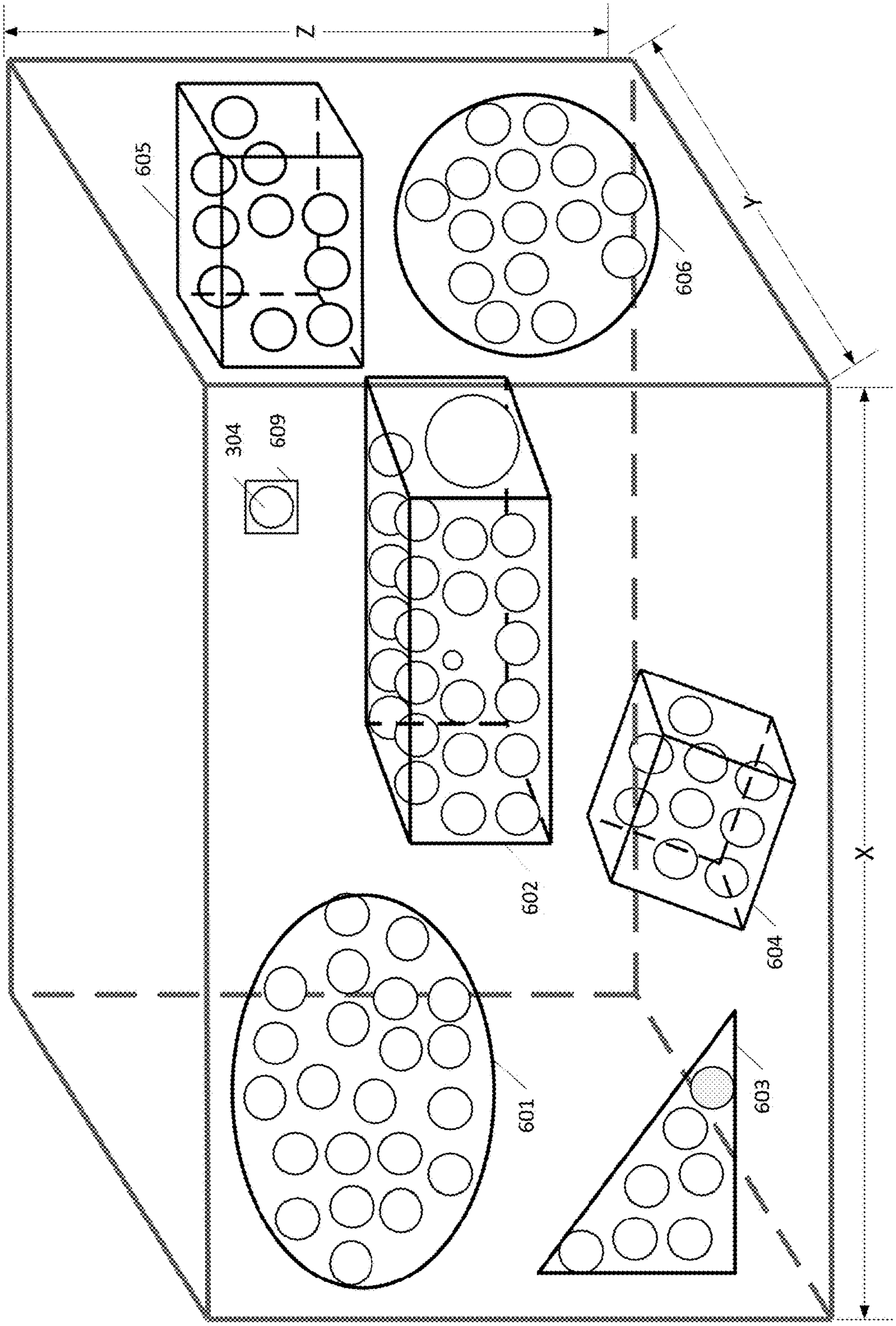
FIG. 6 – Virtual Microphone zone shape examples

FIG. 7a – Top down view of supported zone configurations
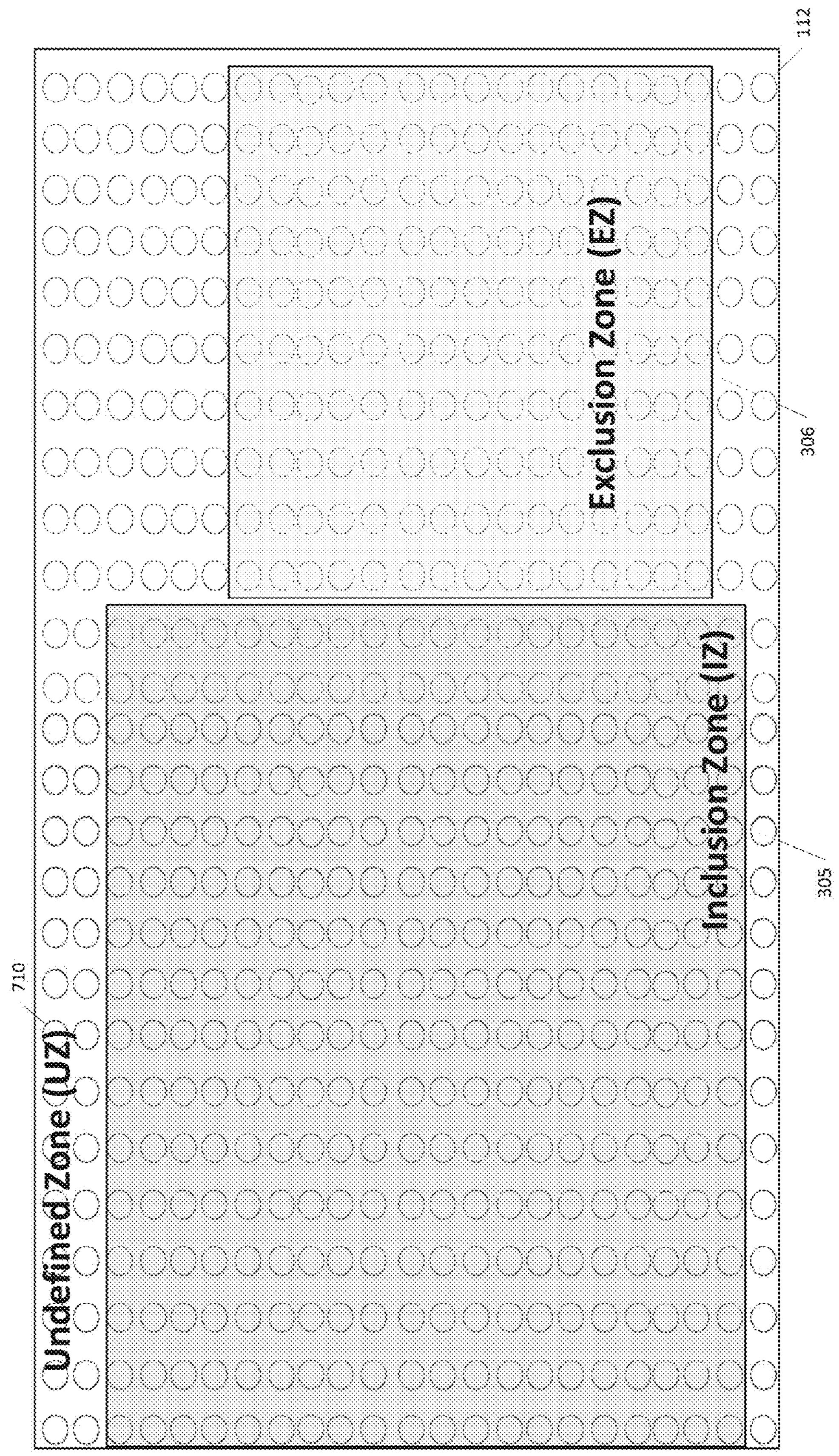

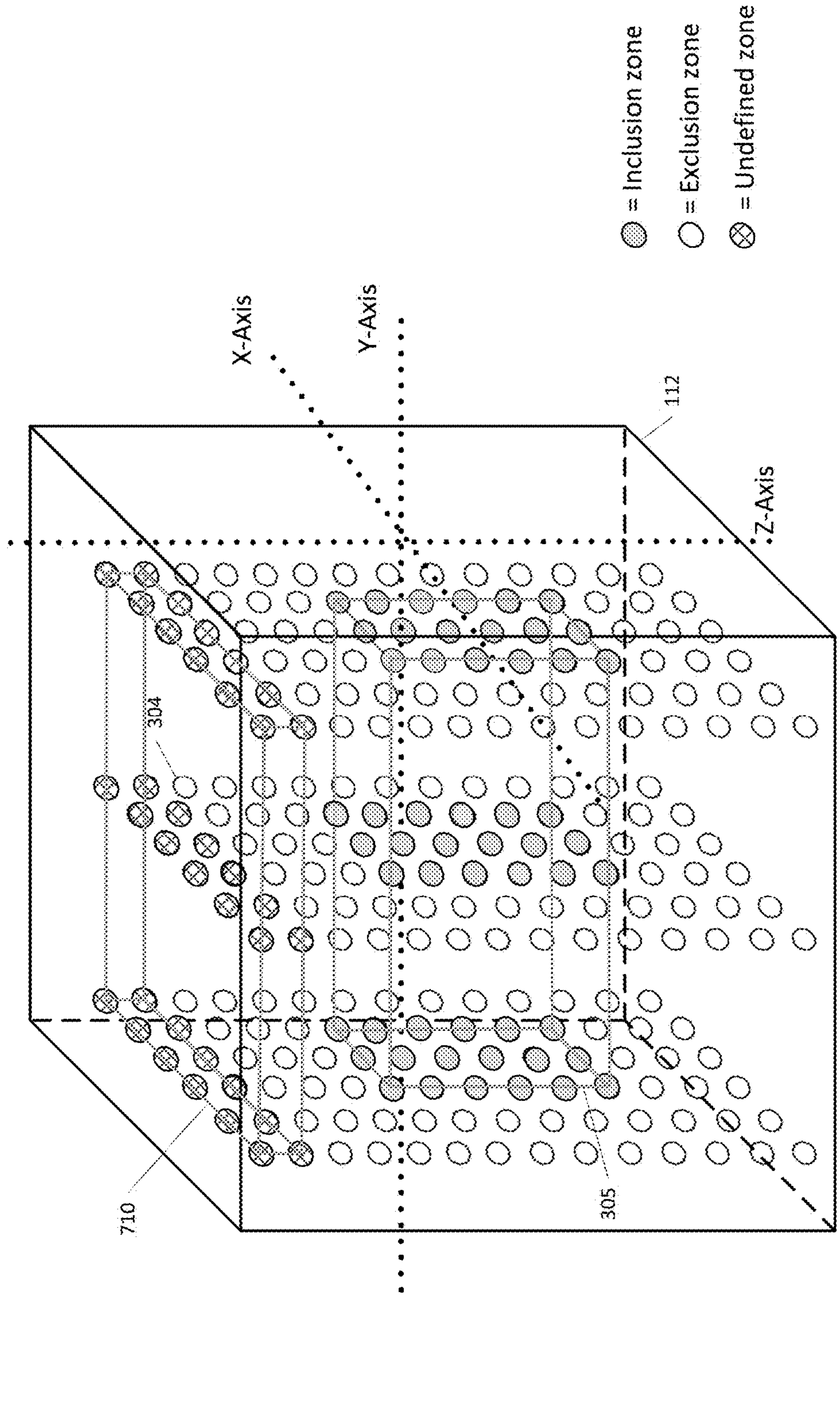
FIG. 7b – Inclusion and Exclusion zones in 3D

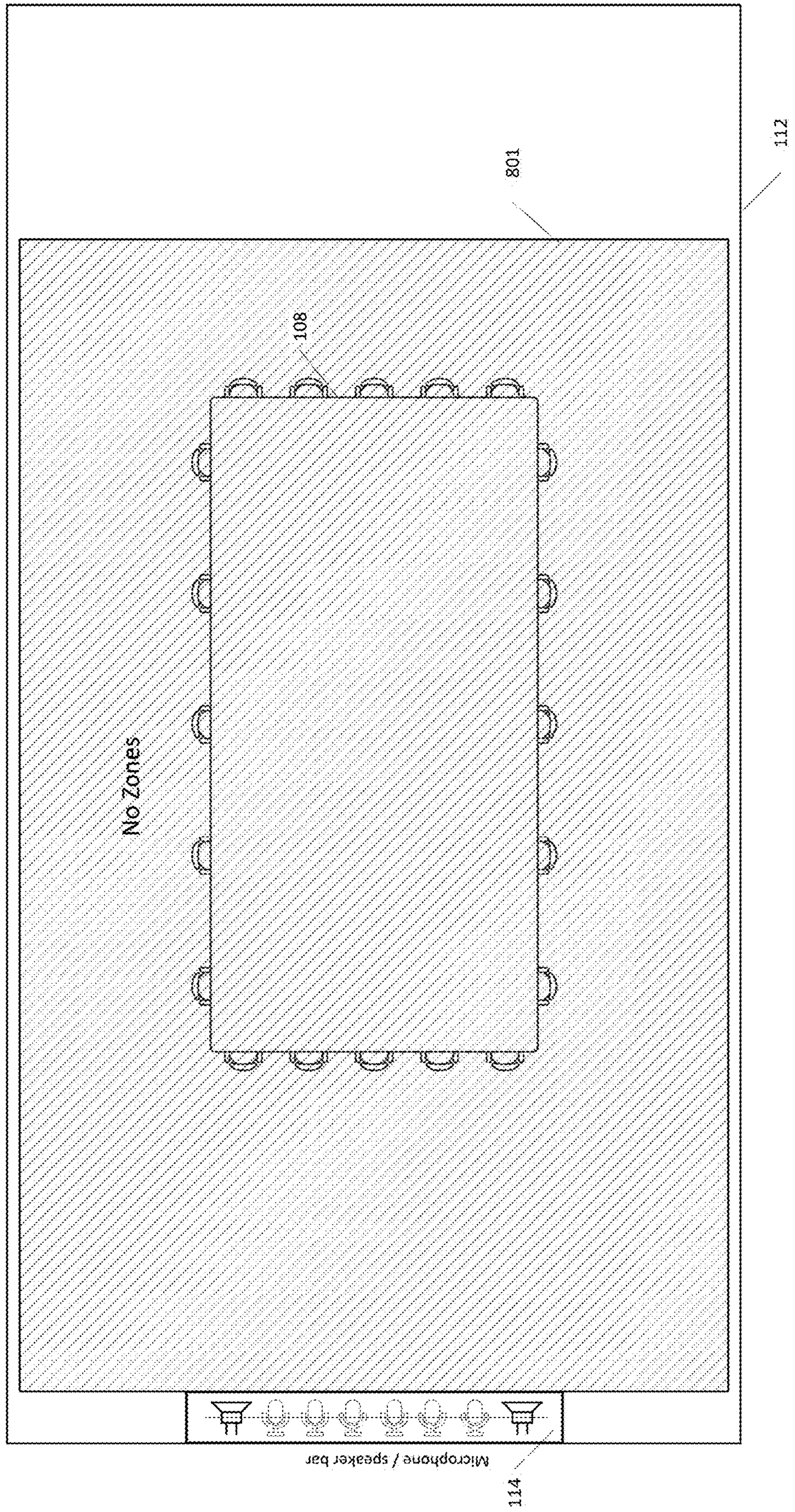
FIG. 8 Current Art – Virtual Microphone Array coverage pattern

FIG. 9a – Top down inclusion and exclusion zone examples
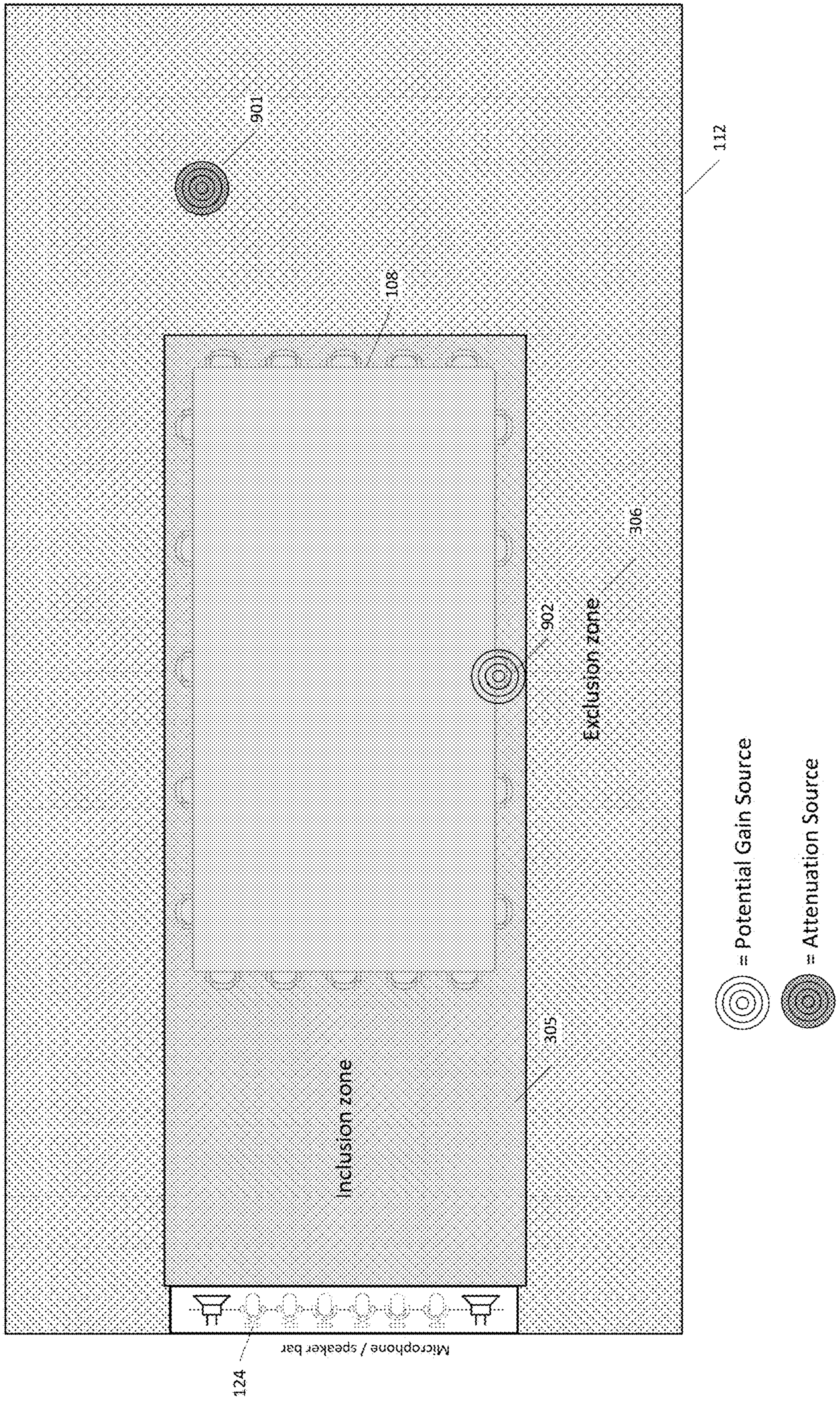

FIG. 9b – Top down inclusion and exclusion zone examples
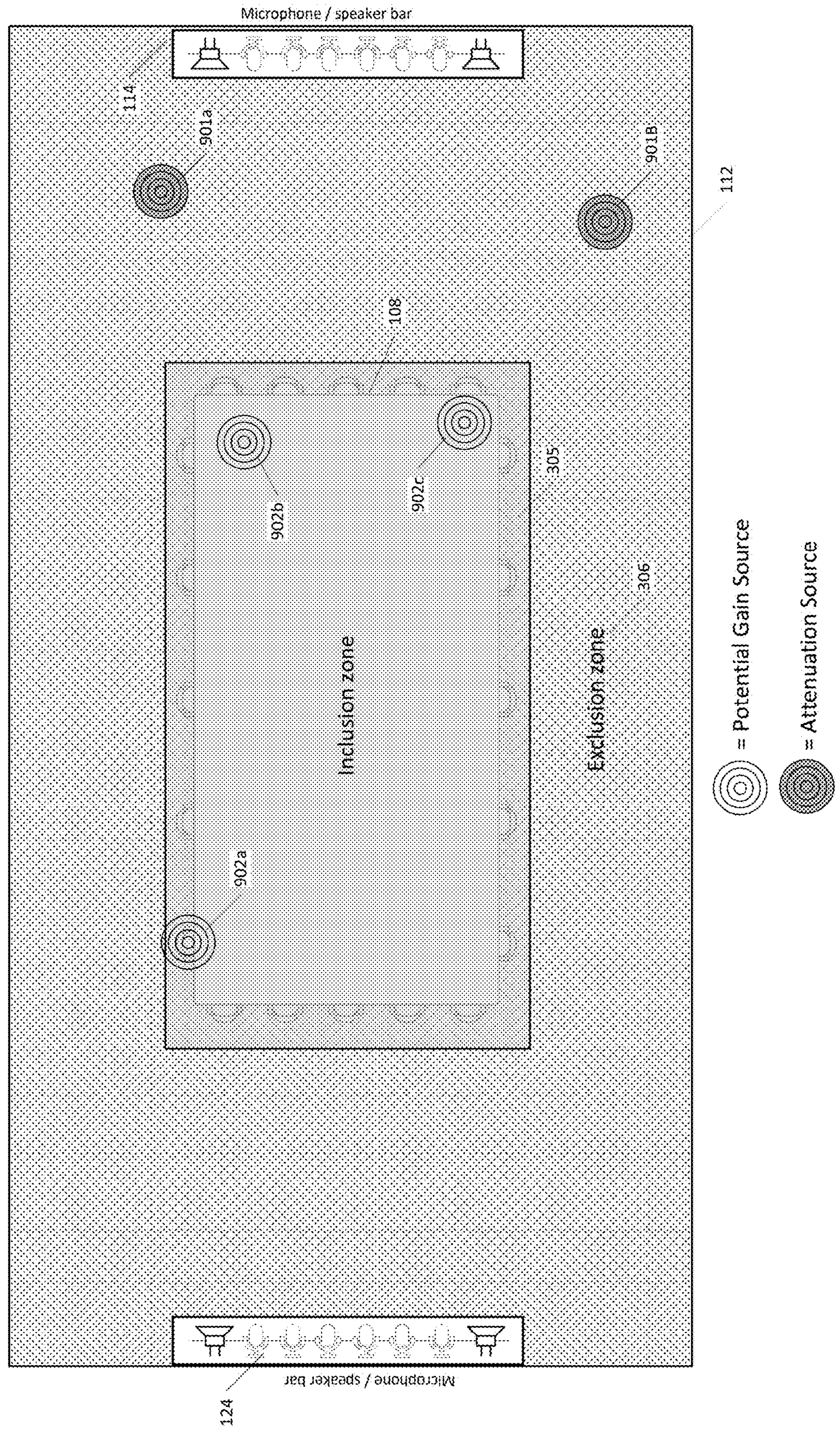

FIG. 9c – Top down inclusion and exclusion zone examples
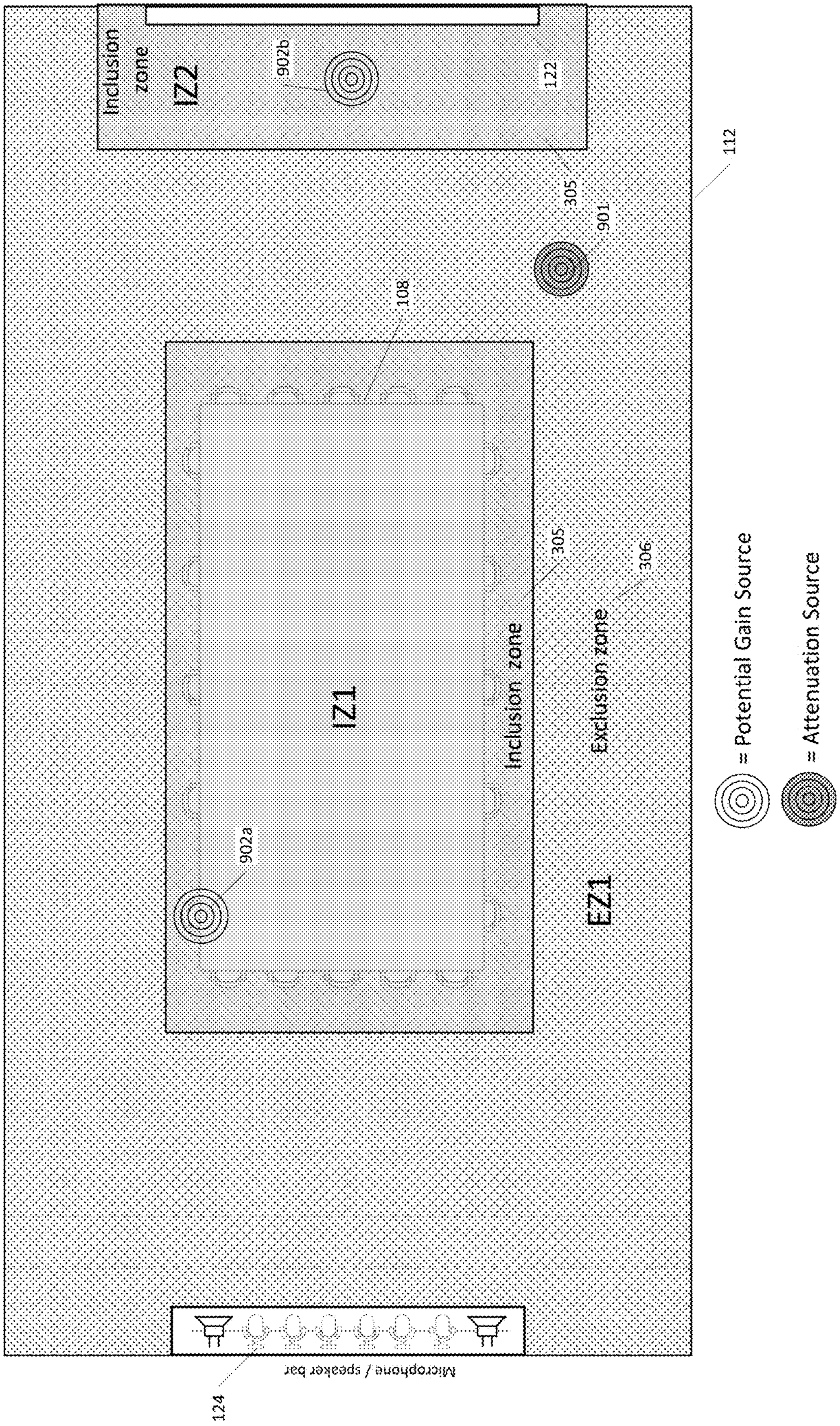

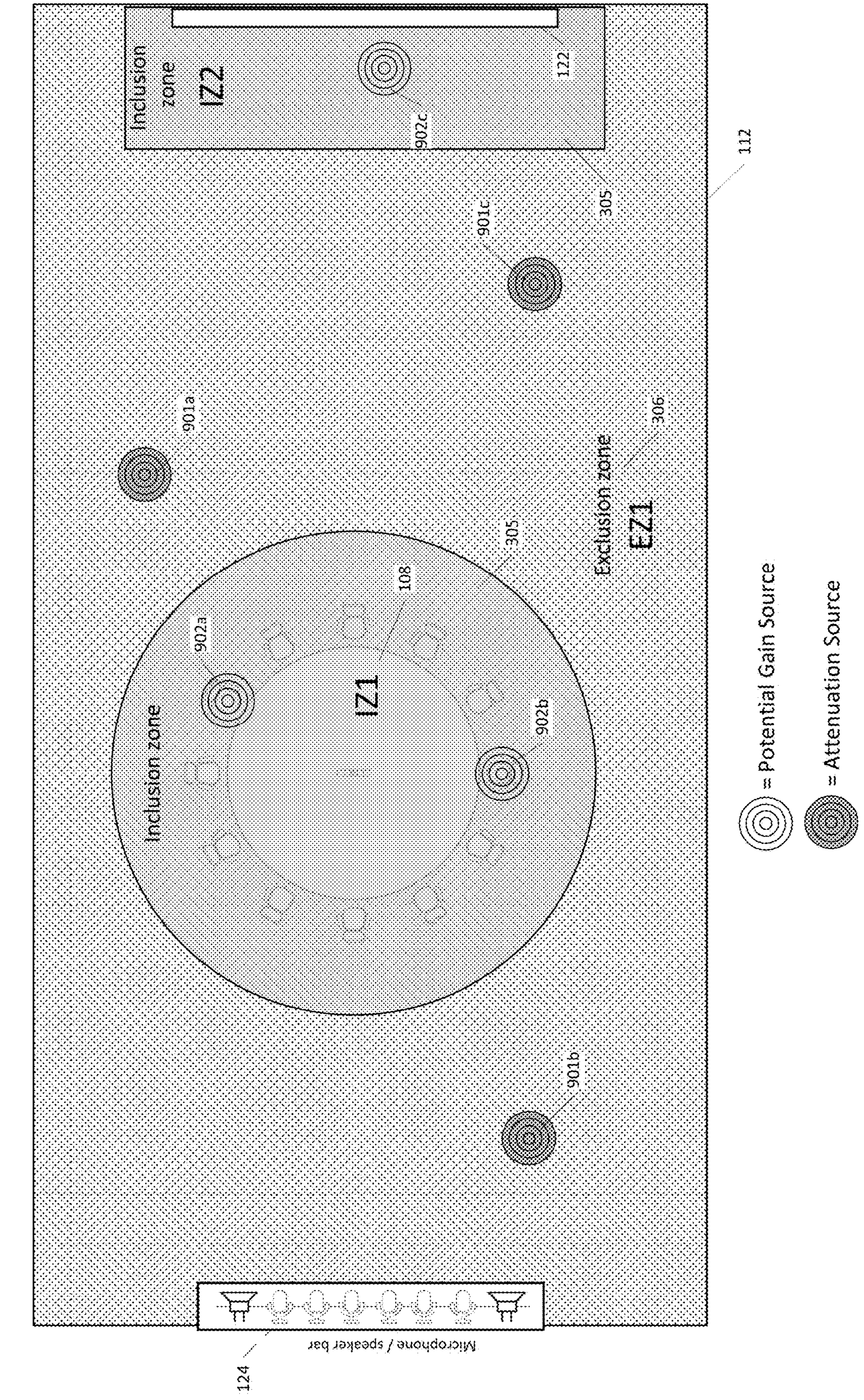
FIG. 9d – Top down inclusion and exclusion zone examples

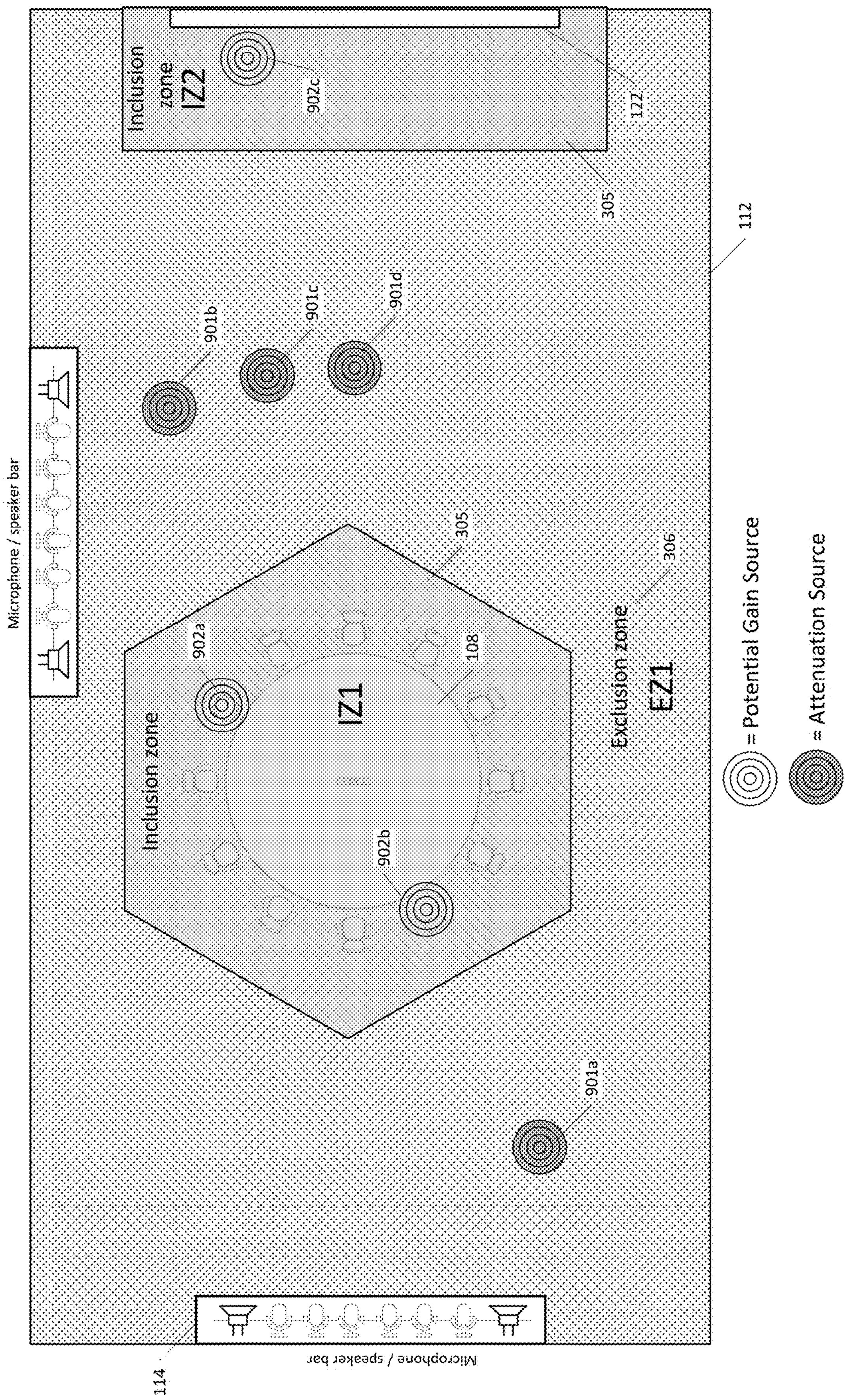
FIG. 9e – Top down inclusion and exclusion zone examples

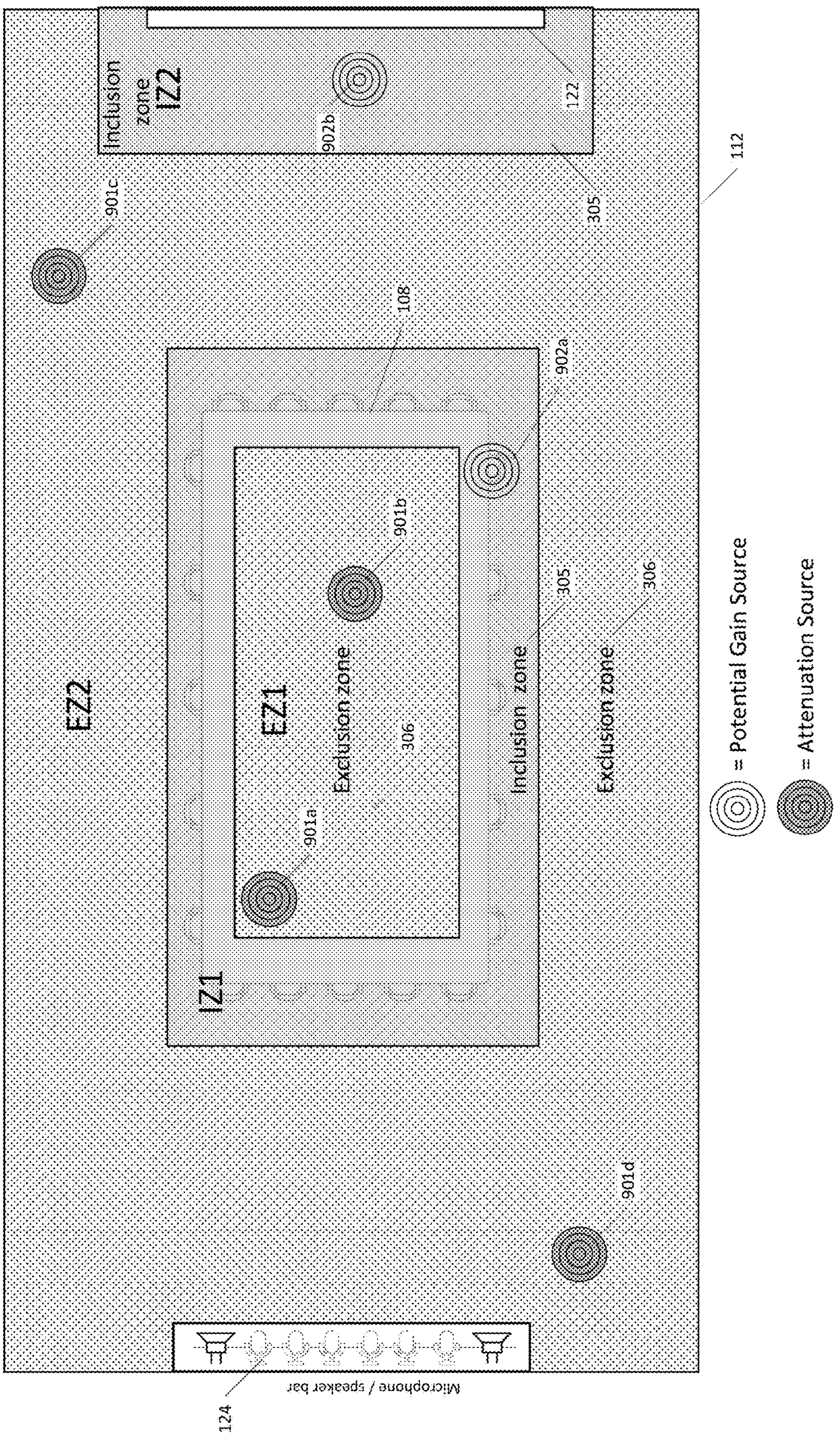
FIG. 9f – Top down inclusion and exclusion zone examples

FIG. 9g – Top down inclusion and exclusion zone examples
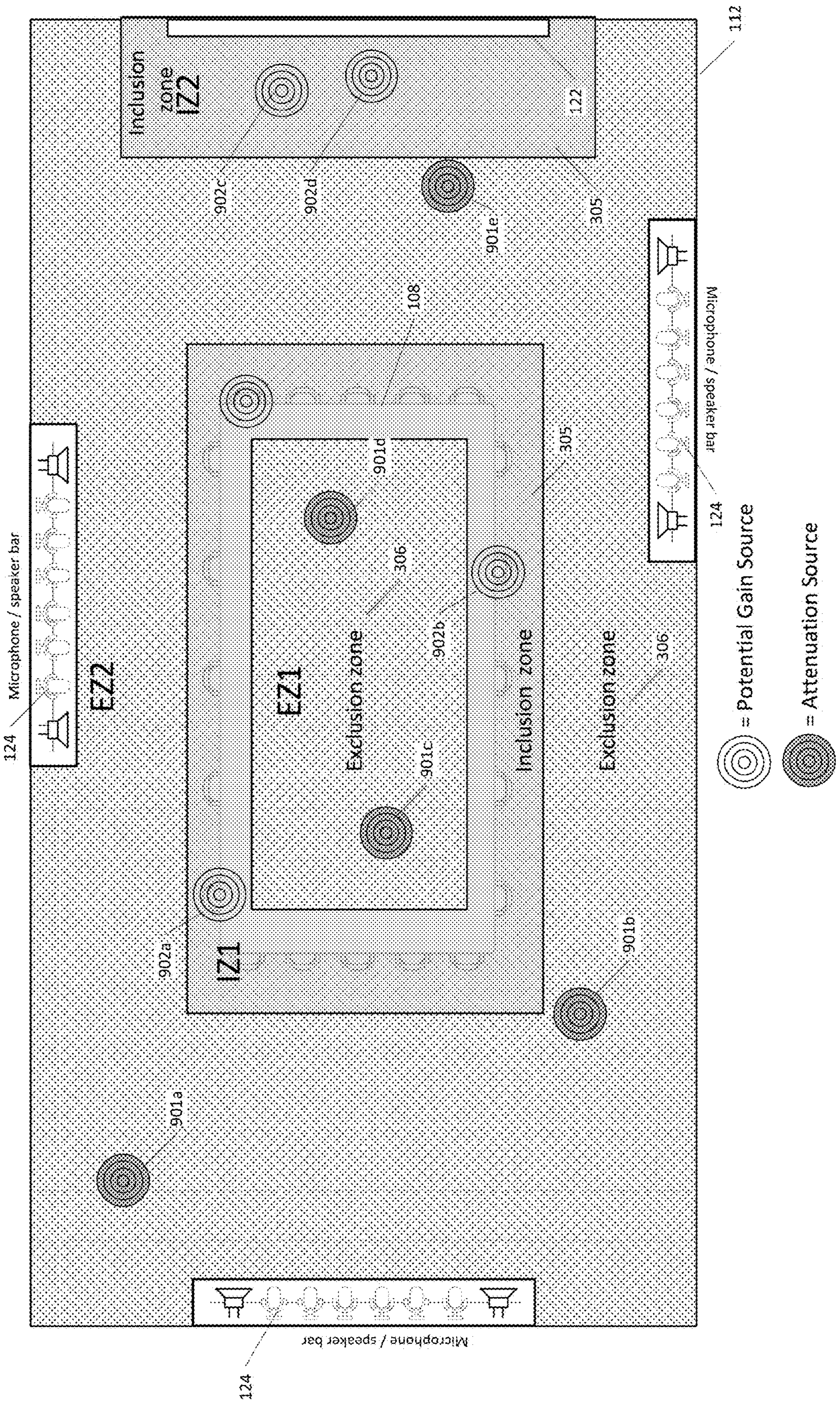

FIG. 9h – Top down inclusion and exclusion zone examples
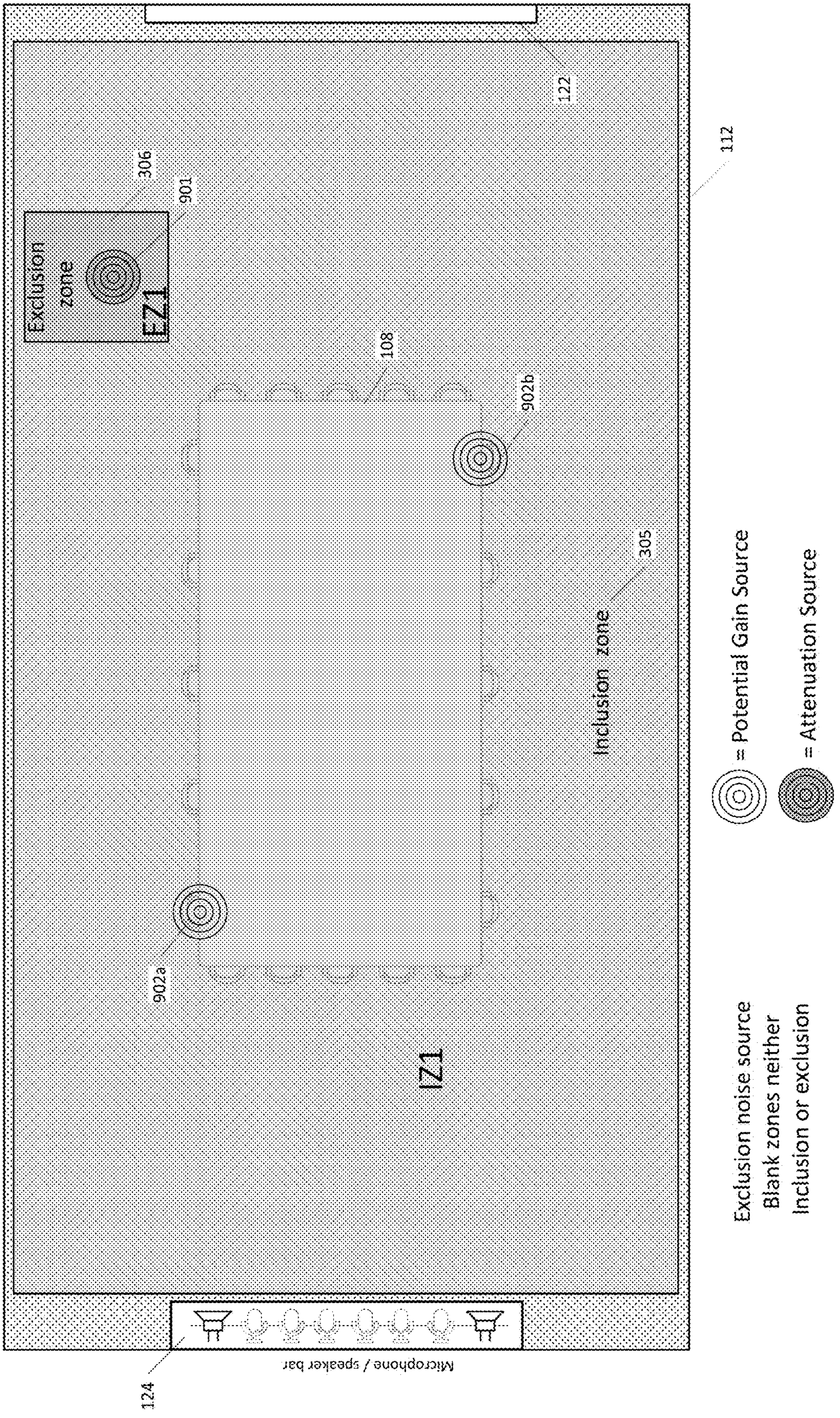

FIG. 10 – Top down- In and out of inclusion zone behaviour
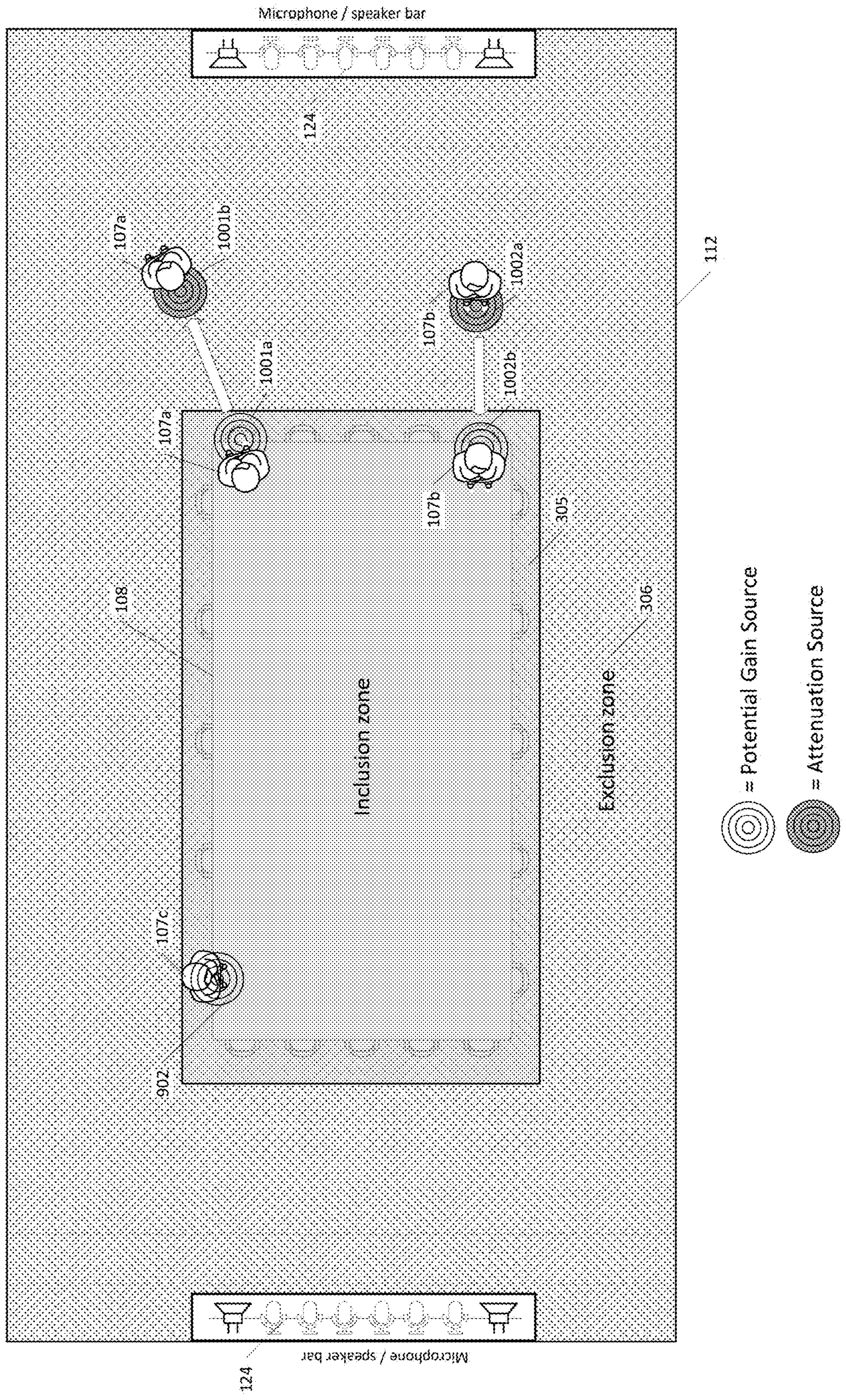

FIG. 11a – Primary Processing Components – System Diagram
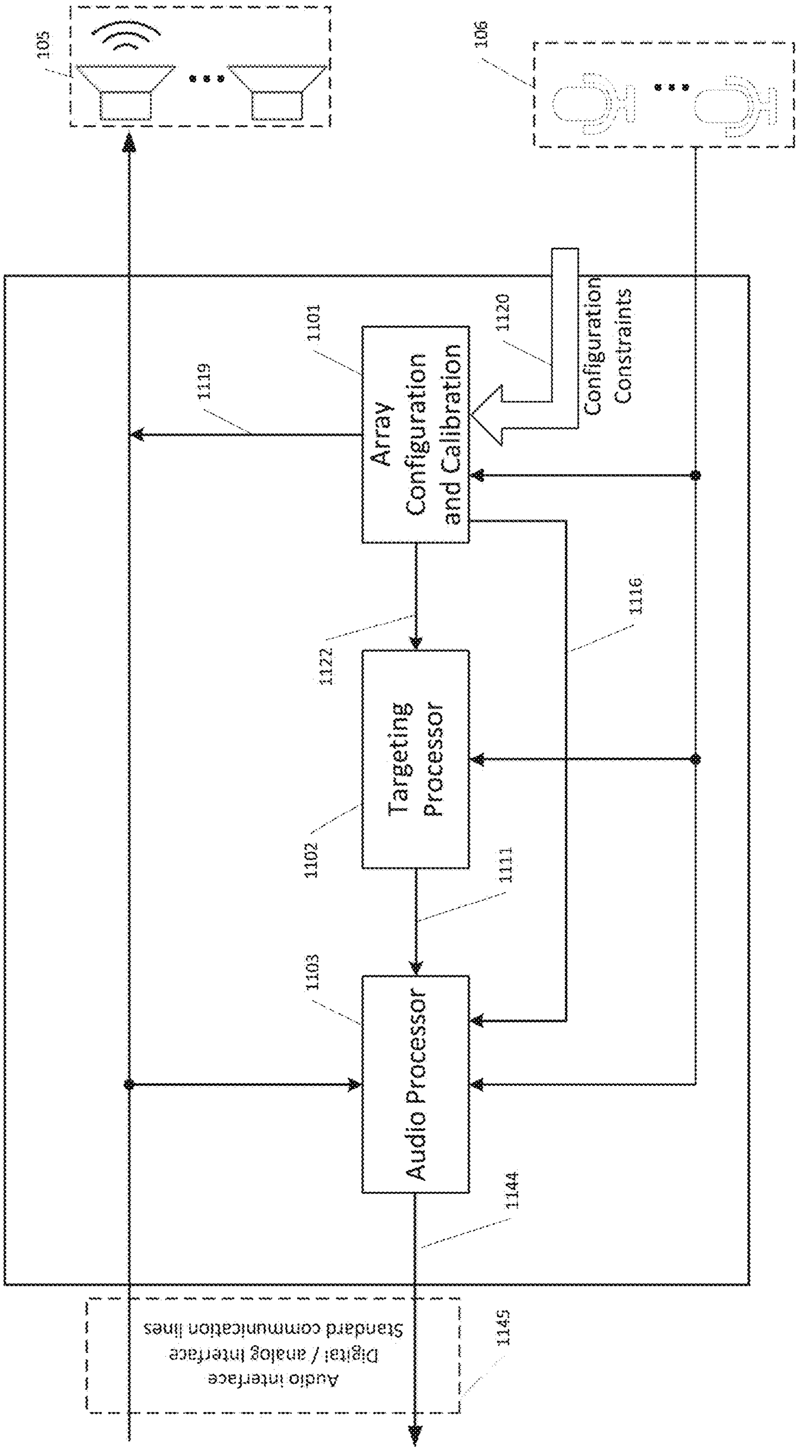

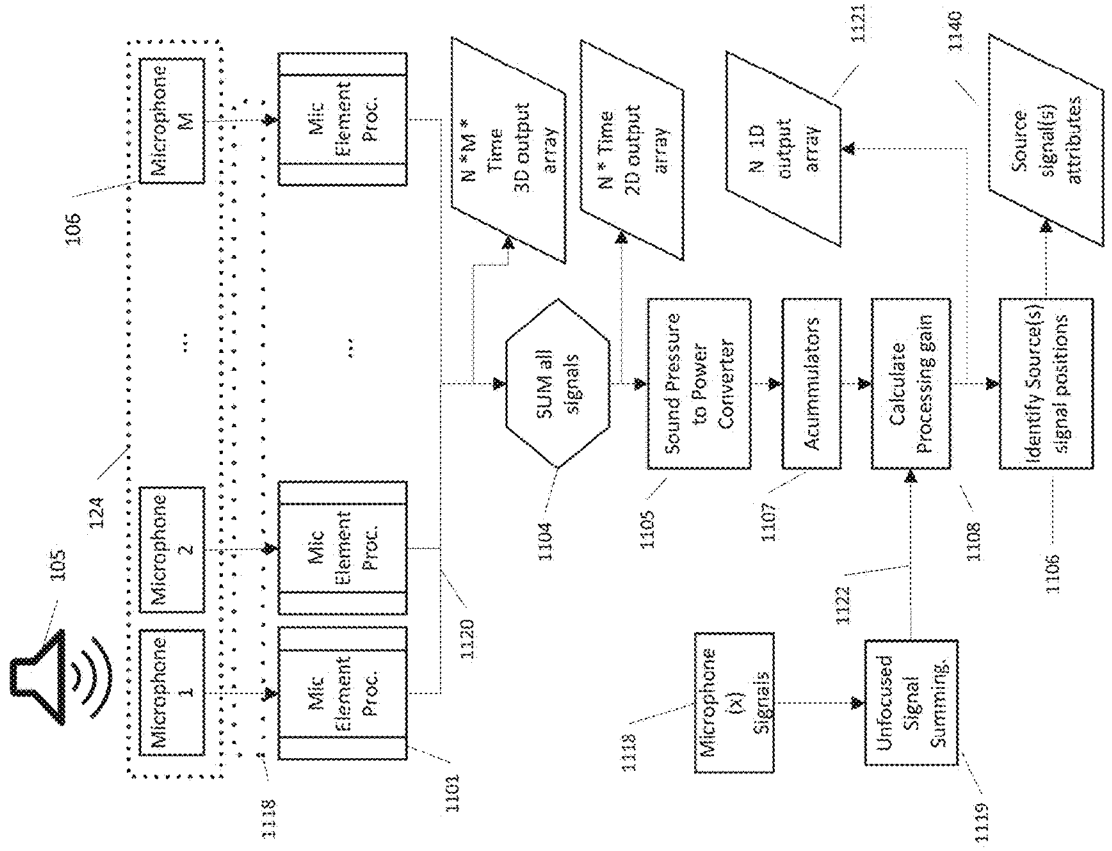
FIG. 11b (1102) – Target Processor - System Diagram
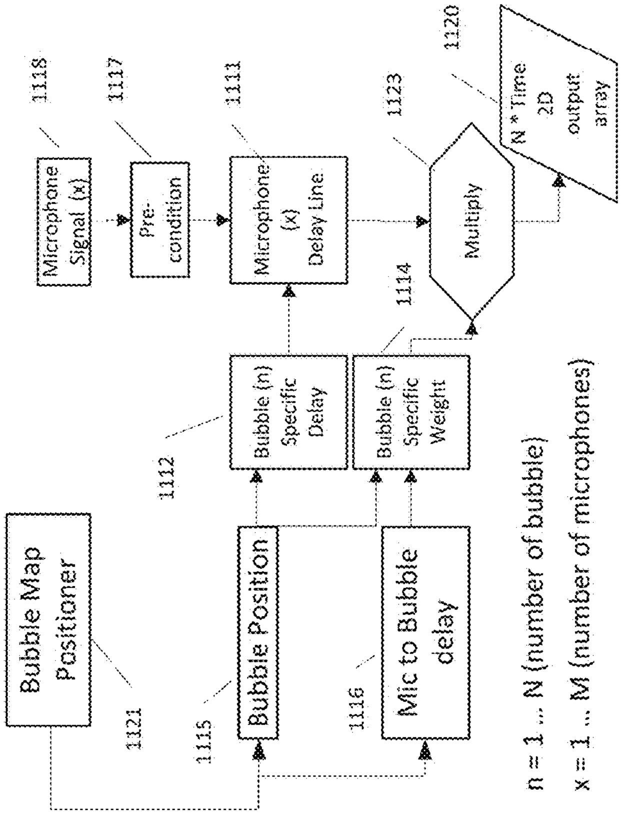
FIG. 11c (1101)
Mic Element Processor FIG. 11d (1103) Audio Processor
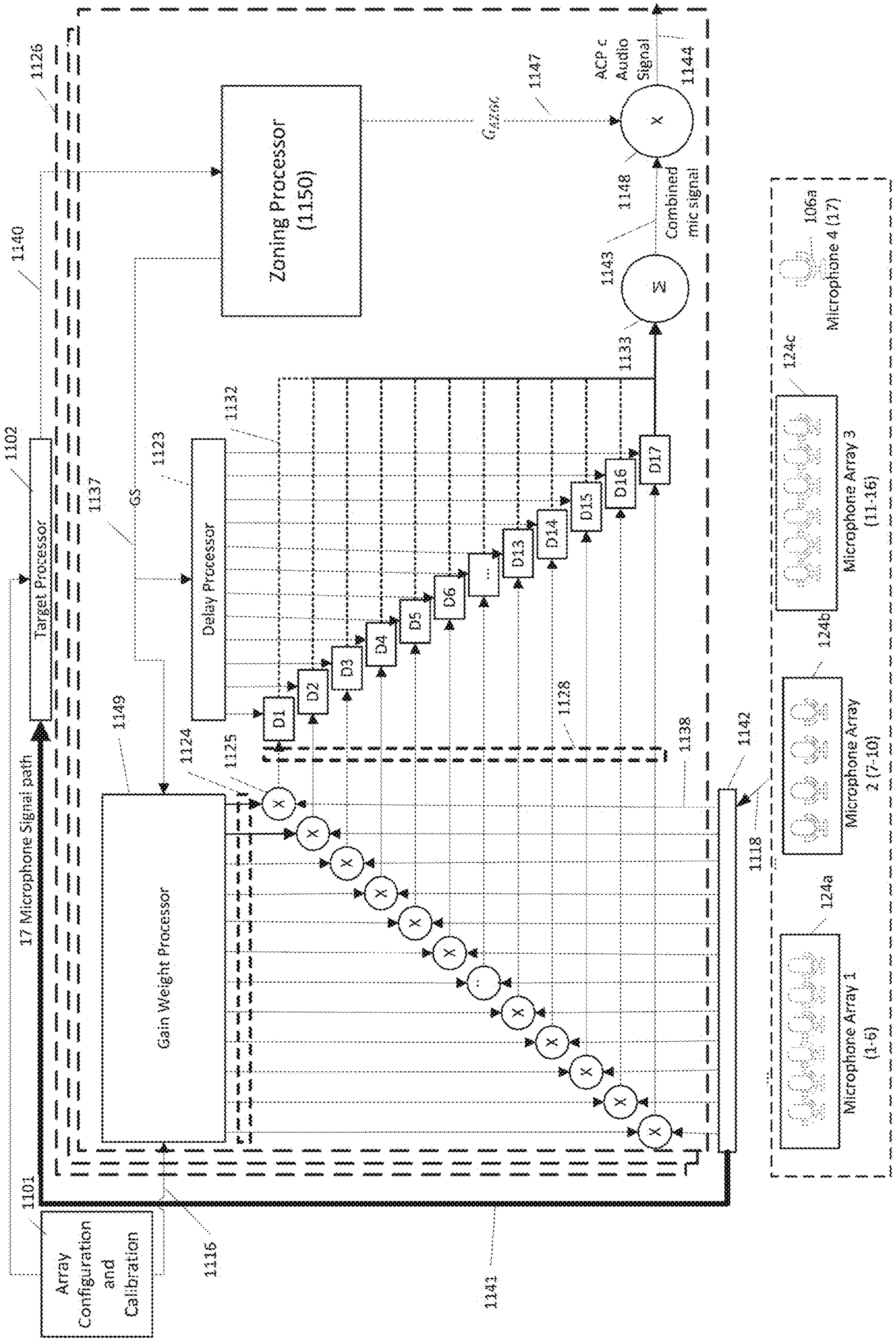

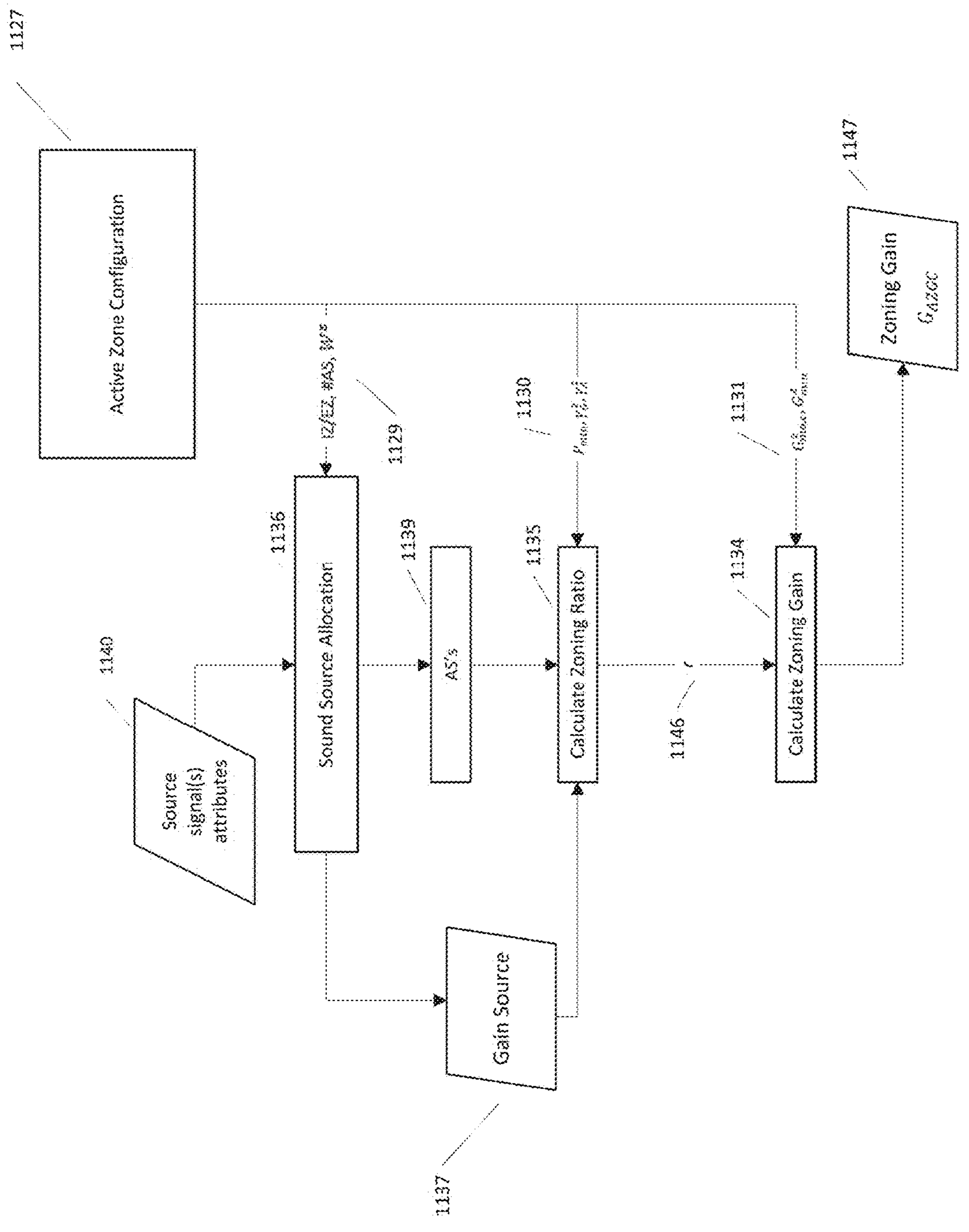
FIG. 11e (1150) Zoning Processor

FIG. 12a (1106) – Flowchart for finding sound sources
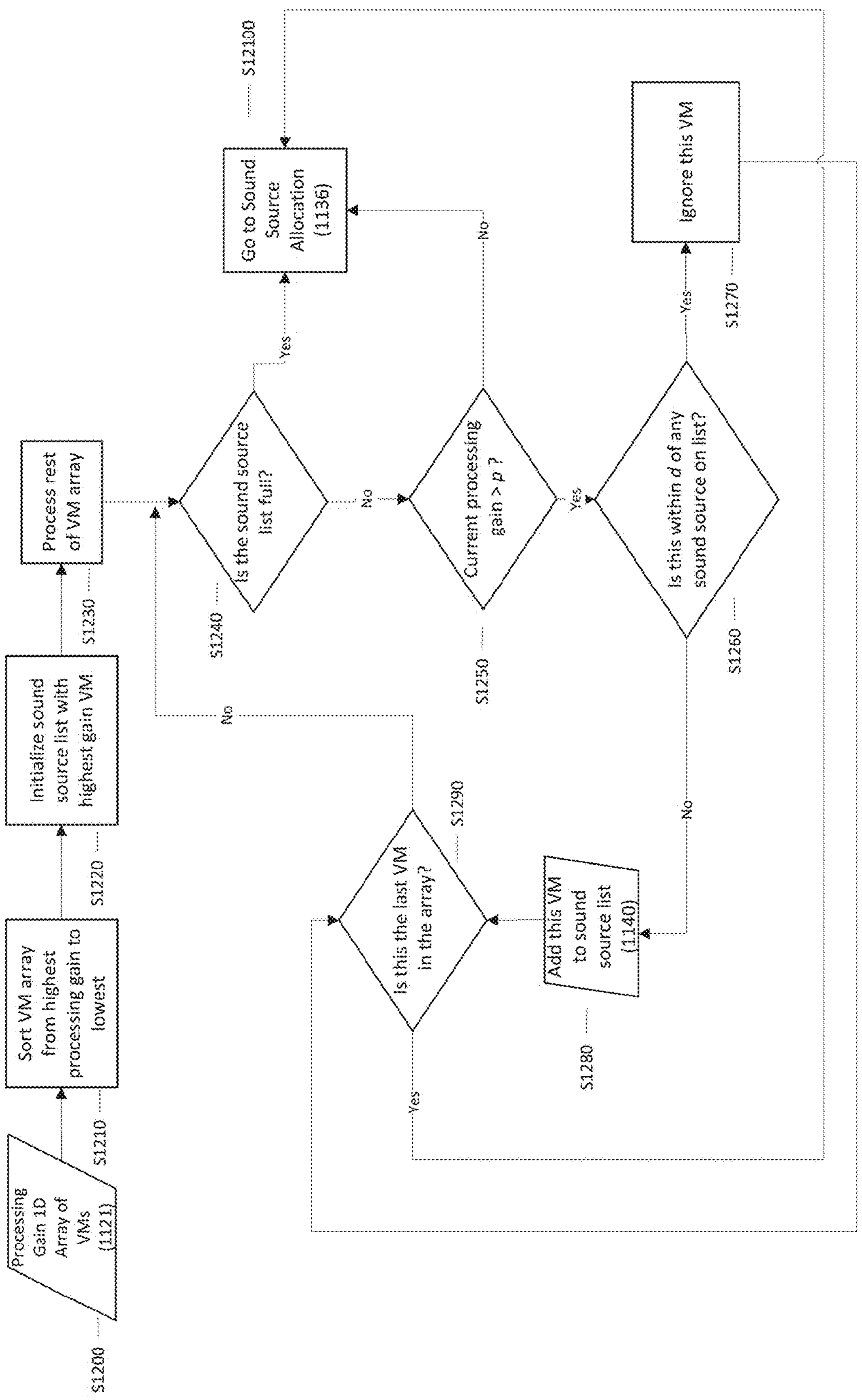

FIG. 12b (1136) – Flowchart for Allocation Sources
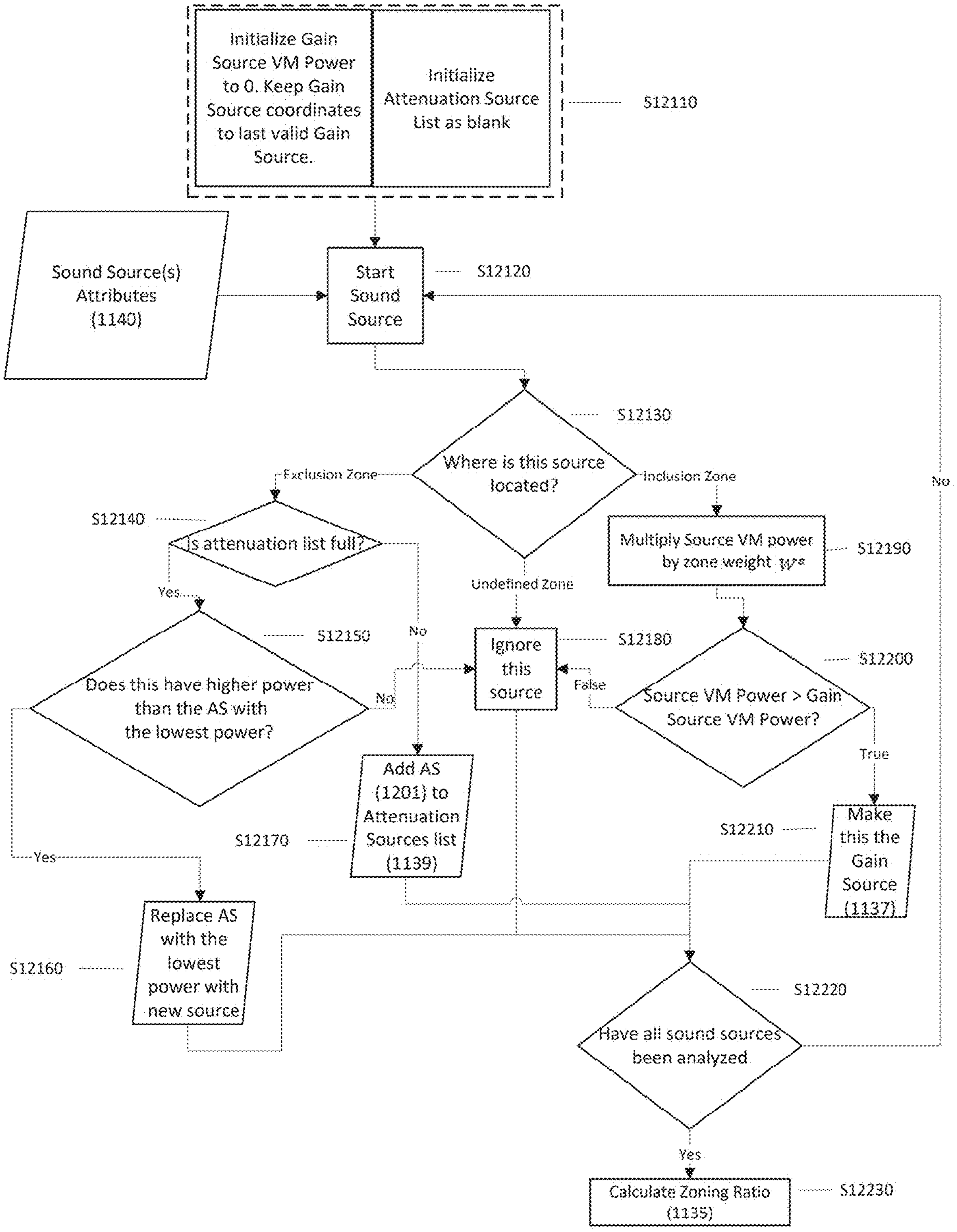

FIG. 12c (1135) – Flowchart for finding Zoning Ratio
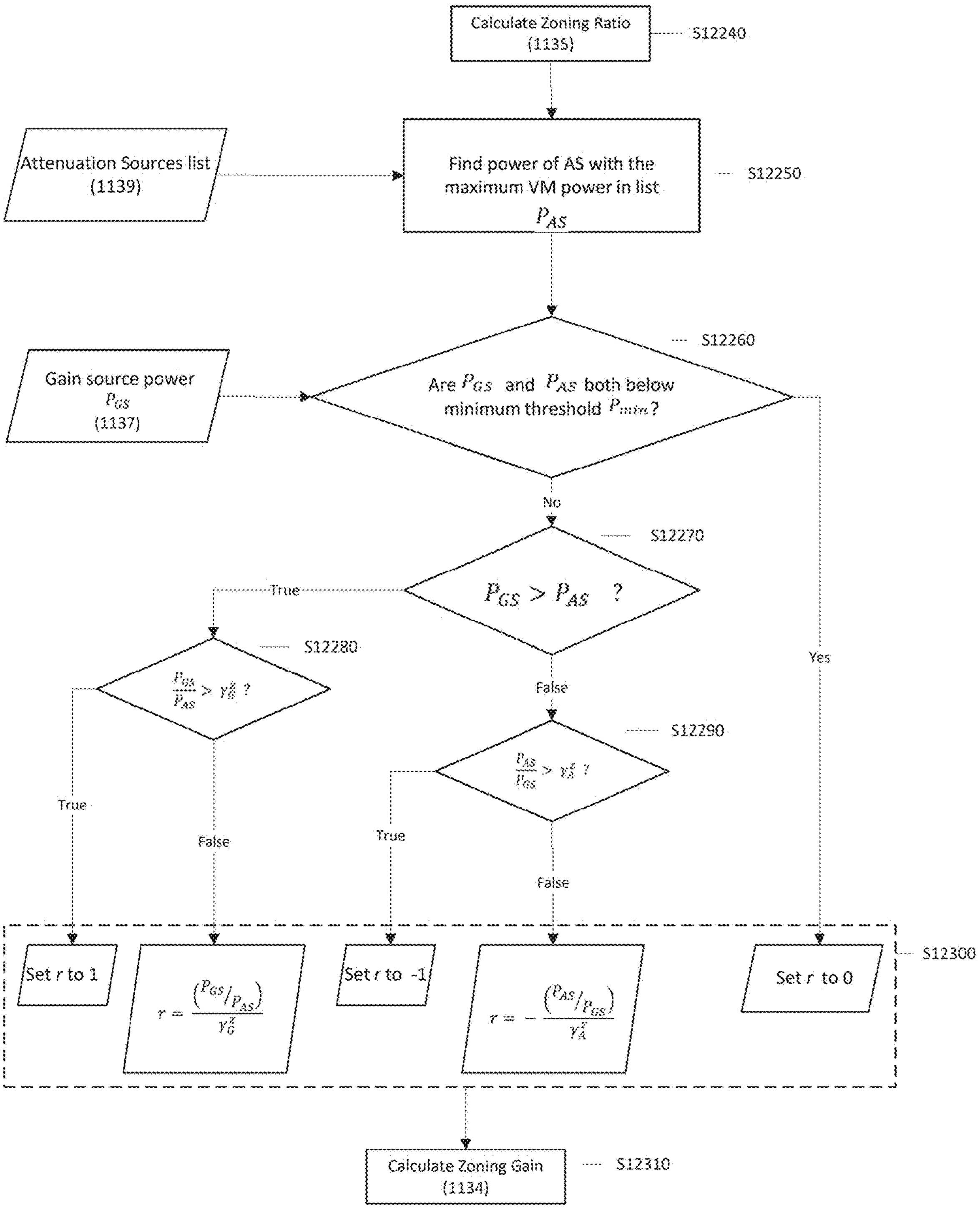

FIG. 12d (1134) – Flowchart for Finding Zoning Gain
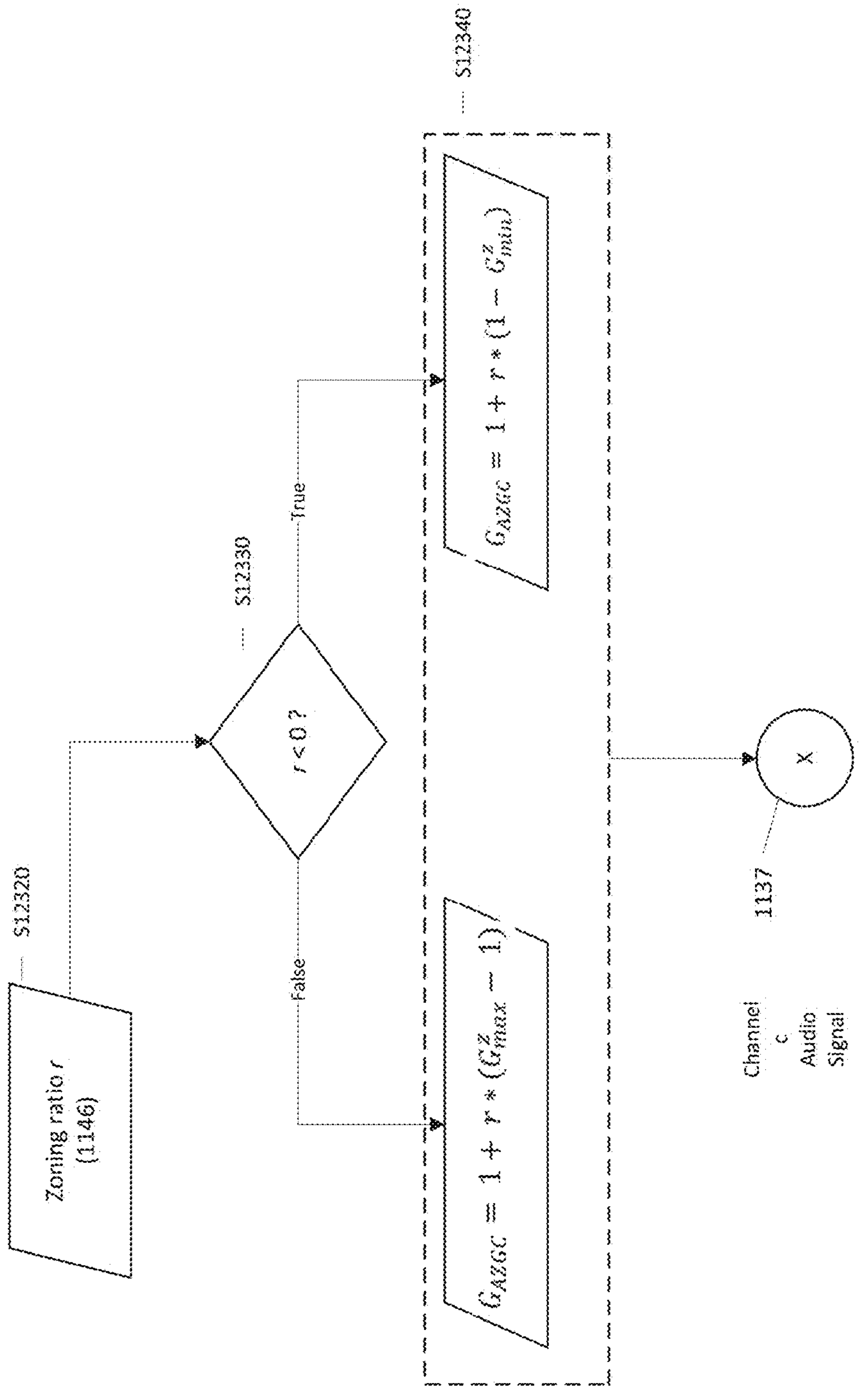

FIG. 13a – GS/AS Placement Example 1
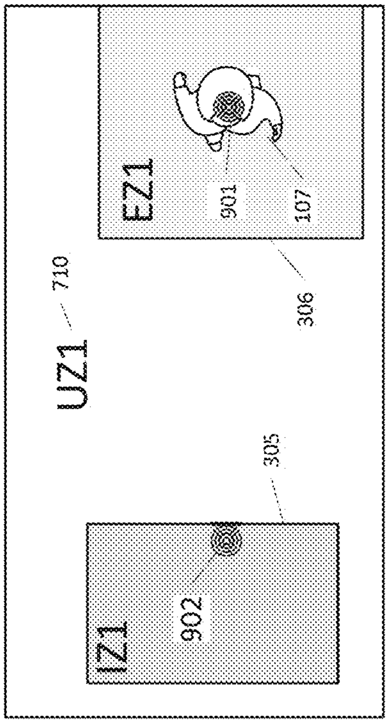
FIG. 13b – GS/AS Placement Example 2
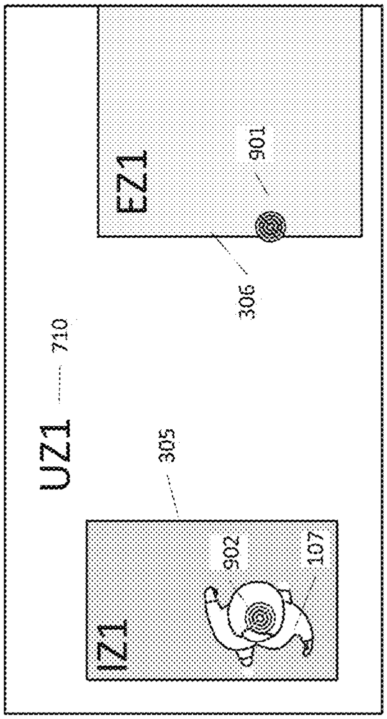
FIG. 13c – GS/AS Placement Example 3
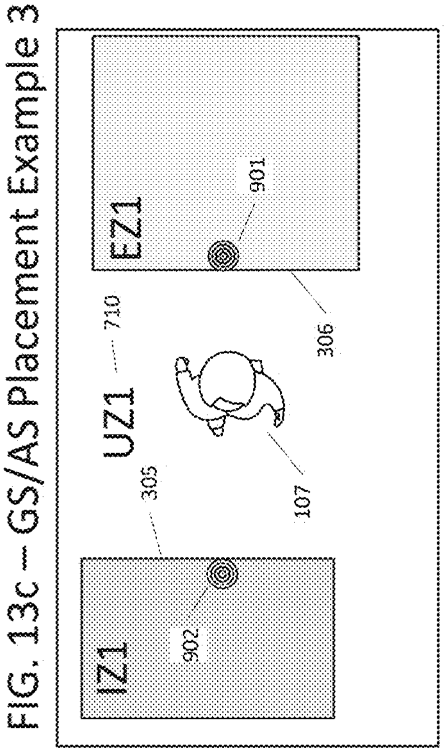
FIG. 13d – GS/AS Placement Example 4
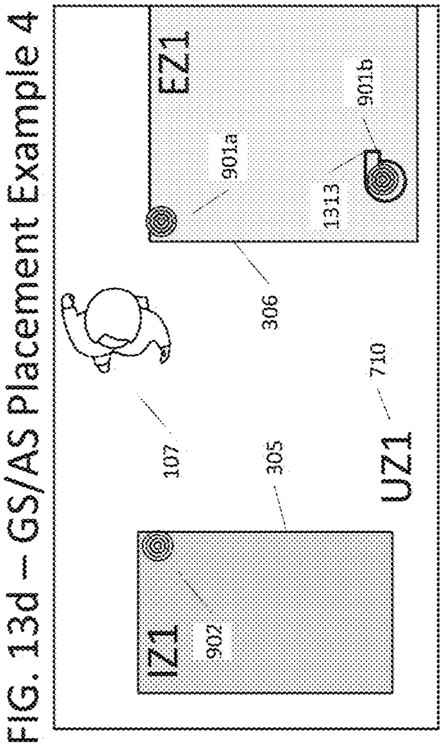

FIG. 13e – GS/AS Placement Example 5
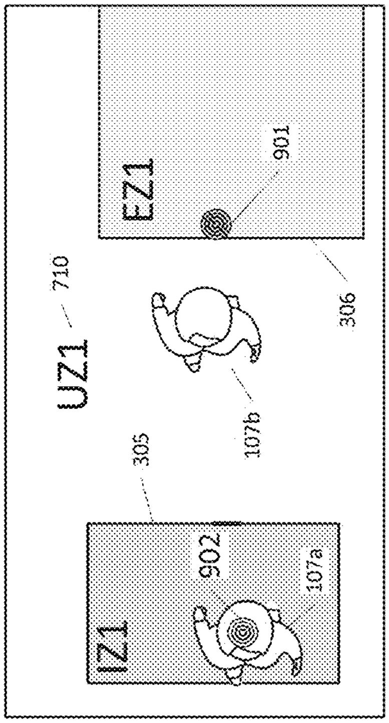
FIG. 13f – GS/AS Placement Example 6
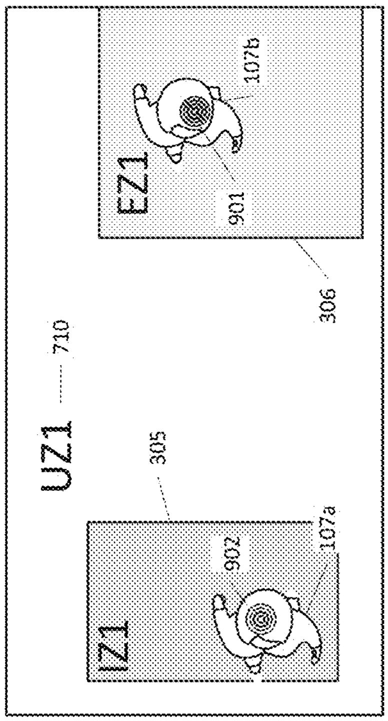

FIG. 14a – Example of room with one channel
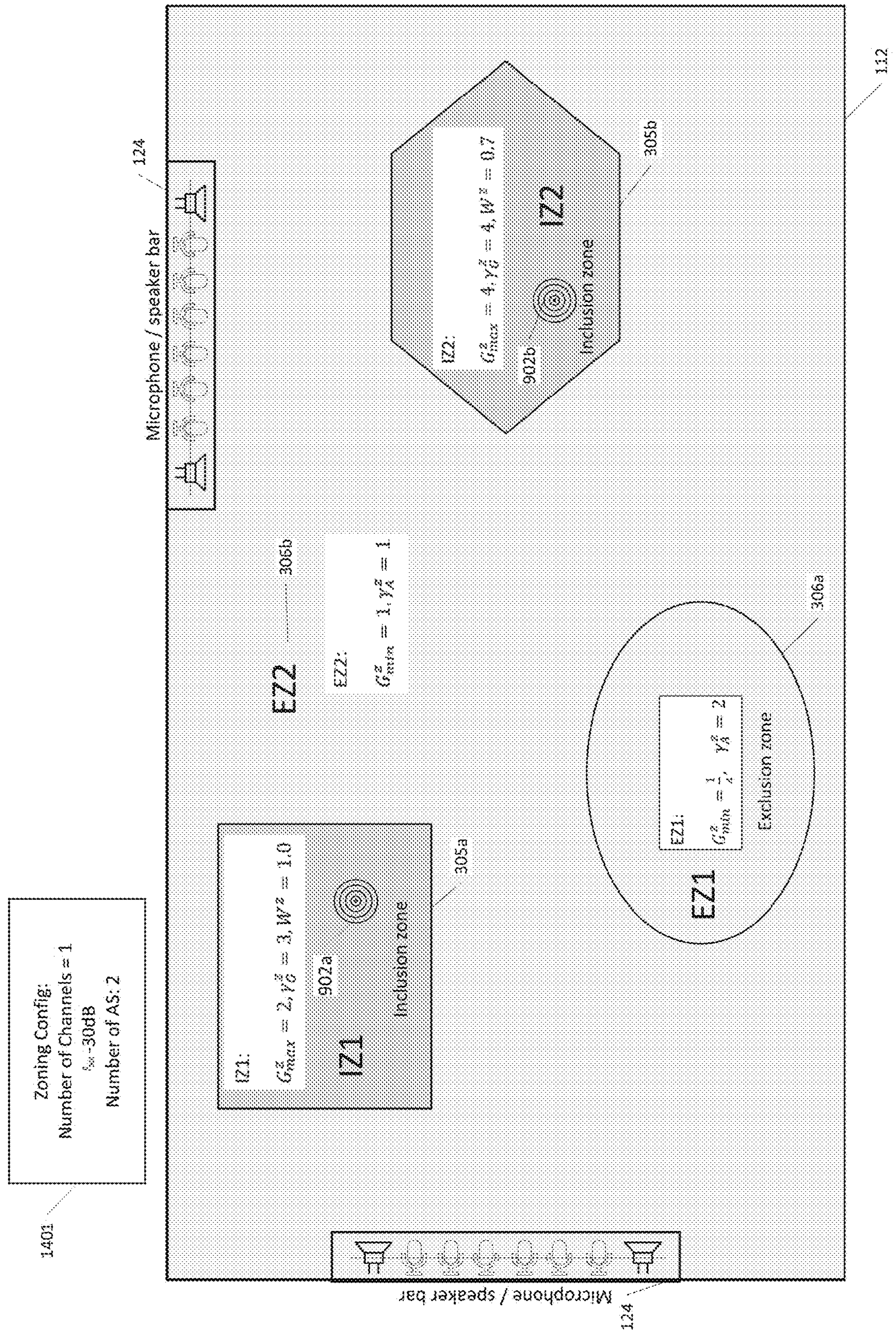

FIG. 14b – Example of same room with ACP 1 configuration
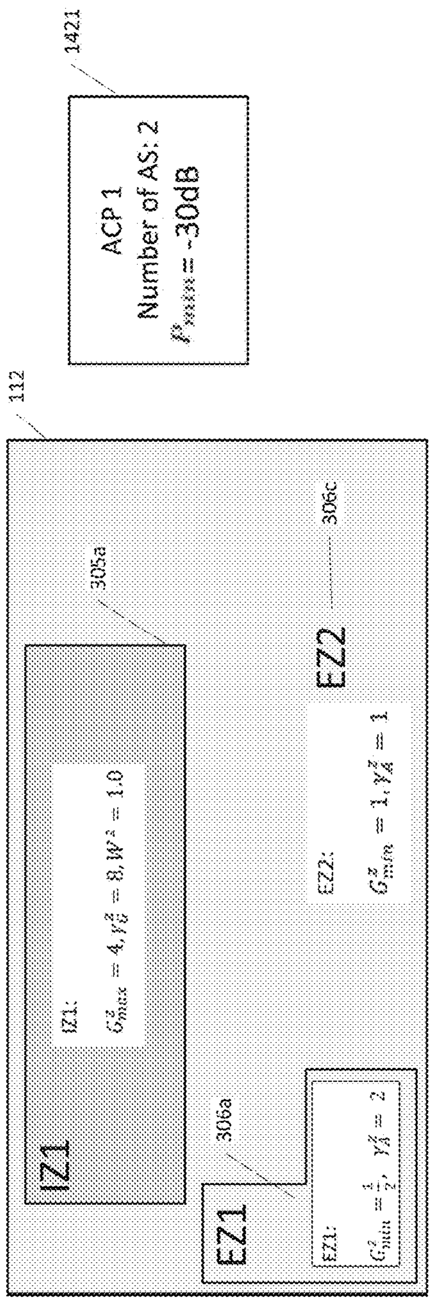
FIG. 14c – Example of same room with ACP 2 configuration
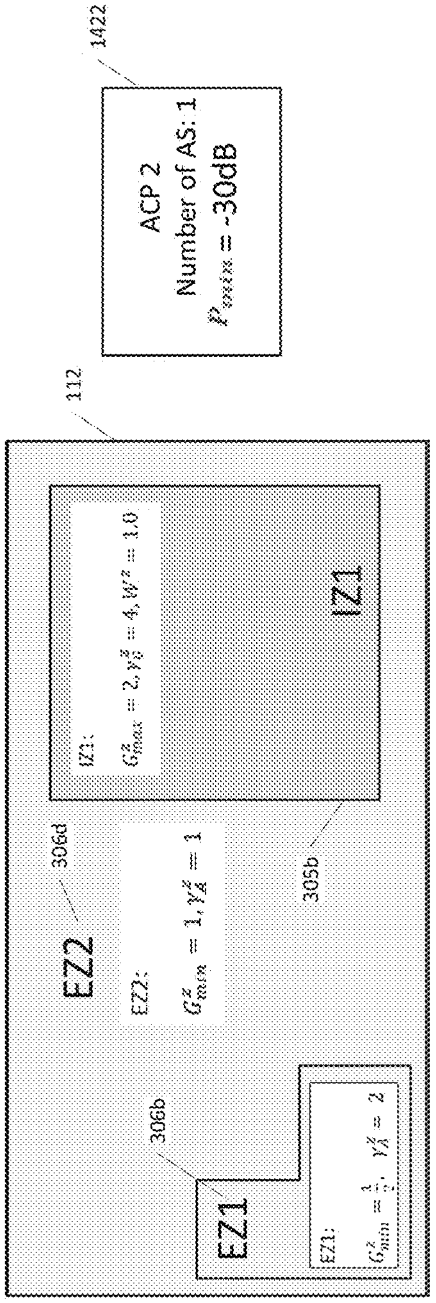

FIG. 14d – Example of room A with ACP 1 configuration
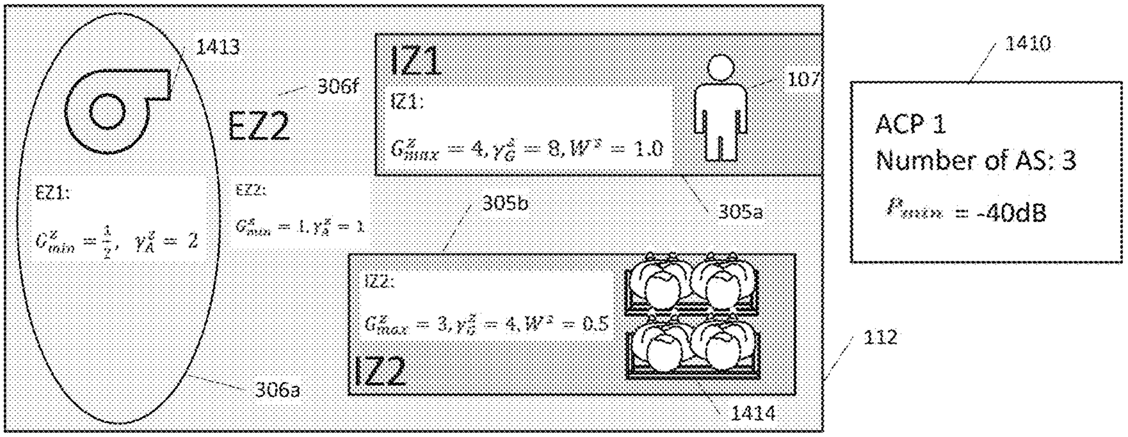
FIG. 14e – Example of room A with ACP 2 configuration
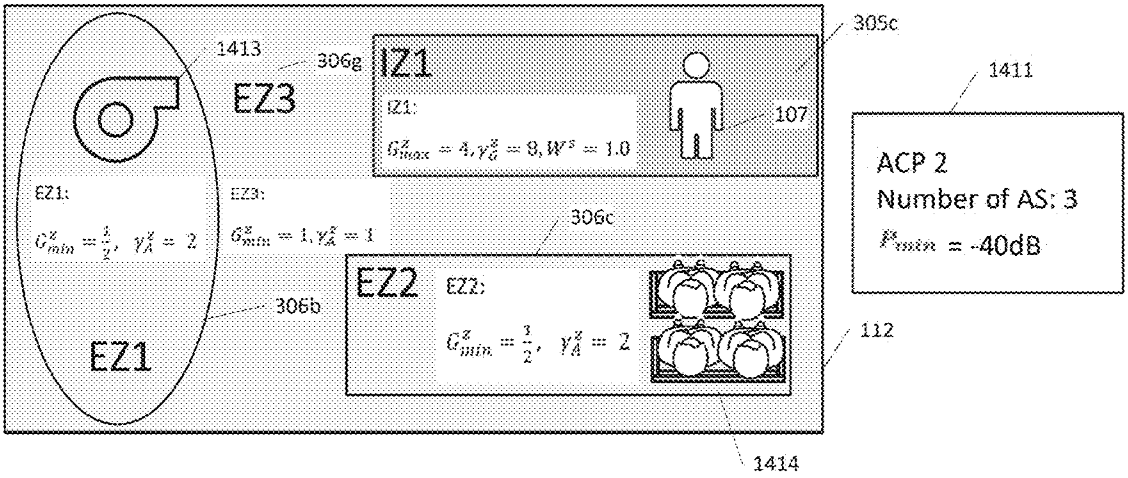
FIG. 14f – Example of room A with ACP 3 configuration
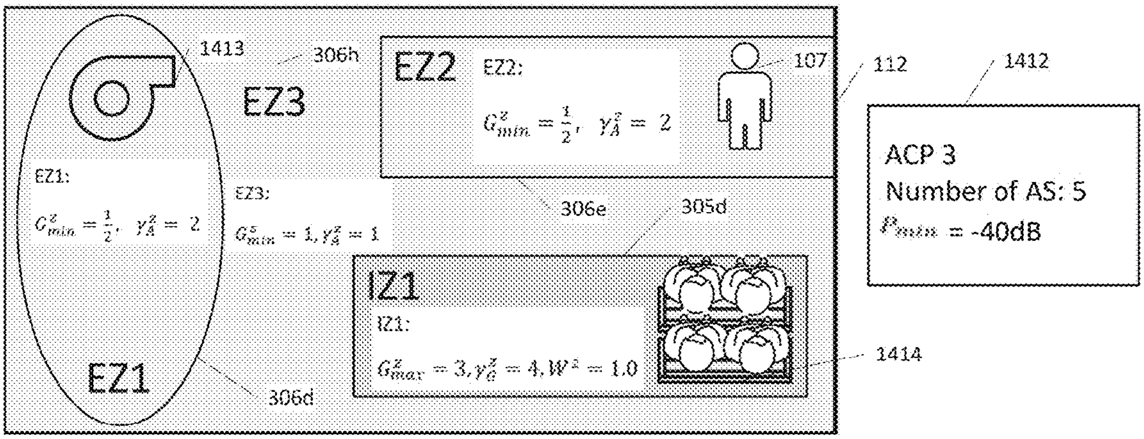

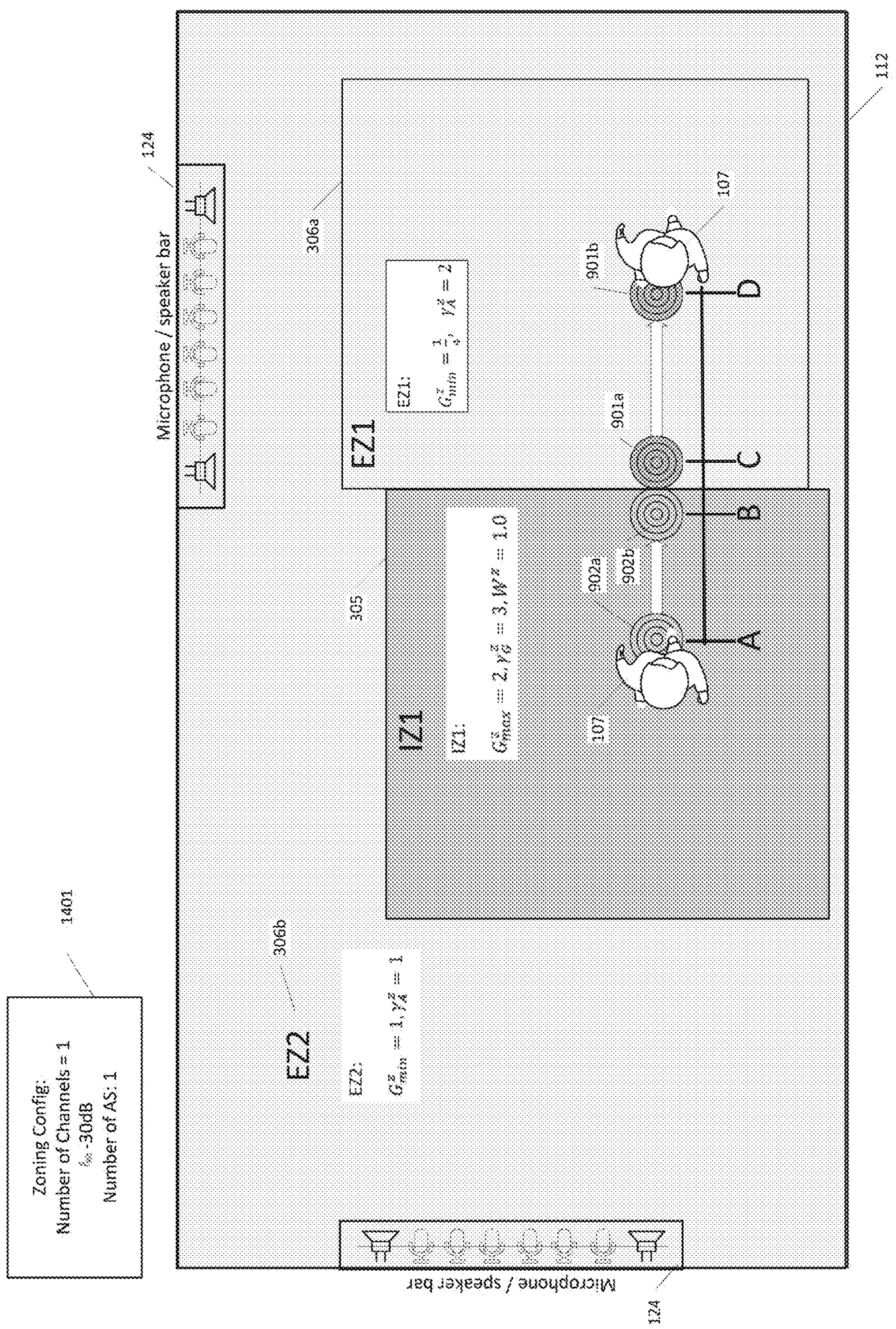
FIG. 15a – Moving sound source from IZ to EZ

FIG. 15b – Moving sound source from EZ to IZ
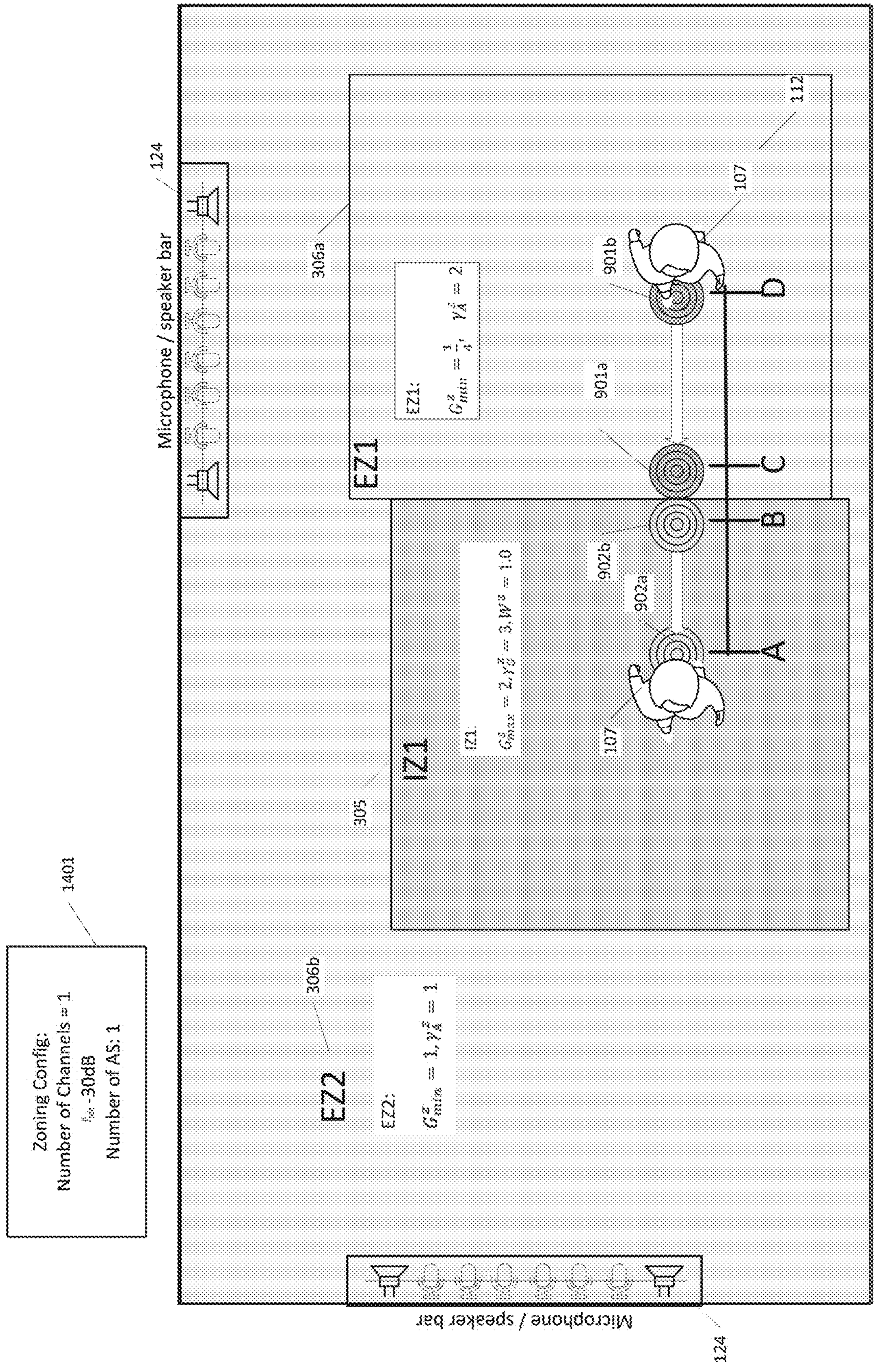

FIG. 15c – Moving sound source from IZ to UZ
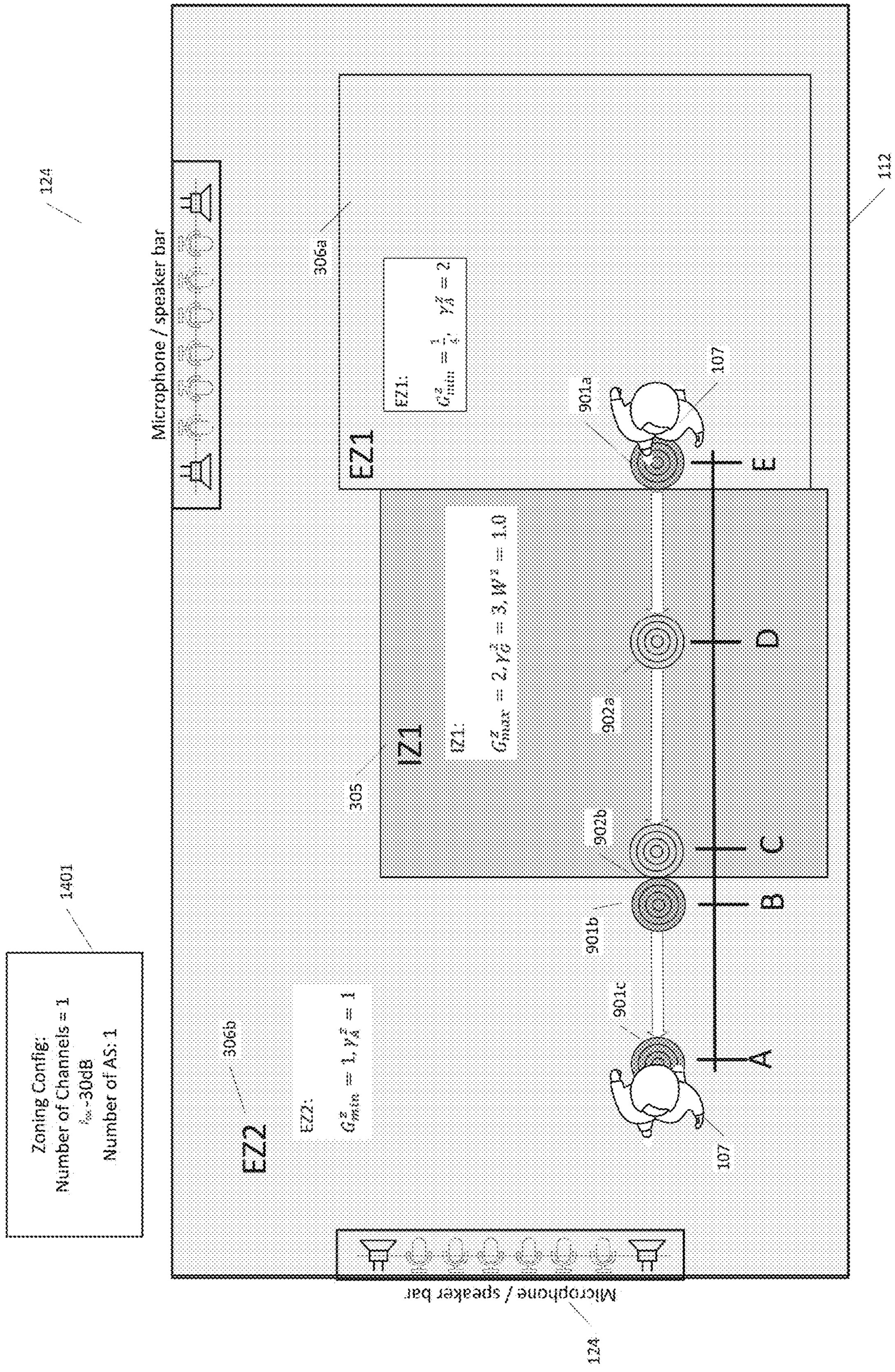

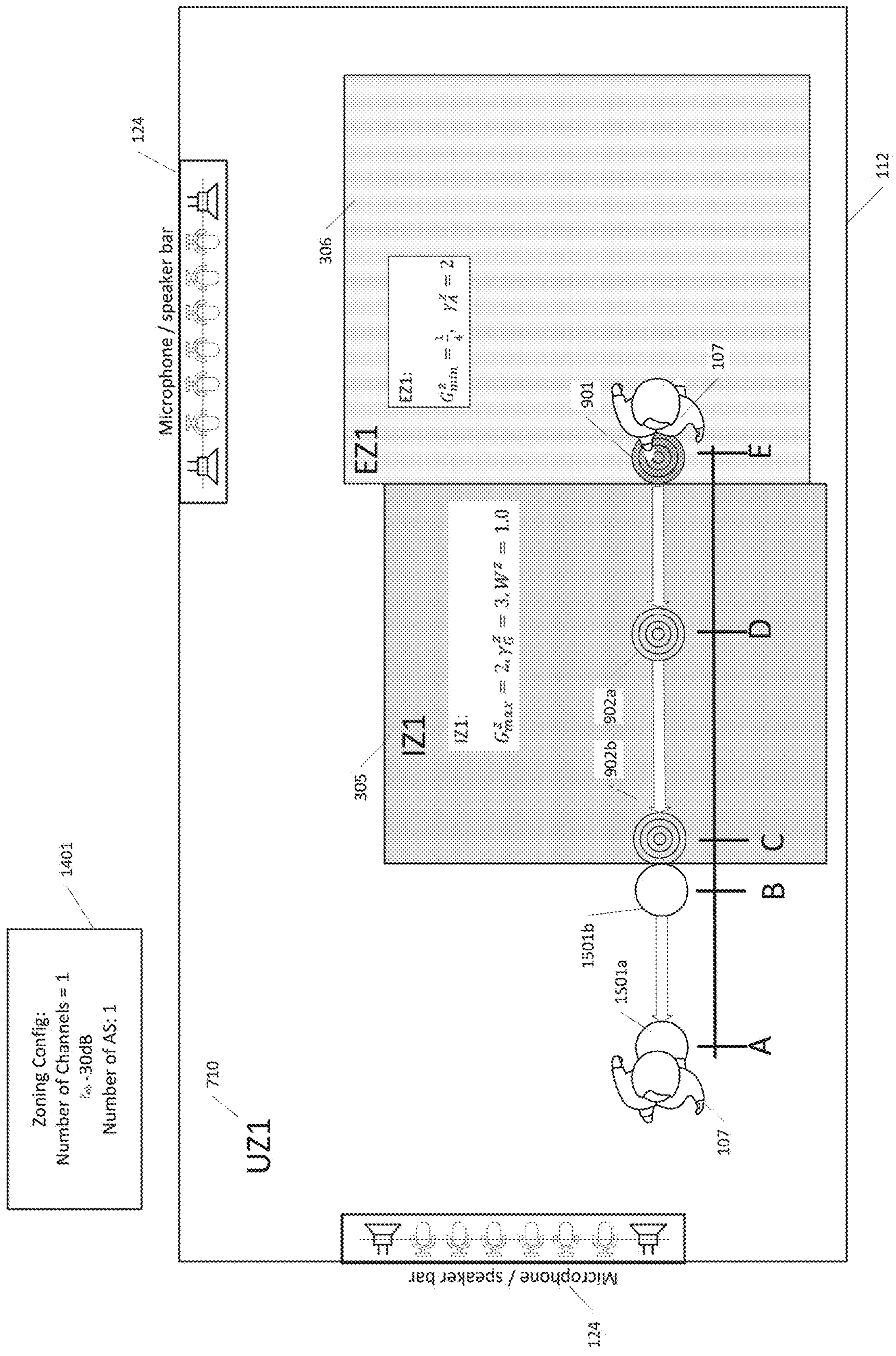
FIG. 15d – Moving sound source from IZ to UZ

SYSTEM FOR DYNAMICALLY ADJUSTING THE GAIN STRUCTURE OF SOUND SOURCES CONTAINED WITHIN ONE OR MORE INCLUSION AND EXCLUSION ZONES

CROSS REFERENCE TO RELATED APPLICATIONS

This application claims priority to U.S. Provisional Patent Application No. 63/465,087, filed May 9, 2023, the entire contents of which are incorporated herein by reference.

BACKGROUND OF THE INVENTION

1. Field of the Invention

The present invention generally relates to audio capture systems, and more particularly, the defining and configuration of one or more combinations of inclusion and exclusion zones to intelligently prioritize areas of the 3D space for audio sound source pick up while dynamically optimizing the gain structure of sound sources in and transitioning location relative to the borders of the prioritized zones/areas by taking into account the location and signal level for all sound sources in the 3D space for multi-user conference systems to optimize audio signal and noise level performance in and around the prioritized areas of the shared space.

2. Description of Related Art

Obtaining high quality audio at both ends of a conference call is difficult to manage due to, but not limited to, variable room dimensions, dynamic seating plans, roaming participants, unknown number of microphones and locations, unknown speaker system locations, known steady state and unknown dynamic noise, variable desired sound source levels, and unknown room characteristics. This may result in conference call audio having a combination of desired sound sources (participants) and undesired sound sources (return speaker echo signals, HVAC ingress, feedback issues and varied gain levels across all sound sources, etc.).

To provide an audio conference system that addresses dynamic room usage scenarios and the audio performance variables discussed above, microphone systems need to be thoughtfully designed, installed, configured, and calibrated to perform satisfactorily in the environment. The process starts by placing an audio conference system in the room utilizing one or more microphones. The placement of microphone(s) is critical for obtaining adequate room coverage which must then be balanced with proximity of the microphone(s) to the participants to maximize desired vocal audio pickup while reducing the pickup of speakers and undesired sound sources. In a small space where participants are collocated around a table, simple audio conference systems can be placed on the table to provide adequate performance and participant audio room coverage. Larger spaces require multiple microphones of various form factors which may be mounted in any combination of, but not limited to, the ceiling, tables, walls, etc., making for increasingly complex and difficult installations. To optimize performance of the audio capture system even further with usage of the room in mind, the microphone system will typically be configured to provide zone-based coverage areas. The idea is to create areas in the room of higher priority for sound source pickup than other areas of the room. Examples of this would be but not limited to the front of a classroom where a teacher has priority over the students, or presentation rooms where the presenter has priority over the attendees, or a boardroom where the seats at the table have priority over areas outside the table boundaries. If more than one priority zone is desired microphone systems of sufficient complexity can be configured to provide more than one priority area/zone. The idea is to minimize unwanted sound source contributions that are not located within high priority areas of the room while maximizing the audio pickup of sound sources in the priority areas/zone.

Zoning implementations in the current art have typically been limited to certain approaches. One approach is to use wireless and/or a combination of wired discrete microphones to limit the sound source audio pickup to a specific microphone location which is typically collocated in very close proximity to a person. The very nature of this type of microphone will create a small zone/area of audio pickup which does isolate the desired talker (person) but at the expense of system installation complexity, limited room coverage, requiring a physical microphone for each presenter and system setup and maintenance complexities especially if the system needs to be expanded. For small and simple tabletop installations this may be an acceptable approach.

Another approach in the current art has been to use the performance properties of a beamformer microphone array. The beamformer array has a polar plot on the surface that seems to support a zoning implementation. The typical polar plot contains an area of on-axis gain which is designed to maximize gain in this region and an area of off-axis rejection which is designed to eliminate sounds from this area of the coverage pattern. With a sufficiently complex beamformer array it is possible to define one or more zones in the space by aiming and shaping the on-axis beams to point at the desired coverage area providing specific coverage for regions in the room. Sound sources outside of the on-axis region will be ignored. Placement of the beamformer will be critical to the positioning and shaping of the priority regions/zones that can be configured and placed in the room, as the regions/zones are constrained to the placement of the aperture of the array in the room. The shapes of the zones will be further limited to the available lobing patterns or simple geometric layouts of aggregating lobes/beam patterns which can be limiting and lack flexibility especially in a 3D spatial context. Complex geometric coverage zones with specific dimensions in the x, y, z axis is typically not feasible.

In addition to the coverage region shaping and positioning issues the performance of the transition area between on-axis and off-axis regions can cause the array audio response to be very rigid and abrupt as sound sources approach or cross this region of the polar plot. A sound source straddling the zone boundary or put another way moving between the on-axis and off axis region of the coverage pattern may be heard at the far end of the call in a very uneven way or drop in and out of the conference call all together. Since the lobe shape properties are directly tied to the creation of and configuration of the in-room zone configurations the performance properties of the beamformer array make managing the gain structure of sound sources on the edge of the on-axis region and in the off-axis regions difficult and unpredictable.

The optimum solution would be a conference system that is able to implement independent of the array or physical discrete microphones, one or more zone coverage configurations with intelligent gain structure management for desired sound sources based on their location in and around the priority zones in such a manner that it is not limited to or constrained by the position of, geometry and implementation of the array. However, fully realizing independent of the physical array, priority coverage zones with both inclusion and exclusion zone properties while setting intelligent gain structures for the desired sound sources based on knowing the location and signal level of all sound sources in the room relative to inclusion and exclusion zones has proven difficult and insufficient within the current art.

Being able to optimize the desired sound source audio gain when they are in, between and transitioning to and from priority zones requires the monitoring and tracking of all sound sources independent of the location of the one or more priority zones is preferably required, and where the one or more priority zones can be placed, sized and shaped to very precise x, y, z coordinates in the 3D space independent of the array which further improves the system's ability to manage the desired sound source's audio signal gain while minimizing the contribution of unwanted sound sources, reduction of ingress from other non-priority areas, and sound source bleed-through from coverage grids that extend beyond wall boundaries and wide-open spaces.

Systems in the current art do not continually monitor and track all sound sources in the 3D space irrespective of the configured priority zones and thus are not able to intelligently manage the gain structure of all sound sources whether they are in a priority zone, outside the priority zone or transitioning between zones and instead rely on standard polar plot on-axis and off-axis region to form priority coverage zone areas and gain management of sound sources.

Therefore, the current art is not able to provide intelligent gain management for the target sounds sources located within and in close proximity to priority zones boundaries, nor is the current art able to provide priority zones disassociated from the location of the physical array with complex zone shapes, sizes and positioning in the 3D space.

SUMMARY OF THE INVENTION

An object of the present embodiments is to, in real-time, provide intelligent and optimized zone gain management of sound sources within priority (inclusion) zones and adjacent to the priority (inclusion) zone boundaries of the 3D space by using sound source location and signal level information of sound sources from both inside the inclusion zone and outside the inclusion zone in the exclusion zone for the purpose of optimizing the audio gain structure of desired sound sources located in priority (inclusion) zones and minimizing the gain structure of undesired sound sources in low priority (exclusion) zones.

More specifically, it is an object of the present invention to preferably utilize all virtual microphones in the 3D space by preferably assigning all available virtual microphones to either an inclusion zone or exclusion zone configuration for the purpose of tracking and monitoring all sound sources in the space regardless of their position in the 3D space.

And even more specifically, it is an object of the present invention to identify the virtual microphone with the largest processing gain value in each inclusion and exclusion zone for the purpose of maximizing the gain of the target virtual microphone in the inclusion zone with the highest priority which is correlated to the active desired sound source and to conversely minimize the gain of the highest processing gain virtual microphone in the exclusion zone to significantly reduce the contribution of undesired sound sources in the output signal at the remote end of the conference call.

The present invention provides a real-time adaptable solution to undertake automatic zone gain control to optimize the gain of the selected targeted virtual microphone in the inclusion zone and to manage sound source targets at the edge of and outside the edge of the inclusion zone for the best listening experience at the remote end of the conference call.

The preferred embodiments comprise both algorithms and hardware accelerators to implement the structures and functions described herein.

These advantages and others are achieved, for example, by a system for dynamically adjusting gain structures of sound sources in a shared 3D space including one or more inclusion zones and one or more exclusion zones. The system includes a combined microphone array including one or more of individual microphones and/or microphone arrays each including a plurality of microphones. The microphones in each microphone array are arranged along a microphone axis. The system further includes one or more system processors communicating with the combined microphone array. The one or more system processors include one or more audio channel profiles (ACPs) and are configured to perform operations. The operations includes steps of (i) obtaining predetermined coverage zone dimensions based on the locations of the microphones of the combined microphone array, (ii) populating the coverage zone dimensions with one or more virtual microphones, (iii) obtaining a combined microphone signal, for each audio channel profile (ACP), by combining microphone signals into desired channel audio signals by applying positional based gain control (PBGC) parameters to adjust microphones to control positional based microphone gains based on location information of the sound sources, (iv) performing processes to obtain a zoning gain for each ACP, and (v) generating an output channel for each ACP by multiplying the zoning gain with the combined microphone signal. The performing processes to obtain a zoning gain for each ACP includes steps of receiving a list of sound sources obtained by utilizing the virtual microphones, receiving zone parameters for one or more inclusion zones (IZ) and one or more exclusion zones (EZ), identifying a gain source (GS) and a list of one or more attenuation sources (AS), determining a zoning ratio based on the gain source, the list of the one or more attenuation sources and active zone configuration parameters, and calculating zoning gain based on the zoning ratio, maximum gain of the one or more inclusion zones and minimum gain of the one or more exclusion zones.

These advantages and others are achieved, for example, by a method for dynamically adjusting gain structures of sound sources in a shared 3D space including one or more inclusion zones and one or more exclusion zones. The method includes steps (i)-(v) described above.

These advantages and others are achieved, for example, by one or more non-transitory computer-readable media for dynamically adjusting gain structures of sound sources in a shared 3D space including one or more inclusion zones and one or more exclusion zones. The computer-readable media includes instructions configured to cause a system processor to perform the steps (i)-(v) described above.

BRIEF DESCRIPTION OF THE DRAWINGS

FIGS. 1*a*, 1*b* and 1*c* are diagrammatic examples of a typical audio conference setups across multiple device types.

FIGS. 2*a* and 2*b* are graphical structural examples of microphone array layouts supported in the embodiment of the present invention.

FIGS. 3*a* and 3*b* are examples of microphone coverage pattern arrangements.

FIGS. 4*a*, 4*b* and 4*c* are prior art examples of coverage pattern arrangements as it relates to on-axis and off-axis beamformer array performance.

FIGS. 5*a* and 5*b* are examples of 2D and 3D virtual microphone arrangements supported in the embodiment of the present invention.

FIG. 6 is diagrammatic example of virtual microphone zone shape configurations supported in the embodiment of the present invention.

FIGS. 7*a* and 7*b* are exemplary illustrative diagrams of the present invention mapping specific virtual microphones in a 3D space to identified target sources in the defined Inclusion zone and Exclusion zone areas.

FIG. 8 is an illustration of a typical virtual microphone coverage map with no zone configurations applied.

FIGS. 9*a*, 9*b*, 9*c*, 9*d*, 9*e*, 9*f*, 9*g*, and 9*h* are exemplary top-down illustrative diagrams of the present invention mapping specific virtual microphones in a 3D space to identified target sources in the defined inclusion and exclusion zone areas.

FIG. 10 is an illustration of two separate sound source targets moving between virtual microphones in the inclusion and exclusion zones in a 3D space supported in the embodiment of the present invention.

FIGS. 11*a*, 11*b*, 11*c*, 11*d* and 11*e* are functional and structural diagrams of an exemplary embodiment of the present invention for automatically identifying targets within defined inclusion and exclusion zones for the purpose of dynamically adjusting the gains of the targets in the inclusion zones and exclusion zones relative to each other in a 3D space.

FIGS. 12*a*, 12*b*, 12*c* and 12*d* are exemplary embodiments of the logic flowcharts of the Automatic Zoning Gain Control processor process of the present invention.

FIGS. 13*a*, 13*b*, 13*c*, 13*d*, 13*e* and 13*f* are exemplary illustrative concepts of the present invention outlining the tracking of both a gain source and an attenuation source in a 3D space based on identified sound sources in and around the inclusion and exclusion zones.

FIGS. 14*a*, 14*b*, 14*c*, 14*d*, 14*e* and 14*f* are exemplary illustrative concepts of the present invention mapping different inclusion and exclusion zone configurations to different ACP.

FIGS. 15*a*, 15*b*, 15*c* and 15*d* are exemplary illustrative drawings of the present invention for outlining the gain and attenuation sources relative to a sound source target moving between inclusion, exclusion, and undefined zones in the 3D space.

DETAILED DESCRIPTION OF THE PRESENT INVENTION

Figure 2B:
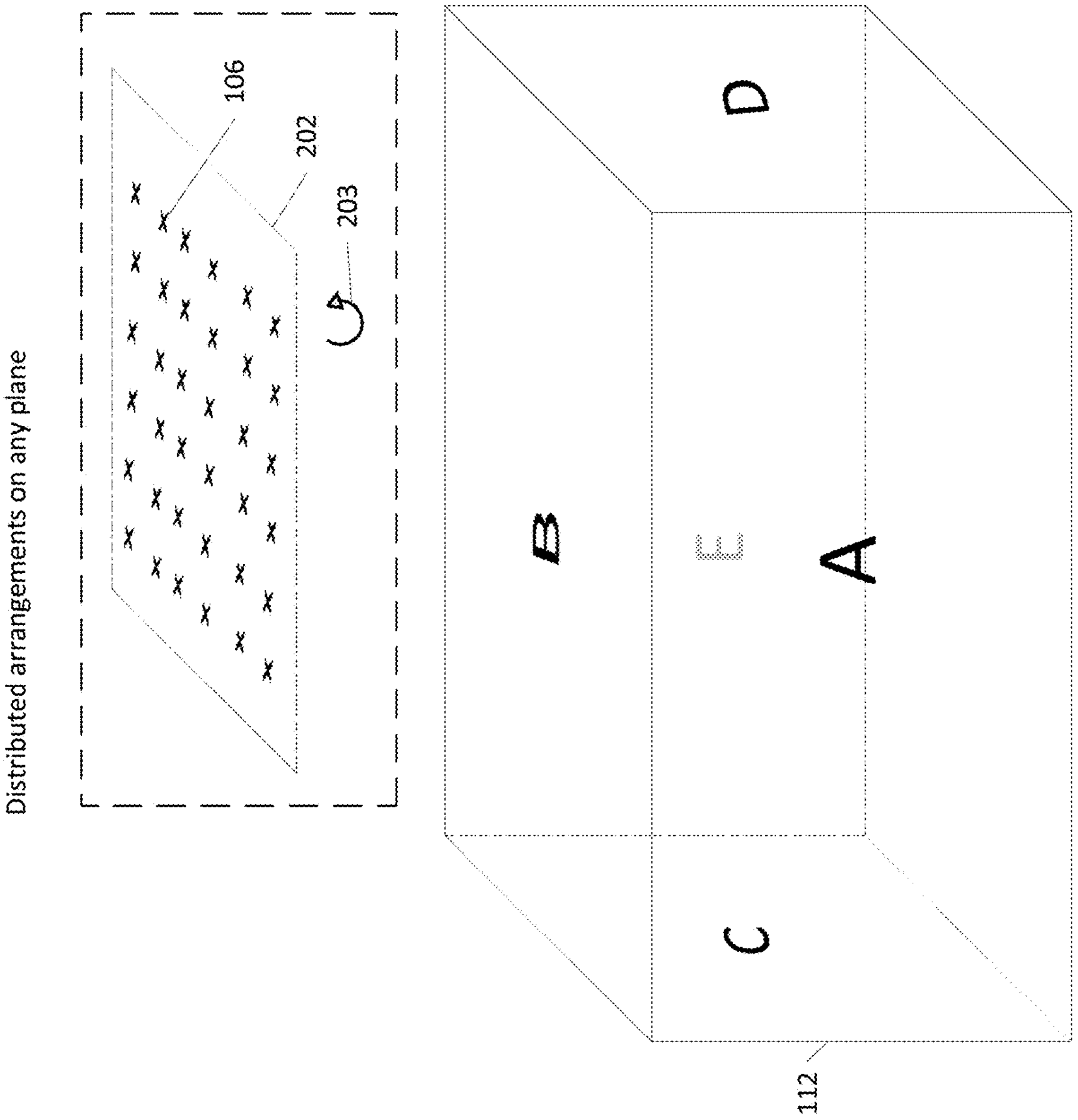

The present invention is directed to apparatus and methods that enable groups of people (and other sound sources, for example, recordings, broadcast music, Internet sound, etc.), known as "participants", to join together over a network, such as the Internet or similar electronic channel(s), in a remotely-distributed real-time fashion employing personal computers, network workstations, and/or other similarly connected appliances, often without face-to-face contact, to engage in effective audio conference meetings that utilize large multi-user rooms (spaces) with distributed participants that require specific zone coverage configurations.

Advantageously, embodiments of the present apparatus and methods afford an ability to provide a microphone array system that establishes a virtual microphone array coverage grid that is adapted to each unique installation, room and situation by allowing the user to configure the microphone array for any number of gain zones and/or attenuation zones with dynamic gain structures based on the sound sources' locations relative to any one zone and/or within a zone including sound sources that transition from one zone to another in real-time irrespective of array geometry and configuration to maximize desired sound source audio quality and performance for all participants at the far end of the conference call.

A notable challenge to creating a microphone array that can instantiate and manage the tracking and monitoring of a plurality of sound sources in a 3D space for the purpose of intelligently adjusting the gain structure of the desired sound source in the gain zone is being able to monitor and track the level and location of sound sources that are not in a gain zone without adding additional arrays or hardware to track and measure these sound sources. And preferably utilize a microphone array system that can completely cover the room with a coverage grid that is capable of creating any number of gain and attenuation zones that are able to be monitored for the purpose of tracking and measuring all sound sources in the complete space to allow for the intelligent optimization of the gain structure of sound sources in a gain zone and sound sources entering and leaving the gain zones while minimizing the contribution of undesired sound sources so the participants at the remote end of the call get the best experience possible.

A "microphone" in this specification may include, but is not limited to, one or more of, any combination of transducer device(s) such as, microphone element, condenser mics, dynamic mics, ribbon mics, USB mics, stereo mics, mono mics, shotgun mics, boundary mic, small diaphragm mics, large diaphragm mics, multi-pattern mics, strip microphones, digital microphones, fixed microphone arrays, dynamic microphone arrays, beam forming microphone arrays, and/or any transducer device capable of receiving acoustic signals and converting to electrical signals, and/or digital signals.

A "microphone point source" is defined for the purpose of this specification as the center of the aperture of each physical microphone. The microphones are considered to be omni-directional as defined by their polar plot and essentially can be considered an isotropic point source. This is required for determining the geometric arrangement of the physical microphones relative to each other. The microphones are considered to be a microphone point source in 3D space.

A "microphone arrangement" may be defined in this specification as a geometric arrangement of all the microphones contained in the microphone system. Microphone arrangements are required to determine the virtual microphone distribution pattern. The microphones can be mounted at any point in the 3D space, which may be a room boundary, such as a wall, ceiling, or floor. Alternatively, the microphones may be offset from the room boundaries by mounting on stands, tables or structures that provide offset from the room boundaries. The microphone arrangements are used to describe all the possible geometric layouts of the physical microphones.

An "inclusion zone" (IZ) may be defined in this specification as a defined area that encompasses a group of virtual microphones. This can be a 2-dimensional area in the case of a 2-dimensional arrangement of virtual microphones or a 3-dimensional volume in the case of a 3-dimensional arrangement of virtual microphones. The inclusion zone represents a physical space in which sounds are considered to be desirable. A zoning configuration will prioritize sound sources in inclusion zones when creating an output signal. In the context of Zoning Automatic Gain Control (AGC), an inclusion zone represents a region from which sound sources will have a positive gain applied.

An "exclusion zone" (EZ) may be defined in this specification as a defined area that encompasses a group of virtual microphones. This can be a 2-dimensional area in the case of a 2-dimensional arrangement of virtual microphones or a 3-dimensional volume in the case of a 3-dimensional arrangement of virtual microphones. The exclusion zone represents a physical space in which sounds are considered to be undesirable. In the context of Zoning AGC, an exclusion zone represents a region from which sound sources will have a negative gain applied.

An "undefined zone" (UZ) may be defined in this specification as representing any virtual microphones that are not part of an inclusion or exclusion zone. Sounds coming from an undefined zone are considered neither desirable nor undesirable. The virtual microphones in an undefined zone are simply ignored. An undefined zone represents a region from which no gain is specified, and the resulting level is only dependent on the IZ and EZ of the configuration.

An "audio channel profile" (ACP) may be defined in this specification to represent a configuration that is applied to an output audio channel. In the case of a system with multiple audio output channels, each channel has its own ACP. This allows each output channel to be configured independently for different needs. For example, a user might want two channels to focus on different areas of the room. This could be configured in the ACP of each channel. An ACP will contain the Zoning Parameters of an output channel such as the location and gains of inclusion and exclusion zones for that channel.

A "gain source" (GS) may be defined in this specification as representing a virtual microphone that tracks a sound source in an inclusion zone. Gain sources are bound to inclusion zones and remain inside of them at all times. The location of a gain source represents the physical location for which the individual microphone signals of the system will be aligned to produce the output signal of an ACP. Therefore, each ACP has one gain source. An ACP can have multiple inclusion zones but will always have one gain source. In the case of multiple inclusion zones, the gain source can move between inclusion zones but will always be inside one of them. The power of the gain source is used to measure the sound level inside of the inclusion zones.

An "attenuation source" (AS) may be defined in this specification as representing a virtual microphone that tracks a sound source in an exclusion zone. Attenuation sources are bound to exclusion zones and remain inside of them at all times. Attenuation sources are only used to measure the power of sound sources in exclusion zones so an ACP can be configured to support multiple attenuation sources. The power of the attenuation sources is used to measure the sound level inside of the exclusion zones. Like gain sources, attenuation sources can move between any of the exclusion zones in an ACP. Unlike with gain sources, an ACP does not align an output signal to any AS location so an ACP can support multiple simultaneous AS's.

A "microphone axis" may be defined in this specification as an arrangement of microphones that forms and is constrained to a single 1D line. Two or more microphone axis arrangements can be combined to form an overall microphone aperture arrangement. For example, two microphone axes arranged perpendicular to each other will form a microphone plane and two microphone planes arranged perpendicular to each other will form a microphone hyperplane.

A "virtual microphone" in this specification represents a point in space that has been focused on by the combined microphone array by time-aligning and combining a set of physical microphone signals according to the time delays based on the speed of sound and the time to propagate from the sound source each to physical microphone. A virtual microphone emulates the performance of a single, physical, omnidirectional microphone at that point in space.

A "coverage zone" in the specification may include physical boundaries such as wall, ceiling and floors that contain a space with regards to the establishment of installing and configuring a microphone system coverage patterns and dimensions. The coverage zone dimension can be known ahead of time or derived with a number of sufficiently placed microphone arrays also known as boundary devices placed on or offset from physical room boundaries.

A "combined array" in this specification can be defined as the combining of two more individual microphone elements, groups of microphone elements and other combined microphone elements into a single combined microphone array system that is aware of the relative distance between each microphone element to a reference microphone element, determined in configuration, and is aware of the relative orientation of the microphone elements such as a m-axis, m-plane and m-hyperplane sub arrangements of the combined array. A combined array will integrate all microphone elements into a single array and will be able to form coverage pattern configurations as a combined array.

A "conference enabled system" in this specification may include, but is not limited to, one or more of, any combination of device(s) such as, unified communications (UC) compliant devices and software, computers, dedicated software, audio devices, cell phones, a laptop, tablets, smart watches, a cloud-access device, and/or any device capable of sending and receiving audio signals to/from a local area network or a wide area network (e.g. the Internet), containing integrated or attached microphones, amplifiers, speakers and network adapters. PSTN, Phone networks etc.

A "communication connection" in this specification may include, but is not limited to, one or more of or any combination of network interface(s) and devices(s) such as, Wi-Fi modems and cards, internet routers, internet switches, LAN cards, local area network devices, wide area network devices, PSTN, Phone networks, etc.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

A "participant" in this specification may include, but is not limited to, one or more of, any combination of persons such as students, employees, users, attendees, or any other general groups of people that can be interchanged throughout the specification and construed to mean the same thing. Who gathering into a room or space for the purpose of listening to and or being a part of a classroom, conference, presentation, panel discussion or any event that requires a public address system and a UCC connection for remote participants to join and be a part of the session taking place. Throughout this specification a participant is a desired sound source, and the two words can be construed to mean the same thing.

A "desired sound source" in this specification may include, but is not limited to, one or more of a combination of audio source signals of interest such as: sound sources that have frequency and time domain attributes, specific spectral signatures, and/or any audio sounds that have amplitude, power, phase, frequency and time, and/or voice characteristics that can be measured and/or identified such that a microphone can be focused on the desired sound source and said signals processed to optimize audio quality before delivery to an audio conferencing system. Examples include one or more speaking persons, one or more audio speakers providing input from a remote location, combined video/audio sources, multiple persons, or a combination of these. A desired sound source can radiate sound in an omni-polar pattern and/or in any one or combination of directions from the center of origin of the sound source.

An "undesired sound source" in this specification may include, but is not limited to, one or more of a combination of persistent or semi-persistent audio sources such as: sound sources that may be measured to be constant over a configurable specified period of time, have a predetermined amplitude response, have configurable frequency and time domain attributes, specific spectral signatures, and/or any audio sounds that have amplitude, power, phase, frequency and time characteristics that can be measured and/or identified such that a microphone might be erroneously focused on the undesired sound source. These undesired sources encompass, but are not limited to, Heating, Ventilation, Air Conditioning (HVAC) fans and vents; projector and display fans and electronic components; white noise generators; any other types of persistent or semi-persistent electronic or mechanical sound sources; external sound source such as traffic, trains, trucks, etc.; and any combination of these. An undesired sound source can radiate sound in an omni-polar pattern and/or in any one or combination of directions from the center of origin of the sound source.

A "system processor" is preferably a computing platform composed of standard or proprietary hardware and associated software or firmware processing audio and control signals. An example of a standard hardware/software system processor would be a Windows-based computer. An example of a proprietary hardware/software/firmware system processor would be a Digital Signal Processor (DSP).

A "communication connection interface" is preferably a standard networking hardware and software processing stack for providing connectivity between physically separated audio-conferencing systems. A primary example would be a physical Ethernet connection providing TCP/IP network protocol connections.

A "Unified Communication Client (UCC)" is preferably a program that performs the functions of but not limited to messaging, voice and video calling, team collaboration, video conferencing and file sharing between teams and or individuals using devices deployed at each remote end to support the session. Sessions can be in the same building and/or they can be located anywhere in the world that a connection can be establish through a communications framework such but not limited to Wi-Fi, LAN, Intranet, telephony, wireless or other standard forms of communication protocols. The term "Unified Communications" may refer to systems that allow companies to access the tools they need for communication through a single application or service (e.g., a single user interface). Increasingly, Unified Communications have been offered as a service, which is a category of "as a service" or "cloud" delivery mechanisms for enterprise communications ("UCaaS"). Examples of prominent UCaaS providers include Dialpad, Cisco, Mitel, RingCentral, Twilio, Voxbone, 8×8, and Zoom Video Communications.

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

With reference to FIG. 1*a*, shown is illustrative of a typical audio conference scenario in the current art, where a remote user 101 is communicating with a shared space conference room 112, for example, via headphone (or speaker and microphone) 102 and computer 104. Room, shared space, environment, free space, conference room and 3D space can be construed to mean the same thing and will be used interchangeably throughout the specification. The purpose of this illustration is to portray a typical audio conference system 110 in the current art in which there is sufficient system complexity due to either room size and/or multiple installed microphones 106 and speakers 105 that the microphone 106 and speaker 105 system may require custom room coverage patterns, configuration setup and zoning configurations. Zoning in this specification is defined as a microphone array's 124 ability to configure a room 112 into defined and discrete areas known as gain and attenuation zones and/or regions for the purpose of prioritizing important areas of the room 112 for sound source 107 pickup and zones that are not prioritized for sound source 107 pickup. Important areas can be for example defined as but not limited to boardroom tables 108, interactive display areas 122, presentation locations (not shown), teacher front of class areas (not shown) and any space 112 where desired sound sources 107 have priority over other sound sources 107 and areas of the room 112. The goal is to have the microphone and speaker bar combination unit 114 only target and focus on desired sound sources 107 in specific areas of the room 112 for optimal benefit of the remote users 101. How zoning is accomplished is very important to the result that the remote user 101 experiences in audio quality and performance at the far end of the conference call. Microphone 106 coverage pattern setup is typically required to support zoning capabilities in all but the simplest audio conference system 110 installations where the microphones 106 are static in location and their coverage patterns limited, well understood and fixed in design such as a simple table-top 108 units and/or as illustrated in FIG. 1*b* simple wall mounted microphone and speaker bar combination unit 114.

For clarity purposes, a single remote user 101 is illustrated. However, it should be noted that there may be a plurality of remote users 101 connected to the conference system 110 which can be located anywhere a communication connection 123 is available. The number of remote users is not specifically germane to the preferred embodiment of the invention and is included for the purpose of illustrating the context of how the audio conference system 110 is intended to be used once it has been installed and calibrated. Individual remote users 101 may be on separate streaming channels that would allow for separate in-room 112 ACP zoning profile configurations and would be within scope of the invention as outlined in the structural diagram (FIG. 11*d*) and the logic diagrams outlined in FIGS. 12*a*, 12*b* and 12*c* respectively. The room 112 is configured with examples of, but not limited to, ceiling, wall, and desk mounted microphones 106 and examples of, but not limited to, ceiling and wall mounted speakers 105 which are connected to the audio conference system 110 via audio interface connections. In-room participants 107 may be located around a table 108 or moving about the room 112 to interact with various devices such as the touch screen monitor 122. A touch screen/flat screen monitor 122 is located on the long wall. A microphone 106 enabled webcam 109 is located on the wall beside the touch screen 122 aiming towards the in-room participants 107. The microphone 106 enabled web cam 109 is connected to the audio conference system 110 through common industry standard audio/video interfaces. The complete audio conference system 110 as shown is sufficiently complex that a manual setup for the microphone system is most likely required, for example by using computer 103, for the purpose of establishing coverage zone areas between microphones, gain structure and microphone gating levels of the microphones 106, including feedback and echo calibration of the system 110 before it can be used by the participants 107 in the room 112. As the participants 107 move around the room 112, the audio conference system 110 will need to determine the microphone 106 with the best audio pickup performance in real-time and adjust or switch to that microphone 106. Problems can occur when microphone coverage zones overlap between the physically spaced microphones 106. This can create microphone 106 selection confusion especially in systems relying on gain detection and level gate thresholding to determine the most appropriate microphone 106 to activate for the talking participant at any one time during the conference call. Some systems in the current art will try to blend individual microphones through post processing means, which is also a compromise trying to balance the signal levels appropriately across separate microphone elements 106 and can create a comb filtering effect if the microphones 106 are not properly aligned and summed in the time domain. Conference systems 110 that do not have a properly configured and cohesive coverage area including the ability to configure for zone specific prioritizations within the coverage area can never really be optimized for all dynamic situations in the room 112.

The size, shape, construction materials and the usage scenario of the room 112 dictates situations in which equipment can or cannot be installed in the room 112. In many situations the installer is not able to install the microphone system 106 in optimal locations in the room 112 and compromises must be made. To further complicate the system 110 installation as the room 112 increases in size, an increase in the number of speakers 105 and microphones 106 is typically required to ensure adequate audio pickup and sound coverage throughout the room 112 and thus increases the complexity of the installation, setup, and calibration of the audio conference system 110.

The speaker system 105 and the microphone system 106 may be installed in any number of locations and anywhere in the room 112. The number of devices 105, 106 required is typically dictated by the size of the room and the specific layout and intended usages. Trying to optimize all devices 105, 106 and specifically the microphones 106 for all potential room scenarios can be problematic.

It should be noted that microphone 106 and speaker 105 systems can be integrated in the same device such as tabletop devices and/or wall mounted integrated enclosures or any combination thereof and is within the scope of this disclosure as illustrated in FIG. 1*b*.

With reference to FIG. 1*b*, shown is illustrative of a microphone 106 and speaker 105 bar combination unit 114. It is common for these combination units 114 to contain multiple microphone 106 elements in what is known as a microphone array 124. A microphone array 124 is a method of organizing more than one microphone 106 into a common microphone array 124 of microphones 106 which consists of two or more and most likely five (5) or more physical microphones 106 ganged together to form a microphone array 124 element in the same enclosure 114. The microphone array 124 acts like a single microphone 106 but typically has more gain, wider coverage, fixed or configurable directional coverage patterns to try and optimize microphone 106 pickup in the room 112. It should be noted that a microphone array 124 is not limited to a single enclosure and can be formed out of separately located microphones 106 if the microphone 106 geometry and locations are known, designed for and configured appropriately during the manual installation and calibration process.

With reference to FIG. 1*c*, shown is illustrative of the use of microphones 106 and speakers 105 bar combination units (bar units) 114 mounted on separate walls. The location of the bar units 114 for example may be mounted on the same wall, opposite walls or ninety degrees to each other as illustrated. Both bar units 114 contain microphone arrays 124 with their own unique and independent coverage patterns. If the room 112 requirements are sufficiently large, any number of microphone 106 and speaker 105 bar units 114 can be mounted to meet the room 112 coverage needs and is only limited by the specific audio conference system 113 limitations for scalability. This is a typical deployment strategy in the industry and coordination and hand off between the separate microphone array 124 coverage patterns need to be managed and calibrated for, and/or dealt with in firmware to allow the bar units 114 to determine which unit 114 is utilized based on the active speaking participant 107 location in the room, and to automatically switch to the correct bar unit 114. Mounting multiple bar units 114 to increase microphone 106 coverage in larger rooms 112 is common. It should be noted that each microphone array 124 operates independently of each other, as each microphone array 124 is not aware of the other microphone array 124 in any way plus each microphone array 124 has its own specific microphone coverage configuration patterns. The management of multiple microphone arrays 124 is typically performed by a separate system processor 117 and/or DSP module. Because the microphone arrays 124 operate independently the advantage of combining the arrays and creating a single intelligent coverage zoning strategy is not possible.

For the purpose of this invention, it is assumed that a microphone array 124 is required. A microphone array 124 is defined as a microphone array that provides coverage of a room 112 through the use of virtual microphones. If more than one microphone arrays 124 are installed in the room 112, the microphone arrays 124 can be configured to form a physical combined array as described in U.S. patent application Ser. No. 18/116,632 filed Mar. 2, 2023, and a unified coverage map as described in U.S. patent application Ser. No. 18/124,344 filed Mar. 21, 2023, entire content of which are incorporated herein by reference. It should be noted that multiple microphone arrays 124 are not required to form the one or multiple of coverage zones outlined in the preferred embodiment of the invention and as long as the microphone array 124 is able to instantiate and distribute virtual microphones 304 throughout the room 112 it is considered within scope of supporting the invention.

With reference to FIG. 2*a*, shown are representative examples, but not an exhaustive list, of microphone array and microphone speaker bar layouts 114*a*, 114*b*, 114*c*, 114*d*, 114*e*, 114*f*, 114*g*, 114*h*, 114*i*, 114*j* to demonstrate the types of microphone arrays 124 and speaker 105 arrangements that are supported within the context of the invention. The microphone array 124 and speaker 105 layout configurations are not critical and can be laid out in a linear, offset or any geometric pattern that can be described to a reference set of coordinates within the microphone and speaker bar layouts 114*a*, 114*b*, 114*c*, 114*d*, 114*e*, 114*f*, 114*g*, 114*h*, 114*i*, 114*j*. It should be noted that certain configurations where microphone elements are closely spaced relative to each other (for example, layouts 114*a*, 114*c*, 114*e*) may require higher sampling rates to provide required accuracy. At low frequencies, the wavelengths of audio signals become much larger. To differentiate between two points of a wavelength, a larger distance is required. Therefore, if a low-frequency wavelength hits two microphones that are very close to each other, they will both show the same data. At higher frequencies, the wavelengths become shorter, and the two near microphones can properly differentiate between two signals. Therefore, in order to get the benefit of having multiple microphones that are very close to each other, higher frequencies must be supported. To support higher frequencies, a higher sampling rate must be used. FIG. 2*a* also illustrates the different microphone arrangements that are supported within the context of the invention. The microphones may be distributed in a single linear axis 201 or a single plane 202 or any combinations thereof and can be construed to be within scope of the invention.

FIG. 2*b* extends the support for the microphone array 124 to various wall mounting scenarios. The microphones 106 can share the same mounting plane and/or be distributed across multiple walls (planes) A, B, C, D or E and be within scope of the invention. This also shows that the microphone plane 202 can be rotated in any axis 203.

With reference to FIGS. 3*a* and 3*b*, shown are descriptive illustrations outlining the distinctive difference in approaches between the directional coverage pattern performance characteristics of a basic beamforming array 308, as outlined in FIG. 3*a*, to a non-directional full room coverage approach of a microphone array 124, as outlined in FIG. 3*b*. The microphone array 124 does not utilize or use beamforming algorithms, microphones 106 placement or design principals to create on-axis 302 gain or off-axis 303 rejection polar plot patterns and instead focuses the microphone array 124 to single point in space referred to as a virtual microphone 304, allowing the microphone array 124 to receive sound sources 107 in an omni-directional pattern from that focus point in the 3d space 112. Refer to U.S. Pat. No. 10,063,987.

The beamformer 308 array in FIG. 3*a* is representative of the typical on-axis 302 and off-axis 303 coverage pattern characteristics by using a combination of microphone 106 selection, number of microphones 106, placement, and specific spacings in combination with complex post signal processing methods to create a directional coverage pattern with a specific polar response.

The coverage pattern (polar plot) contains a directional region of maximized sound source 107 pickup referred to as the on-axis 302 gain region and a region of active sound source 107 signal cancellation referred to as the off-axis 303 rejection (attenuation) region. This means that if a sound source 107 is located anywhere in the on-axis region 302, the beamforming array 308 maximizes the gain of the signal. If the sound source 107 is not located in the on-axis region 302 of the array 308, it is by default in the off-axis region 303 of the beamformer array 308. The beamformer array 308 actively cancels the off-axis 303 signal. The beamforming array 308 by design utilizes nulls and aliasing frequencies in combination with signal processing algorithms to obtain the desired polar response with upwards of for example 40 dB or more attenuation in the off-axis 303 region and is well understood in the current art. In practical terms this means that the beamformer 308 is not actively tracking or aware of sound sources 107 in the off-axis 303 region by design. In addition, the beamforming array 308 will typically be subject to lobing regions 307 of unwanted frequency specific gain in the polar plot which can be due to for example, but not limited to frequency specific wavelength issues in combination with microphone 106 spacing, number and placement considerations, which is a by-product of design choices in the beamforming array 308. This is an unwanted gain artifact of beamforming arrays 308 which can create non-linear gain and frequency response issues in the beamforming array 308 for sound sources 107 in the off-axis 303 region of the polar response which is also relative to room 112 placement of beamforming array 308. Lobing artifacts can impact the zoning capabilities of the beamforming array 308 and the ability to create clear and defined regions in the room 112 of desired sound source 107 pick-up verses regions in the room 112 of undesired sound source 107 pick-up.

The goal is to know when a sound source 107 is in an undesired region of the room 112 and to deal with the undesired sound source 107 in an appropriate manner to maintain the proper gain structure of desired sound sources 107 in the desired region of the room 112 without being influenced or impacted by undesired sound sources 107 in an undefined and unknown manner. A by-product of the typical polar plot of a beamformer array 308 is that it is not designed to look at the whole room 112 equally from a 3D spatial (x, y, z) perspective as any space in the rejection region 303 is simply ignored and effectively cancelled as undesired signals that are outside of the on-axis 302 gain region. The limitations of beamformer arrays 308 become readily apparent when there is a need or requirement to dynamically and intelligently adjust the gain of and track the location (x, y, z) of sound sources 107 that are outside of the on-axis region 302. By design beamformers 308 are implemented to maximize the gain of a sound source 107 in the beam (on-axis 302 region) and reject reflections and other sound sources 107 and noises outside of the beam. In effect the beamforming array 308 is designed to maximally reject off axis signals 303 and maximize on-axis 302 signals right at the beamformer array 308 thus eliminating the possibility of a beamformer array 308 to have awareness of sound sources 107 in the off-axis 303 region of the polar plot. Adding additional beamformer arrays 308 to create full room 112 coverage or adding additional on-axis 302 lobes is expensive and complex and does not change the impact of off-axis 303 lobing issues. Sound sources 107 located in each zone or transitioning between undesired and desired zone areas of the room 112 will still be impacted by the characteristics of the off-axis 303 rejection of the beamformer 308. Creating additional on-axis 302 regions/zones to obtain awareness of and gain information about sound sources 107 in undesired zones would not be an effective solution. The gain structure in each on-axis 302 lobe/region is independent of sound sources 107 outside of the on-axis regions 302. So sound sources 107 that are not static in location and move around the room 112 cannot be managed effectively with respect to leaving and entering the on-axis 302 regions creating abrupt audio transitions that are unpleasant to listen to at the far end of call for the remote users 101.

FIG. 3*b* illustrates an approach to room 112 coverage that does not have the same limitations of the current art of beamforming, by continuously monitoring the whole room 112 without the constraints of on-axis 302 and off-axis 303 polar responses, and utilizes the preferred embodiment outlined in this specification referred to as automatic zoning gain control. Automatic zoning gain control works by preferably defining inclusion zones 305 and exclusion zones 306 independent of the microphone array 124 where the sound source 107 gain structures can be managed across multiple zones of any type and multiple sound sources 107 throughout the whole room 112 resulting in intelligent and predictable zone-specific gain control. Smoother transitions for sound sources 107 moving between desired (inclusion zone 305) to undesired (exclusion zone) 306, and optimum gain management of sound sources 107 within each inclusion zone (IZ) 305 and exclusion zone (EZ) 306 is obtained because their specific location (x, y, z) and signal levels are known and continuously tracked.

The microphone array 124 as installed into a typical room 112 preferably covers the whole room 112 with 1000's of virtual microphones 304 evenly distributed throughout the room 112. The virtual microphones 304 in this example completely fill the room 112 in all three dimensions (x, y, z). However, the size and the shape of the overall virtual microphone 304 grid is a configurable set of parameters that can be preferably defined in the x, y, z coordinate space 112 allowing for partial to preferably complete room 112 coverage. Once a virtual microphone 304 is focused on by the microphone array 124, the frequency response and gain of the array is linear and consistent. This applies to all virtual microphones 304 positions in the defined coverage map across the full room 112. Because the virtual microphones 304 are distributed through the room 112 and always available, each virtual microphone 304 can be monitored continuously to provide defined parameters such as for example but not limited to (on/off and signal power). In this preferred example of the invention, an inclusion zone 305 and an exclusion zone 306 have been configured within the virtual microphone 304 grid by grouping all the available virtual microphones 304 based on their location into the room 112 into either an inclusion zone 305 or an exclusion zone 306. The inclusion zone 305 is a zone where positive gain structure is applied to targeted sound sources 107 while in the exclusion zone 306 a negative gain structure is applied to targeted sound sources 107 identified in this zone. The automatic zone gain control processor 1150 as defined in FIG. 11*e* uses the signal power level of each sound source 107 target in each zone and derives a specific gain structure, for the targeted inclusion zone 305 gain source as outlined in FIG. 11*d*. The shapes of the IZ 305 and EZ 306 are independent of the microphone array 124 structure and can be disassociated, shaped, and configured in any manner or size that contains a full or subset of virtual microphone 304 distributions. The benefit of this preferred embodiment of the invention that defines an inclusion zones 305 and exclusion zones 306 within the full virtual microphone grid is that the microphone array 124 can monitor all sound sources 107 in the 3D space 112 and make the appropriate targeted sound source 107 gain structure (automatic zone gain control) decisions based on the sound source 107 location relative to the zone type they are in or moving between in the room 112 and overcoming the limitations present in beamformer array 308 implementations.

With reference to FIGS. 4*a*, 4*b* and 4*c*, shown are illustrative current art examples outlining beamformer 308 coverage patterns in a typical room 112 where there may be more than one region/lobe configured to provide coverage and on-axis gain 302 to certain areas of the room 112. FIG. 4*a* illustrates a room 112 configured with a boardroom table 108 and a beamformer array 308 suspended from the ceiling. To provide independent coverage areas four on-axis 302 regions BF GZ1, BF GZ2, BF GZ3, and BF GZ4 have been configured. The gain structure in each on-axis 302 region can be configured manually and automatic gain control (AGC) is typically applied to sound sources 107 within the on-axis 302 regions. What is not illustrated is the off-axis 303 lobing 307 that overlap each adjacent on-axis 302 region. The combined off-axis 303 region has been configured to be any space outside of the boardroom table 108. The beamformer array 308 will actively reject any sound sources 403 in the off-axis 303 region by design at the beamformer array 308. The nature of off-axis 303 rejection means the beamformer array 308 is typically unaware of, or able to do any dynamic gain adjustments to the sound sources 107*a* and 107*b* in the on-axis 302 regions based on off-axis 303 sound source 107*c* levels. The implications are that if sound source 107*c* is in close proximity to the on-axis 302 region it may be rejected entirely which may or may not be desirable or it may cause ingress issues causing the gain to fluctuate in the on-axis 302 zones in an unpredictable manner. If the sound source 107*c* located in the off-axis 303 region is loud enough the beamformer array 308 will not be able to adjust the adjacent on-axis 302 regions gain structure in an intelligent manner because it is not able to locate and determine if the sound source 107*c* is from a valid location to apply gain to. This could cause the gain in the on-axis 302 region to track and fluctuate based on sound source 107*c* which would be undesirable behavior resulting in poor performance at the remote end 101 of the call. Specifically, the beamformer array 308 is not able to locate and manage sound source 107*c* in the off-axis 303 region because it has no active coverage in that part of the room 112. The beamformer 308 derives its gain structure determinations based on on-axis 302 sound sources 107*a*, 107*b* only. Additional beamformers 308 can be added in an attempt to overcome this limitation by adding more regions/lobes 302 to create specific zones with configurable parameters, however the same limitations apply as there will typically be off-axis 303 regions where the beamformer 308 is not able to track and monitor sound sources 107 that could impact the on-axis 302 regions in unpredictable ways. Therefore, it is preferable to have a microphone array that can continually monitor the full room utilizing zone-based coverage configurations to intelligently optimize the audio quality for desired sound sources 107*a*, 107*b* in one section of the room 112 and to intelligently ignore undesired 107*c* sound sources based on their location in the room 112.

FIG. 4*b* illustrates the same room configured with a beamformer 308 that uses a beam-tracking approach. The on-axis 302 region can appear to be square shaped compared to the typical lobing patterns as seen in FIG. 3*a*. The same limitations apply though in that if a sound source 107*c* is not located in the specific on-axis 302 coverage area it is by default in the off-axis 303 region and is hidden from the beamformer 308. So, gain structure determinations in the on-axis 302 region are made based solely on sound sources 107*a*, 107*b* within the on-axis 302 region. If a sound source 107*a*, 107*b*, 107*c* traverses between on-axis 302 and off-axis 303 regions the transition can be abrupt and unpleasant with sudden gain shifts in levels as the AGC tries to compensate at the remote 101 end of the call. If a sound source walks 107*a*, 107*b*, 107*c* just outside the edge of the on-axis 302 region their sound level can be unpredictable and potentially abruptly attenuated due to off-axis 303 rejection causing undesired effects for the remote user 101 of the conference call.

FIG. 4*c* illustrates the same beam tracking beamformer 308 configured to supply two independent zones with on-axis 302 regions BF Z1, BF Z2 of coverage that are dissociated from each other. It should be noted that this represents a floor plan of the coverage. With a beamformer microphone array 308, all beams originate from the center of the aperture formed by the physical microphones in the array. In this case, the beamformer 308 is mounted on the ceiling of the room and so the beams covering BF Z2 must be connected to 308 at a point on the ceiling. Therefore, although BF Z2 is shown on the right side of the room and dissociated from beamformer 308 at the floor level, the beam is connected at the ceiling level. This means the coverage range of BF Z2 changes based on the height. This limitation of beamformer arrays means that coverage zones such as BF Z2 that are further away from the beamformer 308 can result in undesired behavior as the height of the participant 107*d* changes. This arrangement shares the same limitations as previous examples in the desired on-axis 302 regions for static non-moving sound sources 107*a*, 107*b*, 107*d* however when the sound sources 107*c* traverses between on-axis 302 regions BF Z1 and BF Z2 into the off-axis 303 rejection region there will not be a smooth transition between the on-axis 302 regions with potentially abrupt signal degradation and possible total loss of the sound source 107*c* which would be undesirable. The sound source 107*c* in the off-axis 303 region will be actively rejected by the beamformer array 308 creating abrupt loss of sound at the remote end of the call. It should be noted that to create a zone with a beamformer array 308 either an individual on-axis region 302 is configured or groups of on-axis regions 302 are grouped together to form an area of desired on-axis 302 gain in the room 112. Multiple on-axis 302 regions may be possible within the limits of available microphones 106 and processing capability. In either scenario there will be areas of off-axis 303 response within the system and room 112 unless an on-axis 302 region is configured to cover the whole space 112 at which point there is no longer separate zones (regions) for the purpose of creating desired and undesired areas of pickup in the room 112 and the beamformer array 308 operates per normal behavior.

A preferable approach would be to establish desired and undesired zones that remain active where sound sources 107 can be tracked throughout the complete room 112 for the purpose of managing the gain of the sound sources 403 at the edges of the on-axis 302 zones BF Z1 and BF Z2 based on their position within the off-axis 303 regions in an intelligent manner creating the best experience for the remote users 101.

With reference to FIGS. 5*a* and 5*b*, shown are illustrative examples of a 2D and 3D microphone 106 arrangements illustrating the effective impact on virtual microphone 304 shape, size and coverage pattern dispersion of the virtual microphones 304 and mirrored virtual microphones 501 (2D array) in a space 112. For details of how virtual microphones are formed and positioned in the 3D space 112, refer to U.S. Pat. No. 10,063,987. And for forming a combined array from ad-hoc arrays and discrete microphones, refer to U.S. patent application Ser. No. 18/116,632 filed Mar. 2, 2023.

FIG. 5*a* is an illustrative diagram of the virtual microphone 304 shape that is formed from a microphone array 124 of microphones 106 and the distribution of the virtual microphones 304 along the mounting axis of the microphone array 124. Each virtual microphone 304 is drawn as a circle (bubble) to illustrate its relative position to the microphone array 124. The number of virtual microphones 304 that can be created is a direct function of the setup and hardware limitations of the system processor 117. In the case of a microphone array 124 arrangement the virtual microphone 304 cannot be resolved specifically to a point in space and instead is represented as a toroid in the 3D space. The toroid 502 is centered on the microphone axis 201 which is the same as the X axis in this configuration as illustrated in the side view illustration. The effect of this virtual microphone 304 toroid shape 502 is that there are always many points within the toroid 502 geometry and will be seen as equal and cannot be differentiated. The impact of this is a real virtual microphone 304 and a mirrored virtual microphone 501 on the same plane. Due to this toroid geometry, the virtual microphones 304 cannot differentiate between spots in the z-axis. Therefore, the virtual microphones 304 are aligned in a single x-y plane. Allocating individual virtual microphones 304 in the z-dimension is not possible due to symmetry imposed by the microphone array 124 configuration. Note that each toroid will intersect with the x-y plane in two different spots. One of these is the true desired virtual microphone 304 location and the other is a mirrored location 501 at the same distance on the opposite side of the microphone array 124. The microphone array 124 cannot distinguish between the two virtual microphone 304, 501 positions (or any along the path of the toroid). As a result of this, it is a recommended constraint that a microphone array 124 arrangement be positioned on a solid boundary layer such as wall or ceiling so the mirrored virtual microphone 501 can be ignored as sound behind the boundary (wall). Using this mounting constraint, any sound source 107 found by the microphone array 124 will be considered to be in the room 112 in front of the front wall.

The geometric layout of the virtual microphones 304 will be equally represented in the mirrored virtual microphone plane 501 behind the wall. The virtual microphone distribution geometries are symmetrical as represented by front of wall and behind the wall. The number of virtual microphones 304 can be configured to the y-axis dimensions, front of wall depth and the horizontal-axis, width across the front of wall. As stated previously, the same dimensions will be mirrored 501 behind the wall. For example, the y-axis coverage pattern configuration limit will be equally mirrored behind the wall in the y-axis in the opposite direction. The z-axis cannot be configured due to the toroid 502 shape of the virtual microphone geometry. Put another way the number of virtual microphones 304 can be configured in the y-axis and x-axis but not in the z-axis for the microphone array 124 arrangement. As mentioned previously the microphone array 124 arrangement is well suited to a boundary mounting scenario where the mirrored virtual microphones 501 can be ignored and the z-axis is not critical for the function of the microphone array 124 in the room 112. The preferred embodiment of the invention can position the virtual microphone 304 map in relative position to the microphone array 124 orientation and can be configured to constrain the width (x-axis) and depth (y-axis) of the virtual microphone 304 map if the room boundary dimensions are known relative to the microphone array 124 position in the room 112.

FIG. 5*b* is an illustrative example of two microphone arrays 124 arranged to form a multiplane arrangement of microphones 106 resulting in a virtual microphone 304 distribution that is not mirrored on either side of the microphone arrays 124 nor is it rotated around the microphone array 124 forming a toroid 502 shape. The multiplane 203 arrangement is the most preferable microphone 106 arrangement as it affords the most configuration flexibility in the x-axis, y-axis and z-axis and eliminates the mirrored virtual microphone 501 geometry. This means that although the microphones 106 are illustrated as being shown as mounted to a boundary they are not constrained to a boundary mounting location and can be offset, suspended and/or even table mounted, and optimal performance is maintained as there is no mirrored virtual microphones 501 to be accounted for. As per the microphone array 124 arrangement all virtual microphones 304 are considered to be a point source in space.

For simplicity the illustration of the multiplane arrangement is shown as cubic however it is not constrained to a cubic geometry for virtual microphone 304 coverage map form factor and instead is meant to represent that the virtual microphones 304 are not distributed on an axis or a plane and thus incurring the limitations of those geometries. The virtual microphones 304 can be distributed in any geometry and pattern supported by the hardware and mounting locations of the individual microphone arrays 124 or within the combined array and be considered within the scope of the invention.

With reference to FIG. 6, shown is a diagrammatic illustration of zoning shapes that are considered within the scope of the invention. Various zone shapes, whether they be IZ 305 or EZ 306 defined can be configured by combining any number of virtual microphones 304 in an ACP configuration. Geometric shapes such as but not limited to triangular 603, spherical 606, elliptical 601, cubic 604, rectangular 602 or 605 and point 609 are all readily possible including non-geometric shapes. Planar 2D (x, y) and 3D (x, y, z) zones are configurable by combining the appropriate location and number of specific virtual microphones 304 distributed throughout the room 112. A single virtual microphone 304 can be configured as desired to IZ 305 or EZ 306 of any type for the maximum spatial granularity. Any number of inclusion 305 or exclusion zones 306 can be created and configured and is only limited by physical system resources and the hardware allocated to the implementation.

With reference to FIGS. 7*a* and 7*b*, illustrated are examples of a preferred embodiment of the invention as it pertains to the demarcation of zones in 2D and 3D layouts. FIG. 7*a* is a top-down view of the room 112. Illustrated are examples of but not limited to an inclusion zone 305, exclusion zone 306 and undefined zone 710 ACP configuration. The preferred embodiment of the invention is to not assign any undefined zones 710 and instead use exclusion zones 306 to define low priority areas in the room. Any number of each zone type is supported and to be considered in scope of the invention, only limited by the availability of unassigned/unallocated virtual microphones 304 within the space 112. FIG. 7*b* is an ACP configuration where the inclusion zone 305 in defined as a cubic rectangle shape disassociated from the microphone array 124 (not shown) in the geometric middle space of the room 112. An undefined zone 710 is defined at the very top of the room 112. The exclusion zone 306 is defined to include all other virtual microphones 304 not contained in the inclusion zone 305 and undefined zone 710.

With reference to FIG. 8, shown is a current art illustration of a typical virtual microphone speaker array 114 installation in a room 112 without zoning enabled, meaning all virtual microphones 304 are without a zone configuration. The virtual microphone map 801 has been configured to fill approximately 80% of the space 112. Individual virtual microphones 304 are not shown for clarity purposes however it would be considered typical and preferable that 1000's of virtual microphones 304 are distributed evenly throughout the coverage grid 801. In this configuration scenario, if a sound source is within the virtual microphone 304 coverage grid 801 it will be treated equally by the virtual microphone array 114 which will locate the sound source and focus on it applying the same gain rules for each virtual microphone 304 regardless of its location in the room 112 within the coverage grid 801.

With reference to FIGS. 9*a*, 9*b*, 9*c*, 9*d*, 9*e*, 9*f* and 9*h*, shown are illustrations of exemplary embodiments outlining a top-down perspective of the room 112 with various ACP configurations of IZ 305 and EZ 306. The illustrations are depicted as top down for clarity purposes, and the zones can be distributed and shaped in 2D and 3D axes geometries based on the microphone array 124 geometry as shown in FIGS. 5*a* and 5*b*, and are considered to be within scope of the invention.

In FIG. 9*a* the microphone array 124 distributes the virtual microphones 304 throughout the whole room 112 to the wall boundaries of the room 112. The virtual microphone 304 grid has been configured for one inclusion zone 305 and a surrounding exclusion 306 zone. As stated previously in the specification the virtual microphones 304 are distributed throughout both zones IZ 305 and EZ 306 maintaining full room coverage for sound source monitoring and targeting. A single sound source target 902 is located within the inclusion zone 305 and will be defined as a Gain Source (GS) 1139. The other active sound source 901 is located in the exclusion zone 306 and will be defined as an Attenuation Source (AS) 1201. It should be noted that each sound source 901, 902 are directly tied to the closest virtual microphone 304 to their location within the coverage grid of preferably 1000's of distributed virtual microphones 304 in the 3D space 112. Since all the virtual microphones 304 are available in this coverage grid, the monitoring, targeting and intelligent gain management of any virtual microphone 304 can occur based on the specific algorithms described in the zoning processor 1150 based on the GS 1139 and AS 1201 virtual microphones 304 location in the inclusion zone 305 and exclusion zone 306 as per an exemplary embodiment of the invention. Unlike beamformer arrays 308 with on-axis 302 gain and off-axis 303 rejection which treats sound sources based solely on their position in the polar response of the beamforming array 308, the microphone array 124 is able to advantageously track and adjust the gain for the GS 1137 and AS 1201 targeted sound sources within the room 112.

FIG. 9*b* further illustrates another preferred embodiment of the invention by showing the ability to create an inclusion zone 305 that is dissociated from the front plane of the microphone arrays 124. Multiple sound source targets 901*a*-901*b*, 902*a*-902*c* are tracked and processed by the zoning processor 1150. The zoning processor 1150 continually looks at all active sound sources 901*a*-901*b*, 902*a*-902*c* and makes the appropriate gain-processing decisions based on its specific targeting configuration to maximize audio pickup and performance of the selected GS 1137 target. The inclusions zone 305 is rectangular in shape and contains three active targets 902*a*-902*c* within the IZ 305. As per FIG. 9*b* each potential sound source (GS) target 902*a-c* is associated directly with a virtual microphone 304 located at that specific 3D location in the room 112. Because the three potential GS 1137 targets 902*a*-902*c* are within the inclusion zone 305 they could be selected as a GS 1137 by the zoning processor 1150. The selected GS 1137 will be output via the audio processor 1103. The two sound sources 901*a*-901*b* located in the exclusion zone 306 will be added to the AS list 1139 by the zoning processor 1150 and be used in the zoning gain calculations for the selected GS 1137 target either 902*a*, or 902*b* or 902*c*.

FIG. 9*c* further extends the embodiment to illustrate the configuration with two active inclusion zones 305 IZ1 and IZ2 and one overall exclusion zone 306 EZ1. Each inclusion zone 305 contains one potential active sound source target 902*a* and 902*b*. The exclusion zone 306 contains one active sound source target 901. The zoning processor 1150 will prioritize the appropriate sound source 902*a* or 902*b* based on the configuration parameters loaded into the zoning processor 1150. Whichever target 902*a* or 902*b* gets selected in the inclusion zone 305 will be gain structured in conjunction with the sound source target 901 in the exclusion zone 306. Either sound source 902*a* or 902*b* can be selected and made the GS 1137 based on the targeting parameters of the zoning processor 1150. There is no requirement for the sound sources 901, 902*a* and 902*b* to be static in position as the zoning processor 1150 will dynamically track and adapt to any new positional coordinates of all sound source targets 901, 902*a* and 902*b* in real-time and adjust the desired active sound source gain of the GS 1137 at either 902*a* or 902*b* accordingly. Any number of inclusion 305 and exclusion 306 zones can be configured for an ACP and be considered within scope of the invention.

FIG. 9*d* further illustrates an exemplary embodiment of the invention demonstrating two inclusion zones 305 IZ1 and IZ2 configured with one exclusion zone 306 allocated to the remainder of the virtual microphone 304 grid distributed throughout the whole room 112. The inclusion zone 305 IZ1 in this example illustrates an example of creating a spherical zone 606 shape (see FIG. 6) that would be considered not feasible in the current art. To further clarify the zone inclusion 305 zone shape in this example is not meant to illustrate a 2D planform view as seen top down but is instead meant to represent a 3D spherical zone 606 shape placed in the middle of the room 112. In practice, as stated in FIG. 6 of the specification any shape 2D or 3D is supported that can contain any number of virtual microphones 304 and be considered within scope of the invention. The inclusion zone 305 IZ1 contains two sound source targets 902*a* and 902*b*. Inclusion zone 305 IZ2 contains one sound source target 902*c*. The exclusion zone 306 contains three sounds source targets 901*a*-901*c* which will be added to the AS list 1139. The sound sources in the AS list 1139 will be used in the processing calculations by the zoning processor 1150 to set the gain structure of the selected active sound source target either 902*a* or 902*b* or 902*c* which is set as the GS 1137. This is a dynamic situation accounting for changes in AS list 1139 parameters and GS 1137 parameters in real-time allowing for the audio processor 1105 to take into account changes for all sound targets 901*a*-901*c*, 902*a*-902*c* within the room 112. Although six sound source 901*a*-901*c*, and 902*a*-902*c* targets are illustrated any number of sound source targets can be tracked in real-time by the zoning processor 1150 because of the distribution of virtual microphones 304 throughout the room 112.

FIG. 9*e* is yet another example of a zone shape supported by the invention. A hexagonal inclusion zone 305 IZ1 shape which includes two potential gain source targets 902*a*-902*b* and an inclusion zone 305 IZ2 which contains one potential GS 1137 target 902*c* have been configured. The exclusion zone 306 contains a total of four sound source targets 901*a-d* to be tracked and added to the AS list 1139.

FIG. 9*f* illustrates a more complex zone configuration supported by the invention. Two inclusion zones 305 IZ1 and IZ2 each containing one potential GS target 1137 902*a* and 902*b*. Two exclusion zones 306 EZ1 and EZ2 are configured in the room 112 containing when active sound source targets 901*a*-901*d* to be tracked and added to the AS list 1139. Exclusion zone 306 EZ1 is contained within the boundaries of an inclusion zone 305 IZ1 demonstrating the ability to support zone-in-zone capabilities. The zone-in-zone capability is possible due to the distribution of virtual microphones 304 throughout the coverage grid. Any virtual microphone 304 is available to be assigned to an inclusion zone 305, or an exclusion zone 306. The ability to configure any number of zones and zone types allows the audio conference system to handle complex environments where inclusion zones 305 can be placed in optimal high priority areas for desired sound source pickup while still being able to configure preferably one or more exclusion zones 306 to deprioritize undesired sound sources 901*a*-901*d* throughout the room 112. An example of this is the configuration of exclusion zone 306 EZ2 in the middle of the table 108. The microphone array 124 can be prevented from assigning sound sources 901*a* and 901*b* in the EZ1 region as a GS 1137 while calculating the best gain structure for the sound sources 902*a* and 902*b* in the inclusion zones 305 IZ1 or IZ2.

FIG. 9*g* illustrates the installation of a third microphone array 124 into the room 112. The invention is not limited to the number of or require a certain number of microphone arrays 124 to support the invention. A single microphone array or a plurality of microphone arrays 124 is supported and considered within scope of the invention. The number of microphone arrays 124 installed is determined by the room 112 dimensions and coverage requirements. The number of potential sound source targets 901*a*-901*e*, 902*a*-902*d* has been increased illustrating the ability of the target processor 1102 to monitor and track any number of sound sources in the room 112 in real-time.

FIG. 9*h* illustrates an example of a small exclusion zone 306 EZ1 and a much larger inclusion zone 305 IZ1. It may be desirable to create an exclusion zone 306 around a known static undesired sound source such as but not limited to an HVAC, fans or other intrusive sound sources. This prevents the targeting processor 1102 from targeting sound sources in the EZ1 zone 306 and assigning them as a GS 1137. The microphone array 124 will still be aware of and monitor sound sources that enter the EZ1 exclusion zone 306 and be able to manage the gain of the currently active sound source target 902*a-b* accordingly.

With reference to FIG. 10, shown is a illustrative of a preferred embodiment of the invention that demonstrates the behavior of the zoning processor 1150 when sound sources 107*a* and 107*b* move between the configured inclusion 305 and exclusion 306 zones. The zoning processor 1150 initially will be able to select between the following potential sound source 107*c* and 107*a* targets 902 and 1001*a* to assign as a GS 1137 and will have sound source 107*b* target 1002*a* in the AS source list 1139. This is because initially two sound sources 107*c* mapped to target 902 and 107*a* mapped to target 1001*a* are located in the inclusion zone 305 and sound source 107*b* is mapped to 1002*a* and added to the AS List 1139. Assuming sound source 107*a* is active it will be the selected target by the targeting processor 1102 and the microphone array 124 will continue to focus on sound source 107*a* until they leave the inclusion zone 305. At which point the sound source 107*c* target 902 will be the only available sound source 107*c* target 902 for the microphone array 124 to focus on and assign as a GS 1137. At any point in the following sequence, sound source 107*c* target 902 can be selected by the zoning processor 1150 as a potential GS 1137 target because it is always within the inclusion zone 305. At the start of the sequence only actively transmitting/speaking sound sources 107*c* and 107*a* can be a selected as a GS 1137, unless there is no one speaking at the time at which point the zoning processor 1150 will default to the last virtual microphone 304 or the virtual microphone 304 with the largest ambient gain value as the GS 1137. The exact same logic is applied to the exclusion zone 306 in that the AS list 1139 target will be defaulted to the last known virtual microphone 304 in the exclusion zone 306 or to the virtual microphone 304 with the largest ambient noise gain value and defined as the AS 1201. If both sound sources 107*c* and 107*a* are emitting sound the zoning processor 1150 will select the appropriate sound source target 902 or 1001*a* in real-time based on the selection logic.

Sound source 107*a* will be tracked by the targeting processor 1102 as long as the sound source 107*a* is emitting sound. If sound source 107*c* is not emitting sound and the sound source 107*a* is emitting sound while moving to target location 1001*b* the targeting processor 1102 will be bounded at target location 1001*a* by the edge boundary of the inclusion zone 305 at which point the virtual microphone 304 location will be locked at sound source target 1001*a* until sound source 107*a* stops talking, or if sound source 107*c* starts actively talking taking the focus away from sound source 107*a*. If sound source 107*c* does not actively talk the gain structure of sound source 107*a* will be attenuated, according to the algorithms outlined in FIGS. 12*a*-12*d* descriptions. This ensures a smooth transition between inclusion 305 and exclusion zones 306 unlike the typical abrupt and sharp attenuation caused by beamformer arrays 308 off-axis rejection 303 resulting in unpleasant artifacts at the far end of conference call such as but not limited to varying audio levels, abrupt loss of talkers and potential noise floor pumping as the AGC adjusts to the sudden change in the audio signal level and quality. By tracking all sound sources 107*a*, 107*b* and 107*c* in the room 112 regardless of the zone 305, 306 they are in a logical, smooth and planned transition between IZ 305 and EZ 306 zones for sound sources 107*a*, 107*b*, or 107*c* can be managed by focusing the microphone array 124 on the appropriate active sound source 107*a*, 107*b*, or 107*c* resulting in a predictable, smooth and stable audio transition between inclusion 305 and exclusion 306 zones.

The same logic of the preferred embodiment is applied to sound sources such as 107*b* that starts off located in an exclusion zone 306 and moves into an inclusion zone 305. If no other sound sources 107*c* and 107*a* are actively talking in the inclusion zone 305 and the sound source 107*b* at sound source target location 1002*a* starts to actively talk in the exclusion zone 306. The targeting processor 1150 will prioritize the virtual microphone 304 at target location 1002*b* which is the virtual microphone 304 now assigned as a GS 1137 with the best signal performance at the edge of the inclusion zone 305. The microphone array 124 will be focused on the virtual microphone 304 at target location 1002*b* and the gain structure will be set by the zoning processor 1150. As long as no other sound sources 107*c* or 107*a* become active in the inclusion zone 305 while the sound source 107*b* is actively talking in the exclusion zone 306 the zoning processor maintains the sound source 107*b* in the AS list 1139 and will adapt the gain structure of the virtual microphone 304 at target location 1002*b* accordingly. Once the active sound source 107*b* enters the inclusion zone 305 it will be managed as an inclusion zone 305 GS 1137 by the zoning processor 1150. Sound sources entering or leaving the inclusion 305 zone while actively talking are tracked and can be assigned as the active GS 1137, edge boundary target, are added to the appropriate AS list 1139 if they enter the exclusion zone 306 and managed by the zoning processor 1150 to ensure smooth audio transition performance between zones 305, 306. Zone based gain control effectively overcomes the limitation in the current art by eliminating the hash and potentially abrupt transition caused between on-axis 302 and off-axis 303 performance typical of a beamformer array 308. At any point, any actively talking sound source in the inclusion zone 305 such as sound source 107*c* will have priority over any sound source in the exclusion 306 zone.

With reference to FIG. 11*a*, shown is a block diagram showing a subset of high-level system components related to a preferred embodiment of the invention. The three major processing blocks are the Array Configuration and Calibration 1101, the Targeting Processor 1102, and Audio Processor 1103. The Array Configuration and Calibration 1101 uses configuration constraints 1120 to find the location of all physical microphones 106 in the system by injecting a known signal 1119 to the speakers 105 and measuring the delays to each microphone 106. This process is described in more detail in U.S. patent application Ser. No. 18/116,632 filed Mar. 2, 2023. Once the location of all physical microphones 106 has been determined, the next step is to create coverage zone dimensions and populate the coverage zone dimensions with virtual microphones 304. Herein, populating the coverage zone dimensions with the virtual microphones includes densely or non-densely (or sparsely) filling the coverage zone dimensions with the virtual microphones and uniformly or non-uniformly placing the virtual microphones in the coverage zone dimensions. Any number of virtual microphones can be contained in the coverage zone dimensions. This process is described in more detail in U.S. patent application Ser. No. 18/124,344 filed Mar. 21, 2023. The results of the Array Configuration and Calibration 1101 are the physical locations of the physical microphones 106 and virtual microphones 304 and the corresponding weights and delays of the physical microphones 106 associated with all virtual microphones 304 in the system. These results are then passed to the Targeting Processor 1102 and the Audio Processor 1103 through 1122 and 1116 respectively. The Targeting Processor block 1102 uses the delays 1122 to identify sound source attributes 1111 from the virtual microphones 304 as described in FIG. 11*b*. The resulting real-time location results from the Targeting Processor 1102 are sent to the Audio Processor 1103. The invention described herein involves the Audio Processor block 1103 which uses the sound source attributes 1111 discovered by the Targeting Processor 1102 to time-align the microphones signals and combine them in the correct way in generate the intended audio signals 1144 to be sent out from the audio interface 1145 as described in FIG. 11*d*.

FIG. 11*b* describes the target processor 1102. A sound source is picked up by a microphone array 124 of many (M) physical microphones 106. The microphone signals 1118 are inputs to the mic element processors 1101 as described in FIG. 11*c*. This returns an N*M*Time 3D array of each 2D mic element processor output 1120 that then sums all (M) microphones 106 for each virtual microphone 304 n=1 . . . N in 1104. This is a sum of sound pressure that is then converted to power in 1105 by squaring each sample. The power signals are then preferably summed over a given time window such as 50-100 ms by the N accumulators at node 1107. The sum represents the signal energy over that given time period. The processing gain for each virtual microphone 304 is preferably calculated at node 1108 by dividing the energy of each virtual microphone 304 by the energy of an ideal unfocused signal 1122. The unfocused signal energy is preferably calculated by summing in 1119 the energies of each microphone signal 1118 over the given time window, weighted by the maximum ratio combining weight squared. This is the energy that we would expect if all the signals were uncorrelated. The processing gain 1108 is then preferably calculated for each virtual microphone 304 by dividing the microphone array 124 signal energy by the unfocused signal energy 1122. Node 1106 as described in FIG. 12*a* searches through the 1D array of processing gain 1121 to find all current sound sources 1140. This will contain a number of sound sources from 1 to S, with S corresponding to the maximum number of sound sources that can be tracked by the system.

FIG. 11*c* shows the Mic Element Processor 1101. Individual microphone signals 1118 are passed through a precondition process 1117 that can filter off undesired frequencies such as frequencies below 100 Hz that are not found in typical voicebands from the signal before being stored in a delay line 1111. The Mic Element Processor 1101 uses the delay 1112 and weight 1114 from each virtual microphone 304 (*n*) to create the N*Time 2D output array 1120. Each entry is created by multiplying the delayed microphone by the weight in 1123. The weight and delay of each entry are based on the bubble position 1115 and the delay 1116 from the microphone 106 to that virtual microphone 304. The position of all N virtual microphones 304 gets filled by the Bubble Map Positioner Processor 1121 based on the location of the available physical microphones 106 as described in U.S. patent application Ser. No. 18/124,344 filed Mar. 21, 2023.

One embodiment may comprise the processor described and depicted in U.S. Pat. No. 10,063,987, the entire contents of which are incorporated herein by reference.

FIG. 11*d* shows an example configuration of the Audio Processor 1103 as described in FIG. 11*a*. Here, microphone array devices 124*a*, 124*b*, and 124*c* (comprising a plurality of microphones 106) and microphone 106*a* represent the combined microphone array found by the Array Configuration and Calibration block 1101. The signals 1118 from this combined mic array are used by both the Target Processor 1102 and the Audio Processor 1103. For the Audio Processor 1103, the individual raw mic signals 1118 are first preferably processed for example but not limited to remove noise, reverberation, and echo in block 1142. This creates the processed audio streams 1138 that are used by the multipliers 1125. Note that some or all of this processing in the Audio Processor 1103 may also be optionally applied to the audio streams 1141 that are used by the Target Processor 1102. Doing so can help the Target Processor 1102 to focus on desired sound sources such as Participants 107 instead of undesired sources such as coherent noise sources or residual echo signals. Alternatively, the raw microphone signals 1118 could be used by both the multipliers 1125 and the Target Processor 1102 and the resulting combined microphone stream could later be subjected to the processing described in 1142.

The Target Processor 1102 utilizing the Microphone Array signals 1141 preferably determines the substantially exact positional location (X, Y, Z) coordinates of the sound sources 1140 with the highest processing gain. This is passed in as input to the Zoning Processor 1150 described in FIG. 11*e*. Each Audio Channel Profile 1126 has its own Zoning Processor 1150 which determines the location of the gain source 1137 that affects the weights 1124 and delays 1128 that the Gain Weight Processor 1149 and Delay Processor 1123 use to align the microphone signals 1138 to a constant time 1132 and sum them in 1133 to produce the combined mic signal 1143 aligned at time 1132 and the resulting ACP audio signal 1144. Note that the Gain Weight Processor 1149 also has access to the physical location of the microphones 1116 determined by the Array Configuration and Calibration block 1101. The process of aligning microphones with the correct weights 1124 and delays 1128 based on a physical location 1137 is described in more details in U.S. patent application Ser. No. 18/126,739, filed Mar. 27, 2023. The Audio Processor 1103 contains at least one but potentially multiple ACPs 1126, each of which is used to produce an output signal 1144. The signal or signals 1144 produced by the Audio Processor 1103 will all get sent out of the system through the Audio Interface 1145 described in FIG. 11*a*. The zoning gain 1147 found by the Zoning Processor 1150 is multiplied by the combined mic signal 1143 in an element 1148 to create the output channel 1144 for the current ACP.

This process is repeated for all ACPs to generate all outputs 1144 of the Audio Processor 1103.

FIG. 11*e* represents the Zoning Processor 1150. This takes in as input the list of sound sources 1140 preferably discovered by the Target Processor 1102. The Zoning Processor contains an Active Zone Configuration 1127 for the ACP 1126 that the Zoning Processor 1150 belongs to. The sound source list 1140 is passed in as input to the Sound Source Allocation Block 1136 along with the inclusion 305 and exclusion 306 zone parameters 1129 that represent the physical boundaries of the Active Zone Configuration Parameters, the weight of the inclusion zones 305 $W^Z$ and the maximum number of attenuation sources that can be allocated for the current ACP 1126. The Sound Source Allocation block 1136 finds the Gain Source 1137 and the Attenuation Source List 1139 as described in FIG. 12*a*. The Calculate Zoning Ratio Block 1135 as described in FIG. 12*b* uses the GS 1137 and AS list 1139, along with the $P_{min}$, $Y_G^Z$ and $Y_A^Z$ Active Zone Configuration parameters 1130 for the current ACP to determine the zoning ratio r 1146. The zoning ratio r, along with the $G_{max}^Z$ and $G_{min}^Z$ parameters 1131 of the Active Zone Configuration 1127 are used by the Calculate Zoning Gain block 1134 to find the zoning gain $G_{AZGC}$ 1147 as described in FIG. 12*c*. The Gain Source 1137 and Zoning Gain $G_{AZGC}$ 1147 are the resulting outputs of the Zoning Processor 1150.

FIG. 12*a* is a preferred embodiment of the logic flow for the procedure 1106 for finding the sound source attributes 1140. This process begins at step S1200 with an array of processing gains for all virtual microphones 1121 as calculated in the target processor 1102 described in FIG. 11*b*. This array of virtual microphones 304 is rearranged from the virtual microphone 304 with the highest processing gain to the virtual microphone 304 with the lowest processing gain in step S1210. Step S1220 initializes the sound source list with the first virtual microphone 304 of the rearranged array which corresponds to the highest processing gain in the array. Then, S1230 begins the process of analyzing the rest of the array one virtual microphone 304 at a time. First, S1240 checks if the sound source is full, meaning all S sound sources that can be allocated have been allocated. If the list is full, the process can exit in S12100 to the Sound Source Allocation process 1136. If the list is not full, the processing gain of the current virtual microphone 304 is checked in S1250 to see if it is above some minimum threshold p. If the gain is below this threshold, this virtual microphone 304 is not desired. Since all virtual microphones 304 after this will have lower processing gain, the sound list can be considered done and this process can exit by moving to the Sound Source Allocation logic at step S12100. If the virtual microphone 304 processing gain is above p, this virtual microphone 304 is then checked in S1260 to see if it is within some minimum distance d of any sound source on the list. If it is, then this is considered a part of the same sound source and this virtual microphone 304 can be ignored in S1270. If the virtual microphone 304 is not within d of any other sound source, this is added to the sound source list in S1280. The process then checks in S1290 if the current virtual microphone 304 is the last virtual microphone 304 in the array. If so, the process can exit by moving to the Sound Source Allocation logic in S12100. If this is not the last mic, the next virtual microphone 304 is loaded and the loop starts over from S1240. The output of this process is the sound source list 1140.

FIG. 12*b* is a preferred embodiment of the logic flow for the procedure for allocating sound sources as Gain Sources 1137 or Attenuation sources 1201. This process begins with a list of sound source attributes 1140 preferably discovered by the Target Processor 1102 as described in FIG. 11*b*. These attributes include the location of the sound sources along with the power of the virtual microphone 304 at that location. The process also requires an initialization step S12110 which initializes the Gain Source 1137 to have a power of zero (0) and the same location as the last valid GS 1137 found. If there is no last valid GS 1137 available, this can be initialized to be at the center of any inclusion zone 305. S12110 also initializes a blank list of Attenuation Sources 1139. Once S12110 is complete, the source processing loop can start at step S12120. This takes in the next available source in the list of 1140 and checks where it is located in step S12130. If the source is located in an exclusion zone 306, it gets passed on to S12140 which checks if the attenuation list 1139 is full. Note that the attenuation list 1139 has a maximum number of AS 1201 allowed which is a parameter of the ACP. If the AS list 1139 is not full, the new source is added in S12170. If the AS list 1139 is full, the power of the new source is checked in S12150 to see if it is greater than the smallest AS 1201 power in the AS list 1139. If the new power is greater, the AS 1201 with the smallest power in the AS list 1139 is overwritten with the new source in S12160. If not, the new source is simply ignored in S12180. If S12130 finds that the source is located in an undefined zone 710, it simply gets ignored in S12180. If the source is located in an inclusion zone 305, its power is multiplied by the weight of the inclusion zone 305 $W^Z$ in S12190. This is a parameter of the ACP that represents a way to assign different priorities to different inclusion zones 305. A greater $W^Z$ means that the virtual microphone 304 power is greater which increases the likelihood of replacing the Gain Source 1137. Therefore, a higher $W^Z$ assigns a higher priority to any zone. $W^Z$ is a weight value between 0 and 1.0. The weighted virtual microphone 304 power is checked to see if its power is greater than the current gain source 1137 power in S12200. If it is, this source becomes the new gain source 1137 in S12210. If not, this source is ignored in S12180. After each source has been processed, the loop will check if there are any other sound sources to process in S12220. If there are, the next sound source is checked in S12120. If not, the process exits to the next stage in S12230 by passing the GS 1137 and AS list 1139 to the Calculate Zoning Ratio process 1135 described in FIG. 12*c*.

FIG. 12*c* is a preferred embodiment of the logic flow for the procedure for finding the Zoning Ratio r. This ratio is representative of the sound power inside of the inclusion zone 305 compared to the sound power inside of the exclusion zone 306. The ratio will range from −1 to 1. An r value of −1 means that the sound in the room 112 is coming primarily from the exclusion zones 306 and sounds in the inclusion zones 305 can be deemed negligible. An r value of 1 means that the sound in the room 112 is coming primarily from the inclusion zones 305 and sounds in the exclusion zones 306 can be deemed negligible. A value of 0 means that there is equal sound coming from the inclusion 305 and exclusion 306 zones. This process 1135 starts at step S12240 and takes in as input the GS 1137 power 1137 and AS List 1139 preferably calculated by the Sound Source Allocation process 1136 as described in FIG. 12*b*. Step S12250 will find the power of the AS 1201 with the maximum virtual microphone 304 power in the AS list 1139. This gets stored as $P_{AS}$. Note that this is just one option of finding $P_{AS}$. Another option is to take the average of all the powers in the AS list 1139. If there are no AS 1201 in the list 1139, $P_{AS}$ can get set to some very small value $\in$ to prevent division by zero. The power of the gain source gets stored as $P_{GS}$. Step S12260 first checks both $P_{GS}$ and $P_{AS}$ to see if both values are below the minimum threshold $P_{min}$. If they are, it is deemed that there is no appreciable sound source in the room 112 and so the zoning ratio r is set to 0 in S12300. An r value of 0 corresponds to a gain of 1 which means no gain or attenuation will be applied in this case. If either or both of $P_{GS}$ and $P_{AS}$ are above $P_{min}$, it is deemed that there is an appreciable sound source in the room 112. Next, S12270 checks which of $P_{AS}$ and $P_{GS}$ is greater. If $P_{GS}$ is greater, it is deemed that there is a higher signal in the inclusion zones 305 than in the exclusion zones 306. From there, r is determined to be positive. In S12280, the ratio of $P_{GS}/P_{AS}$ is checked against the first threshold $Y_G^Z$. If the ratio is greater than this threshold, it is assumed that the sound signal in the inclusion zones 305 is much louder than that of the exclusion zones 306 and so r is set to the maximum possible value of 1 in S12300. If $P_{GS}/P_{AS}$ is less than $Y_G^Z$, it is assumed that there are signals in the inclusion 305 and exclusion 306 zones and so r is set to $$r = \frac{(P_{GS}/P_{AS})}{Y_G^Z}$$

in step S12300. Since it is already a condition that $P_{GS}$ is greater than $P_{AS}$ and $P_{GS}/P_{AS}$ is less than or equal to $Y_G^Z$, this means that r will take on some value between $1/Y_G^Z$ and 1. If it is found that $P_{AS}$ is greater than or equal to $P_{GS}$ in S12270, S12290 checks the ratio of $P_{GS}/P_{AS}$ against the second threshold $Y_A^Z$. If the ratio is greater than the threshold, it is assumed that the sound signal in the exclusion zones 306 is much louder than that of the inclusion zone 305 and so r is set to the minimum possible value of −1. If $P_{GS}/P_{AS}$ is less than $Y_A^Z$, it is assumed that there are signals in the inclusion 305 and exclusion zones 306 and so r is set to $$r = -\frac{(P_{AS}/P_{GS})}{Y_A^Z}$$

in step S12300. Since it is already a condition that $P_{AS}$ is greater than $P_{GS}$ and $P_{GS}/P_{AS}$ is less than or equal to $Y_A^Z$, this means that r will take on some value between $-1/Y_A^Z$ and −1. Note that $Y_G^Z$ and $Y_A^Z$ are ACP parameters configurable to each inclusion 305 and exclusion 306 zone respectively per ACP. $Y_G^Z$ corresponds to the parameters of the inclusion 305 zone to which the GS 1137 belongs while $Y_A^Z$ corresponds to the parameters of the exclusion 306 zone to which the AS 1201 from which $P_{AS}$ was derived belongs. Typical values of $Y_A^Z$ and $Y_G^Z$ can preferably range anywhere from but not limited to 2 to 8. $P_{min}$ is another ACP parameter. $P_{min}$ values are tied to typical virtual microphone 304 powers and should be experimentally determined based on the number of microphones 106 and type of individual microphone processing 1142 of the system. The output of process 1135 is the zoning ratio r 1146 which is then sent in S12310 to the Calculate Zoning Gain block 1134 as described in FIG. 12*d*.

FIG. 12*d* is a preferred embodiment of the logic flow for the procedure 1134 for finding the Zoning Gain $G_{AZGC}$. The input S12320 to this process is the zoning ratio r 1146 preferably calculated by the Finding Zoning Ratio process 1135 as described in FIG. 12*c*. If r is found positive in S12230, the zoning gain is set to $G_{AZGC}=1+r*(G_{max}^Z-1)$ in S12340. This will preferably give a value between 1 as r approaches 0 and $G_{max}^Z$ if r is 1. If r is negative, the zoning gain is set to $G_{AZGC}=1+r*(1-G_{min}^Z)$ in S12340. This will give a value between $G_{min}^Z$ in if r is −1 and 1 if r is 0. Note that $G_{max}^Z$ represents the maximum possible gain of the inclusion zone 305 that the GS 1137 is in. $G_{min}^Z$ represents the minimum possible gain of the exclusion zone 306 that the AS with the strongest power is in. Both of these values are configurable parameters that are defined as part of the Active Zone Configuration 1127 per ACP 1126. Typical values of $G_{max}^Z$ range from 2 to 6 while typical values of $G_{min}^Z$ range from ⅙ to ½. The resulting gain $G_{AZGC}$ gets sent to the multiplier 1137 that applies the zoning gain to the combined microphone signal 1143 to produce the ACP output signal 1144 as shown in FIG. 11*d*.

With reference to FIGS. 13*a*-13*f*, shown are examples of the behavior of the sound source tracking in different scenarios. Target in the examples is meant to show the location of the virtual microphone 304 location that can be defined as a AS 1201 and/or GS 1137. In FIG. 13*a*, there is a person 107 talking in the exclusion zone 306. Since the person 107 is talking inside of the exclusion zone 306, there is an AS 1201 target 901 directly tracking the person 107. In this case, the GS 1137 target 902 must remain in the inclusion zone 305 and so it picks the location in 305 with the strongest virtual microphone 304 power. This corresponds to the border of the inclusion zone 305 at the virtual microphone 304 that is closest to the person 107 while still being in the inclusion zone 305. In FIG. 13*b*, the person 107 is now in the inclusion zone 305 and so the GS 1137 target 902 is tracking them directly. The AS 1201 target 901 must remain in the exclusion zone 306 and so it ends up on the border of the exclusion zone 306 where the virtual microphone 304 power is loudest. In FIG. 13*c*, the person 107 is in the undefined zone 710 and so the GS 1137 target 902 is on the border of the IZ 305 and the AS 1201 target 901*a* is on the border of the EZ 306. In FIG. 13*d*, the person 107 is in UZ1 710 and the GS 1137 target 902 and AS 1201 target 901*a* are tracking the person 107 to the closest spots in IZ1 305 and EZ1 306 respectively. In this configuration, EZ1 supports at least 2 AS's 1201. There is another sound source 1313 in EZ1 that represents the noise from an HVAC. In this case, the second AS 1201 target 901*b* tracks this noise as well. FIG. 13*e* shows a scenario with two people 107*a* in IZ1 305 and 107*b* in UZ1 710 are talking at the same time at similar levels. In this case, the GS 1137 target 902 tracks the person 107*a* in IZ1 while the AS 1201 target 901 tracks the closest sound source to EZ1 which in this case is the person 107*b* in UZ1 710. FIG. 13*f* shows another scenario with two people 107*a* and 107*b* talking at the same time at similar levels in IZ1 305 and EZ1 306 respectively. In this case, the GS 1137 target 902 tracks the person 107*a* in the IZ while the AS 1201 target 901 tracks the person 107*b* in the EZ.

With reference to FIG. 14*a*, shown is an example of a room 112 with two (2) microphone arrays 124. In this case, the room 112 is configured with one ACP. The ACP has 2 different inclusion zones IZ1 305*a* and IZ2 305*b* and two exclusion zones EZ1 306*a* and EZ2 306*b*. In this case, the ACP channel has a $P_{min}$ of −30 dB and supports 2 attenuation sources 1201 as defined in 1401. IZ1 is configured with a $G_{max}^Z$ of 2, a $Y_G^Z$ of 3 and a $W^Z$ of 1 while IZ2 is configured with a $G_{max}^Z$ of 4, a $Y_G^Z$ of 4 and a $W^Z$ of 0.7. EZ1 is configured with a $G_{min}^Z$ of ¼ and a $Y_A^Z$ of 2. EZ2 is configured with a $G_{min}^Z$ of 1 and a $Y_A^Z$ of 1, meaning that sources in this region will be measured but not attenuated nor boosted. Two possible locations that the GS 1137 targets 902*a* and 902*b* can occupy are illustrated.

FIG. 14*b* and FIG. 14*c* represent a system configured with 2 different ACP configurations. In this example, the microphone arrays 124 are not shown but assumed to be present somewhere in the room 112. FIG. 14*b* represents the first ACP ACP1 while FIG. 14*c* represents the second ACP ACP2. ACP1 supports 2 AS 1201 targets and has a $P_{min}$ of −30 dB as defined in 1421. ACP1 has one inclusion zone IZ1 305*a* with a $G_{max}^{Z}$ of 4, a $Y_G^{Z}$ of 8 and a $W^{Z}$ of 1.0 and two exclusion zones EZ1 306*a* with a $G_{min}^{Z}$ of ½ and a $Y_A^{Z}$ of 2 and EZ2 306*c* with a $G_{min}^{Z}$ of 1 and a $Y_A^{Z}$ of 1. ACP2 supports 1 AS 1201 target and has a $P_{min}$ of −30 dB as defined in 1422. ACP2 has one inclusion zone IZ1 305*b* with a $G_{max}^{Z}$ of 2, a $Y_G^{Z}$ of 4 and a $W^{Z}$ of 1.0 and two exclusion zones EZ1 306*b* with a $G_{min}^{Z}$ of ½ and a $Y_A^{Z}$ of 2 and EZ2 306*d* with a $G_{min}^{Z}$ of 1 and a $Y_A^{Z}$ of 1. For both ACPs, ACP1 and ACP2, EZ2 is configured with a $G_{min}^{Z}$ of 1 and a $Y_A^{Z}$ of 1, meaning that sources in this region will be measured but not attenuated nor boosted.

FIGS. 14*d*, 14*e* and 14*f* represent a system configured with 3 different ACP ACP1, ACP2 and ACP3 configurations respectively. FIG. 14*d* represents ACP1 while FIG. 14*e* represents ACP2 and FIG. 14*f* represents ACP3. In this example, the microphone arrays 124 are not shown but assumed to be present somewhere in the room 112. ACP1 supports 3 AS 1201 targets and has a $P_{min}$ of −40 dB as defined in 1410. ACP1 has two inclusion zones IZ1 305*a* with a $G_{max}^{Z}$ of 4, a $Y_G^{Z}$ of 8 and a $W^{Z}$ of 1.0 and IZ2 305*b* with a $G_{max}^{Z}$ of 3, a $Y_G^{Z}$ of 4 and a $W^{Z}$ of 0.5 along with two exclusion zones EZ1 306*a* with a $G_{min}^{Z}$ of ½ and a $Y_A^{Z}$ of 2 and EZ2 306*f* with a $G_{min}^{Z}$ of 1 and a $Y_A^{Z}$ of 1. ACP2 supports 3 AS 1201 targets and has a $P_{min}$ of −40 dB as defined in 1411. ACP2 has one inclusion zone IZ1 305*c* with a $G_{max}^{Z}$ of 4, a $Y_G^{Z}$ of 8 and a $W^{Z}$ of 1.0 along with three exclusion zone EZ1 306*b* with a $G_{min}^{Z}$ of ½ and a $Y_A^{Z}$ of 2, EZ2 306*c* with a $G_{min}^{Z}$ of ½ and a $Y_A^{Z}$ of 2 and EZ3 306*g* with a $G_{min}^{Z}$ of 1 and a $Y_A^{Z}$ of 1. ACP3 supports 5 AS 1201 targets and has a $P_{min}$ of −40 dB as defined in 1412. ACP3 has one inclusion zone IZ1 305*d* with a $G_{max}^{Z}$ of 3, a $Y_G^{Z}$ of 4 and a $W^{Z}$ of 1.0 along with three exclusion zones EZ1 306*d* with a $G_{min}^{Z}$ of ½ and a $Y_A^{Z}$ of 2, EZ2 306*e* with a $G_{min}^{Z}$ of ½ and a $Y_A^{Z}$ of 2 and EZ3 306*h* with a $G_{min}^{Z}$ of 1 and a $Y_A^{Z}$ of 1. In this configuration, all 3 ACPs ACP1, ACP2 and ACP3 have the same exclusion zone 306*a*, 306*b* and 306*d* on the left side of the room. This might correspond to a spot with an undesirable sound such as an HVAC 1413 in the room since it is always part of an exclusion zone 306. All ACPs ACP1, ACP2 and ACP3 also contain an exclusion zone 306*f*, 306*g* and 306*h* with a $G_{min}^{Z}$ of 1 and a $Y_A^{Z}$ of 1 in the background of the room. These represent an area from where signals are neither attenuated not boosted. On the right side of the room 112, each ACP ACP1, ACP2 and ACP3 is configured differently. ACP1 has 2 inclusion zones 305*a* and 305*b* in the top and bottom of the right side of the room. This could for example correspond to a presenter 107 with a podium in IZ1 and audience seating 1414 in IZ2 305. This means a remote participant 101 listening to ACP1 would get good signal level and coverage from both of those locations. In this case, IZ1 has a weight of 1.0 while IZ2 has a weight of 0.5 so if the presenter 107 and the audience 1414 are talking at the same time, the GS 1137 will only focus on the audience 1414 if they are talking at more than double the volume of the presenter 107. Otherwise, the GS 1137 will target the presenter. ACP2 has an inclusion zone IZ1 305*c* in the same location as 305*a* from ACP1 and an exclusion zone EZ2 306*c* at the same spot as 305*b* from ACP1. ACP2 configuration is effectively taking ACP1 and converting 305*b* to an exclusion zone 306*c*. A remote participant 101 listening to ACP2 would only get sound source targets and signal gain from the top right corner of the room 112 and would correspond to the presenter 107 at the podium. Similarly, ACP3 has an inclusion zone IZ1 305*d* in the same location as 305*b* from ACP1 and an exclusion zone EZ2 306*e* at the same location as 305*a* from ACP1. This channel is effectively taking ACP1 and converting 305*a* to an inclusion zone 306*e*. A remote participant 101 listening to ACP3 would only get sound source targets from the bottom right corner of the room 112 corresponding to the audience seating 1414. With the configuration presented in these 3 ACPs, ACP1, ACP2 and ACP3 one or more remote participants 101 could choose to place attention on the presenter 107 using ACP2, the audience 1414 using ACP3 or both using ACP1. Automatic zoning gain control not only allows for proper and intelligent gain source structure mapping at all locations, virtual microphone 304 x, y, z positions, in the room 112 according to the sound source location relative to the IZ 305 and EZ 306 location and boundaries but also allows for one or more audio streams with custom ACP configurations to be sent to one or more remote participants 101 at the far end of the conference call.

FIG. 15*a* shows an example of a woman 107 moving in a room 112 with two microphone arrays 124 from an inclusion zone IZ1 305 to an exclusion zone EZ1 306*a* while speaking at a constant volume. Target in the following examples is meant to show the location of the virtual microphone 304 location that can be defined as a AS 1201 and/or GS 1137. In this case, the inclusion zone IZ1 305 has a $G_{max}^{Z}$ of 2, a $Y_G^{Z}$ of 3 and a $W^{Z}$ of 1.0 while the exclusion zone EZ1 306*a* has a $G_{min}^{Z}$ of ¼ and a $Y_A^{Z}$ of 2. This configuration supports 1 AS 1201 target. The woman 107 begins speaking at point A. At this point, the GS 1137 target 902*a* will be focused on her since point A is inside of the inclusion zone 305. At this point, the AS 1201 target will pick the loudest virtual microphone 304 in the exclusion zone EZ1 306*a*. It is assumed that there are no other sound sources in the exclusion zone 305 EZ1 so the AS 1201 target 901*a* is the closest to the person 107 at position A since that point will have the most energy out of all virtual microphones 304 in EZ1 306*a*. At position A, the GS 1137 target 902*a* will have a much louder power than the AS 1201 target 901*a*. Following the logic defined in FIG. 12*b*, this means that $P_{GS}>P_{AS}$ and in this case $$\frac{P_{GS}}{P_{AS}} > 3$$

so $$\frac{P_{GS}}{P_{AS}} > Y_G^{Z}$$

for this position. This means that the zoning ratio r becomes 1 for this position. The zoning gain as calculated in FIG. 12*d* for this position A is then $G_{AZGC}=1+r*(G_{max}^{Z}-1)=G_{max}^{Z}=2$. As the woman 107 keeps moving into the exclusion zone 306*a* EZ1, she eventually reaches position B on the border of the inclusion zone IZ1 305. At this point, the GS 1137 target 902*b* is still tracking the woman's position. Since the woman 107 is still in the inclusion zone IZ1 305, the AS 1201 target 901*a* remains at the closest point of EZ1 306*a*. The GS 1137 target is still closer to the woman 107 than the AS 1201 is so $P_{GS}>P_{AS}$ is still true. Now however, the GS 1137 at target 902*b* and AS 1201 at target 901*a* are fairly close to each other. In this position, $$\frac{P_{GS}}{P_{AS}} = 1.05.$$

Following the logic in FIG. 12c, that means that $$r = \frac{(P_{AS}/P_{GS})}{\gamma_G^z} = \frac{1.05}{3} = 0.35.$$

Applying the logic in FIG. 12d, the zoning gain for position B is then calculated as $G_{AZGC}$ 1+r*($G_{max}^Z$−1)=1+0.35*(2−1)=1.35. As the woman 107 crosses the border into the exclusion zone EZ1 306a, she reaches position C. At this point, she is now within EZ1 306a so the AS 1201 starts tracking her at 901a. The GS 1137 target no longer has a valid source to track in the inclusion zone IZ1 305 so the GS 1137 target will remain on the border at position 902b where the virtual microphone 304 power is loudest. Now, the AS 1201 target 901a is closer to the sound source 107 than the GS 1137 target 902b so $P_{GS}<P_{AS}$. The AS 1201 target 901a and GS 1137 target 902b are still very close to each other and $$\frac{P_{AS}}{P_{GS}} = 1.05.$$

Following the logic in FIG. 12b, that means to $$r = -\frac{(P_{AS}/P_{GS})}{\gamma_A^z} = -\frac{1.05}{2} = -0.525.$$

Applying the logic in FIG. 12c, the zoning gain for position C is then calculated as $$G_{AZGC} = 1 + r*(1 - G_{min}^z) = 1 - 0.525*\left(1 - \frac{1}{4}\right) = 0.60625.$$

The woman 107 keeps walking and eventually reaches position D. At this point, she is in the middle of the exclusion zone EZ1 306a and the AS 1201 is tracking her at target 901b. The GS 1137 target 902b is still at the border of the inclusion zone IZ1 305 so $P_{GS}<P_{AS}$ and now $$\frac{P_{AS}}{P_{GS}} > 2$$

so $$\frac{P_{AS}}{P_{GS}} > \gamma_A^z$$

which means that r is set to −1 and the zoning gain is set to $G_{AZGC}$=1+r*(1−$G_{min}^Z$)=$G_{min}^Z$=0.25. EZ2 306b fills the rest of the room 112 with an exclusion zone 306 with a $G_{min}^Z$ of 1 and a $Y_A^Z$ of 1 which means that sources picked up in this space should have no boost or attenuation. For this example, it is considered that target 901a is closer to points A and B than any point in EZ2 306b. In IZ1 305, the minimum value r can take is $$r = \frac{(P_{GS}/P_{AS})}{\gamma_G^Z} = \frac{1}{3}$$

since $P_{GS}$ is always greater than $P_{AS}$. With this r, the resulting gain is $$G_{AZGC} = 1 + \frac{1}{3}*(G_{max}^z - 1) = \frac{4}{3}.$$

This means r will range from ⅓ to 1 and $G_{AZGC}$ will range from 4/3 to 2. In EZ1, the maximum value r can take is $$-\frac{(P_{AS}/P_{GS})}{\gamma_A^z} = -\frac{1}{2}$$

since $P_{AS}$ is always greater than $P_{GS}$. With this r, the resulting gain is $$G_{AZGC} = 1 - \frac{1}{2}*(1 - G_{min}^z) = \frac{5}{8}.$$

This means r will range from −1 to −½ and $G_{AZGC}$ will range from ¼ to ⅝. A sound source such as the woman 107 will experience a maximum gain of 2 in the middle of IZ1 305. As she moves closer to the edge of IZ1 305, the gain will drop to a minimum potential value of 4/3. As she crosses from IZ1 305 to EZ1 306a, the gain will jump from at least the minimum IZ1 305 gain 4/3(2.5 dB) to at least the minimum attenuation or maximum gain of EZ1 306a ⅝ (−4 dB). This is a total jump of 6 dB. As the woman 107 keeps moving into the center of EZ1 306a, the gain will gradually lower to its minimum gain of ¼. This border effect is one that can be tuned using the $Y_A^Z$ and $Y_G^Z$ thresholds. For example, with a larger $Y_G^Z$ the ratio r in IZ1 305 could drop to a smaller minimum value since the minimum r in an IZ is 1/$Y_G^Z$. This would result in a lower gain at position B. Likewise, a larger value of $Y_A^Z$ would lead to a larger maximum r of EZ1 306a since the maximum r in an EZ 306 is −1/$Y_A^Z$. This would result in a higher gain at position C. Both thresholds could be tuned to have a higher or lower transition from IZ1 305 to EZ1 306a. The gain values $G_{min}^Z$ and $G_{max}^Z$ could also be tuned to change this effect but these will also change the gain values in the center of the zones so it is usually preferred to tune the gain values for the desired zone gains and the thresholds for the border transitions. Note that tuning the thresholds will also affect how far from the border of the zone a source must be before reaching $G_{max}^Z$ and $G_{min}^Z$. For example, for a source in an IZ 305, a large threshold $Y_G^Z$ means that $P_{GS}$ needs to be higher before $P_{GS}/P_{AS}$ is greater than $Y_G^Z$. This means the GS 1137 target will need to be farther from the AS 1201 target before the maximum gain $G_{max}^Z$ is reached. Likewise, with a higher $Y_A^Z$, the AS 1201 target will need to be further from the GS 1137 target before the minimum EZ 306 gain $G_{min}^Z$ is reached for a source in an EZ 306.

FIG. 15b shows the same room 112 with microphone arrays 124 and ACP zoning configuration as FIG. 15a but the woman 107 is now walking from position D to position A. Since the gains are measured independently at each target position, this means positions A, B, C and D will have the same r and $G_{AZGC}$ values as in FIG. 15a. In FIG. 15a, the woman 107 started out in the middle of the inclusion zone IZ1 305 with the gain set to the maximum possible value of 2 (6 dB). As she walked closer to the border between IZ1 305 and EZ1 306*a*, the ratio of $P_{GS}/P_{AS}$ dropped to a value of 1.05 that is very close to its minimum possible value of 1. This means that r went from its maximum positive value of 1 to 0.35, which is close to its minimum possible value of ⅓ for a source in IZ1 305. This point corresponded to a gain value of 1.35 (2.6 dB). As the woman 107 crossed the border into EZ1 306*a*, this caused the AS 1201 target to have more power than the corresponding GS 1137 target. As a result, r then became a negative value of –0.525 which is close to its maximum possible value of –0.5 for a source in EZ1 306*a*. This position C corresponded in a gain of 0.60625 (–4.3 dB). Therefore, as the woman 107 crossed the border from B in IZ1 305 to C in EZ1 306*a*, the gain applied to her voice dropped from a boost of 1.35 (2.6 dB) to an attenuation of 0.60625 (–4.3 dB). As she walked from C to D, this gain further dropped to its maximum attenuation of 0.25 (–12 dB). FIG. 15*b* shows the opposite scenario. The woman 107 is now walking from D to A. At position D, she is in the middle of the exclusion zone 306 so the gain is set to its minimum value of 0.25. As she approaches the border in position C, the gain increases to 0.60625. Once she crosses the border into position B in IZ1 305, the gain becomes a positive boost of 1.35. As she then proceeds into position A in the middle of IZ1 305, the gain applied to her voice reaches its maximum possible value of 2. EZ2 306*b* fills the rest of the room 112 with an exclusion zone 306 with a $G_{min}^{Z}$ of 1 and a $Y_{A}^{Z}$ of 1 which means that sources picked up in this space should have no boost or attenuation. For this example, it is considered that target 901*a* is closer to points A and B than any point in EZ2 306*b*.

FIG. 15*c* shows the same room 112 with microphone arrays 124 and zoning configurations as FIGS. 15*a* and 15*b*. Now, the woman 107 is walking from position E at the border of IZ1 305 and EZ1 306*a* to position A in EZ2 306*b*. At position E, the woman 107 is at the border of EZ1 306*a*. As shown in position C of FIGS. 15*a* and 15*b*, the gain here is 0.60625. The woman 107 then walks into the inclusion zone 305 IZ1 and reaches position D in the middle of IZ1 305. As shown in position A of FIGS. 15*a* and 15*b*, the GS 1137 target 902*a* is her current location and the gain at this point is set to $G_{max}^{Z}=2$. Next, the woman 107 reaches position C on the border of IZ1 305 and EZ2 306*b* to GS 1137 target 902*b*. Now, the AS 1137 target 901*b* shifted to EZ2 306*b* which is the closest point in any exclusion zone 306 to the sound source 107 at position C. Here, $P_{GS}>P_{AS}$ and is 1.05. The zoning ratio is calculated as $$r = \frac{(P_{GS}/P_{AS})}{\gamma_G^z} = \frac{1.05}{3} = 0.35.$$

This results in again of $G_{AZGC}=1+r*(G_{max}^{Z}-1)=1+0.35*(2-1)=1.35$. Note that this is the exact same gain that was on the border of IZ1 305 and EZ1 306*a* in position B on FIGS. 15*a* and 15*b*. This is because the IZ 305 parameters are the same and the zoning ratio is the same. Once the woman 107 crosses into EZ2 306*b* and reaches position B, the AS 1201 target 901*b* is determined. The GS 1137 target 902*b* remains inside of IZ1 305. Now, $$P_{GS} < P_{AS}$$

-continued and $$\frac{P_{AS}}{P_{GS}} = 1.05$$

so $$\frac{P_{AS}}{P_{GS}} > \gamma_A^z$$

since $Y_{A}^{Z}$ for EZ2 is 1. This means that r is set to –1 and the gain is set to $G_{AZGC}=1+r*(1-G_{min}^{Z})=1$. As the woman 107 reaches position A, she is now much further away from IZ1 305 In this position, the AS 1201 target 901*c* is set and the GS 1137 target 902*b* is maintained. Now, $P_{AS}$ is much greater than $P_{GS}$ but this still results in an r of –1, meaning the gain also remains 1. This configuration shows the advantage of filing the room with an exclusion zone 306 configuration with a $Y_{A}^{Z}$ of 1 and a $G_{min}^{Z}$ of 1. In this configuration, any sound source in IZ1 305 will get a positive gain applied. In IZ1 305 zone, the minimum value r can take is $$r = \frac{(P_{GS}/P_{AS})}{\gamma_G^z} = \frac{1}{3}$$

since $P_{GS}$ is always greater than $P_{AS}$. With this r, the resulting gain is $$G_{AZGC} = 1 + \frac{1}{3} * (G_{max}^z - 1) = \frac{4}{3}.$$

This means r will range from ⅓ to 1 and $G_{AZGC}$ will range from 4/3(2.5 dB) to 2(6 dB). In EZ1 306*a*, the maximum value r can take is $$-\frac{(P_{AS}/P_{GS})}{\gamma_A^z} = -\frac{1}{2}$$

since $P_{AS}$ is always greater than $P_{GS}$. With this r, the resulting gain is $$G_{AZGC} = 1 - \frac{1}{2} * (1 - G_{min}^z) = \frac{5}{8}.$$

This means r will range from –1 to –½ and $G_{AZGC}$ will range from ⅝(–4 dB). to ¼(–12 dB). This means any sound source in EZ1 306*a* will always have a negative gain applied. With a $G_{min}^{Z}$ and a $Y_{A}^{Z}$ of 1, sound sources in EZ2 306*b* will always have a gain of 1 (0 dB) applied. This created the effect of IZ1 305 being a positive gain region, EZ1 306*a* being a negative gain region and EZ2 306*b* being a neutral gain region.

FIG. 15*d* shows the same room 112 with microphone arrays 124 as FIGS. 15*a*, 15*b* and 15*c*. This ACP configuration has an undefined zone UZ1 710 instead of the exclusion zone EZ2 306*b* used in FIGS. 15*a*, 15*b* and 15*c*. The woman 107 is walking from position E at the border of IZ1 305 and EZ1 306*a* to position A in the undefined zone UD1 710. At position E, the woman 107 is at the border of EZ1 306*a*. As shown in position C of FIGS. 15*a* and 15*b*, the gain here is 0.60625. The woman 107 then walks into the inclusion zone 305 IZ1 and reaches position D in the middle of IZ1 305. As shown in position A of FIGS. 15*a* and 15*b*, the GS 1137 target 902*a* tracks her and the gain at this point is set to $G_{AZGC}=G_{max}^{Z}=2$. Next, the woman reaches position C on the edge of IZ1 305. At this point, the GS 1137 target 902*b* tracks her and the AS 1201 target 901 is still on the border of EZ1 306*a*. Just like position C, the ratio of $P_{GS}/P_{AS}$ is greater than the $Y_G^Z$ of 3 so the gain is set to $G_{AZGC}=G_{max}^{Z}=2$. Next, the woman 107 leaves the inclusion zone IZ1 305 and reaches point B in the undefined zone. At this point, 1501*b* represents the closest virtual microphone 304 to the woman 107. This virtual microphone 304 is ignored since it is in neither in a IZ 305 nor an EZ 306. The GS 1137 target 902*b* is assigned, which is still very close to position B. At this point, the GS 1137 target 902*b* is much louder than the AS 1201 target 901 so the gain is still set to $G_{AZGC}=G_{max}^{Z}=2$. The woman 107 keeps walking into UZ1 710 until she reaches position A. Here, the virtual microphone 304 at 1501*a* is also ignored. Now, the woman 107 is further away from the GS 1137 target 902*b* and the AS 1201 target 901. Here, the GS 1137 target 902*b* is still stronger than the AS 1201 target 901 but the levels are closer. In this case, $$\frac{P_{GS}}{P_{AS}} = 1.2.$$

The zoning ratio is then $$r = \frac{(P_{GS}/P_{AS})}{Y_G^Z} = \frac{1.2}{3} = 0.4$$

and the zoning gain is $G_{AZGC}=1+0.4*(2-1)=1.4$. The scenario here represents an alternative configuration to the one presented in FIG. 15*c*. Here, the virtual microphones 304 in UZ1 710 are not monitored and UZ1 710 will have some non-zero gain applied based on the position of the sound source 107 relative to its nearest IZ 305 and EZ 306. In FIG. 15*c*, the virtual microphones 304 in EZ2 306*b* are still being monitored and any sound source 107 in EZ2 306*b* will have a gain of 1 applied. In FIG. 15*c*, there is a slight border effect of transitioning from IZ1 305 to EZ2 306*b* where the gain jumps from 4/3 to 1 when transitioning from IZ1 305 to EZ2 306*b*. In FIG. 15*d*, there is no such border effect when transitioning from any zone to UZ1 710. Typically, FIG. 15*c* represents the preferred implementation. However, in cases where this border effect is considered problematic, using a UZ 710 such as shown in FIG. 15*d* becomes a viable option.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for dynamically adjusting gain structures of sound sources in a shared 3D space including one or more inclusion zones and one or more exclusion zones, comprising:

a combined microphone array comprising one or more of individual microphones and/or microphone arrays each including a plurality of microphones; and one or more system processors communicating with the combined microphone array, wherein the one or more system processors comprise one or more audio channel profiles (ACPs) and are configured to perform operations comprising:

obtaining predetermined coverage zone dimensions based on the locations of the microphones of the combined microphone array;

populating the coverage zone dimensions with one or more virtual microphones;

obtaining a combined microphone signal, for each audio channel profile (ACP), by combining microphone signals into desired channel audio signals by applying positional based gain control (PBGC) parameters to adjust microphones to control positional based microphone gains based on location information of the sound sources;

performing processes to obtain a zoning gain for each ACP, comprising:

receiving a list of sound sources obtained by utilizing the virtual microphones;

receiving zone parameters for one or more inclusion zones (IZ) and one or more exclusion zones (EZ);

identifying a gain source (GS) and a list of one or more attenuation sources (AS);

determining a zoning ratio based on the gain source, the list of the one or more attenuation sources and active zone configuration parameters; and calculating zoning gain based on the zoning ratio, maximum gain of the one or more inclusion zones and minimum gain of the one or more exclusion zones; and generating an output channel for each ACP by multiplying the zoning gain with the combined microphone signal.

2. The system of claim 1 wherein the zone parameters for the one or more inclusion zones and the one or more exclusion zones comprise physical boundaries of the active zone configuration parameters, weights of the inclusion zones, and a maximum number of the attenuation sources that are allocated for the ACP.

3. The system of claim 1 wherein the active zone configuration parameters includes a minimum power threshold ($P_{min}$), a first threshold for $P_{GS}/P_{AS}$, and a second threshold for $P_{AS}/P_{GS}$, where $P_{GS}$ is a power of the gain source and $P_{AS}$ is a power of the attenuation source.

4. The system of claim 1 wherein the ACP contains zoning parameters of the output channel including locations and gains of the one or more inclusion zones and the one or more exclusion zones for the output channel.

5. The system of claim 1 wherein a location of the gain source represents a physical location for which the individual microphone signals are aligned to produce the output signal of an ACP.

6. The system of claim 1 wherein each ACP is configured to track or identify a single gain source among gain sources in the one or more inclusion zones.

7. The system of claim 1 wherein each ACP is configured to support multiple attenuation sources.

8. The system of claim 1 wherein the shared 3D space is entirely filled or partially filled with the virtual microphones for monitoring and tracking the sound sources.

9. The system of claim 1 wherein each output channel is configured independently for different needs.

10. The system of claim 1 wherein the one or more inclusion zones and the one or more exclusion zones are configured by grouping all the available virtual microphones into either the one or more inclusion zones or the one or more exclusion zones based on the locations of the virtual microphones in the shared 3D space.

11. The system of claim 1 wherein the one or more system processors are configured to apply a positive gain structure to targeted sound sources in the one or more inclusion zones and to apply a negative gain structure to targeted sound sources in the one or more exclusion zones.

12. The system of claim 1 wherein the one or more inclusion zones and the one or more exclusion zones are configured by grouping at least one virtual microphone or more than one virtual microphones into either the one or more inclusion zones or the one or more exclusion zones based on the locations of the virtual microphones in the shared 3D space.

13. The system of claim 1 wherein the one or more inclusion zones and the one or more exclusion zones are configured to support any dimensioned 3D or 2D shape that contains the one or more virtual microphones in the shared 3D space.

14. A method for dynamically adjusting gain structures of sound sources in a shared 3D space including one or more inclusion zones and one or more exclusion zones, comprising:

- obtaining predetermined coverage zone dimensions, via one or more system processors, based on locations of microphones of a combined microphone array, wherein the combined microphone array comprises one or more of individual microphones and/or microphone arrays each including a plurality of microphones, and the system processors communicate with the combined microphone array and comprise one or more audio channel profiles (ACPs);
- populating the coverage zone dimensions with one or more virtual microphones;
- obtaining a combined microphone signal, for each audio channel profile (ACP), by combining microphone signals into desired channel audio signals by applying positional based gain control (PBGC) parameters to adjust microphones to control positional based microphone gains based on location information of the sound sources;
- performing processes to obtain a zoning gain for each ACP, comprising:
  - receiving a list of sound sources obtained by utilizing the virtual microphones;
  - receiving zone parameters for one or more inclusion zones (IZ) and one or more exclusion zones (EZ);
  - identifying a gain source (GS) and a list of one or more attenuation sources (AS);
  - determining a zoning ratio based on the gain source, the list of the one or more attenuation sources and active zone configuration parameters; and
  - calculating zoning gain based on the zoning ratio, maximum gain of the one or more inclusion zones and minimum gain of the one or more exclusion zones; and
- generating an output channel for each ACP by multiplying the zoning gain with the combined microphone signal.

15. The method of claim 14 wherein the zone parameters for the one or more inclusion zones and the one or more exclusion zones comprise physical boundaries of the active zone configuration parameters, weights of the inclusion zones, and a maximum number of the attenuation sources that are allocated for the ACP.

16. The method of claim 14 wherein the active zone configuration parameters includes a minimum power threshold ($P_{min}$), a first threshold for $P_{GS}/P_{AS}$, and a second threshold for $P_{AS}/P_{GS}$, where $P_{GS}$ is a power of the gain source and $P_{AS}$ is a power of the attenuation source.

17. The method of claim 14 wherein the ACP contains zoning parameters of the output channel including locations and gains of the inclusion zones and exclusion zones for the output channel.

18. The method of claim 14 wherein a location of the gain source represents a physical location for which the individual microphone signals are aligned to produce the output signal of an ACP.

19. The method of claim 14 wherein each ACP is configured to track or identify a single gain source among gain sources in the one or more inclusion zones.

20. The method of claim 14 wherein the ACP is configured to support multiple attenuation sources.

21. The method of claim 14 wherein the shared 3D space is entirely filled or partially filled with the virtual microphones for monitoring and tracking the sound sources.

22. The method of claim 14 wherein each output channel is configured independently for different needs.

23. The method of claim 14 wherein the one or more inclusion zones and the one or more exclusion zones are configured by grouping all the available virtual microphones into either the one or more inclusion zones or the one or more exclusion zones based on the locations of the virtual microphones in the shared 3D space.

24. The method of claim 14 wherein a positive gain structure is applied to targeted sound sources in the inclusion zone and a negative gain structure is applied to targeted sound sources in the exclusion zone.

25. The method of claim 14 wherein the one or more inclusion zones and the one or more exclusion zones are configured by grouping at least one virtual microphone or more than one virtual microphones into either the one or more inclusion zones or the one or more exclusion zones based on the locations of the virtual microphones in the shared 3D space.

26. The method of claim 14 wherein the one or more inclusion zones and the one or more exclusion zones are configured to support any dimensioned 3D or 2D shape that contains the one or more virtual microphones in the shared 3D space.

27. One or more non-transitory computer-readable media for dynamically adjusting gain structures of sound sources in a shared 3D space including one or more inclusion zones and one or more exclusion zones, the computer-readable media comprising instructions configured to cause a system processor to perform operations comprising:

- obtaining predetermined coverage zone dimensions, via one or more system processors, based on locations of microphones of a combined microphone array, wherein the combined microphone array comprises one or more of individual microphones and/or microphone arrays each including a plurality of microphones, and the system processors communicate with the combined microphone array and comprise one or more audio channel profiles (ACPs);
- populating the coverage zone dimensions with one or more virtual microphones;
- obtaining a combined microphone signal, for each audio channel profile (ACP), by combining microphone signals into desired channel audio signals by applying positional based gain control (PBGC) parameters to adjust microphones to control positional based microphone gains based on location information of the sound sources;

performing processes to obtain a zoning gain for each ACP, comprising:

receiving a list of sound sources obtained by utilizing the virtual microphones;

receiving zone parameters for one or more inclusion zones (IZ) and one or more exclusion zones (EZ);

identifying a gain source (GS) and a list of one or more attenuation sources (AS);

determining a zoning ratio based on the gain source, the list of the one or more attenuation sources and active zone configuration parameters; and calculating zoning gain based on the zoning ratio, maximum gain of the one or more inclusion zones and minimum gain of the one or more exclusion zones; and generating an output channel for each ACP by multiplying the zoning gain with the combined microphone signal.

* * * * *